United States Patent
Zhou et al.

(10) Patent No.: US 11,337,265 B2
(45) Date of Patent: May 17, 2022

(54) BEAM FAILURE RECOVERY REQUEST TRANSMISSION

(71) Applicant: Comcast Cable Communications, LLC, Philadelphia, PA (US)

(72) Inventors: Hua Zhou, Herndon, VA (US); Esmael Hejazi Dinan, Herndon, VA (US); Hyoungsuk Jeon, Oakton, VA (US); Kyungmin Park, Arlington, VA (US); Alireza Babaei, Fairfax, VA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 83 days.

(21) Appl. No.: 16/101,307

(22) Filed: Aug. 10, 2018

(65) Prior Publication Data

US 2019/0053314 A1 Feb. 14, 2019

Related U.S. Application Data

(60) Provisional application No. 62/543,816, filed on Aug. 10, 2017.

(51) Int. Cl.
*H04B 7/06* (2006.01)
*H04B 7/08* (2006.01)
(Continued)

(52) U.S. Cl.
CPC .......... *H04W 76/18* (2018.02); *H04B 7/0626* (2013.01); *H04B 7/0695* (2013.01); *H04B 7/088* (2013.01); *H04L 27/2611* (2013.01); *H04L 27/2692* (2013.01); *H04W 76/19* (2018.02); *H04L 5/0048* (2013.01); *H04L 27/2613* (2013.01); *H04W 74/0833* (2013.01); *H04W 76/27* (2018.02)

(58) Field of Classification Search
CPC .... H04B 7/0626; H04B 7/0695; H04B 7/088; H04L 5/0048; H04L 27/2611; H04L 27/2613; H04L 27/2692; H04W 74/0833; H04W 76/18; H04W 76/19; H04W 76/27
See application file for complete search history.

(56) References Cited

U.S. PATENT DOCUMENTS 6,490,261 B1   12/2002   Dent et al.
9,125,218 B2    9/2015   Chang
(Continued)

FOREIGN PATENT DOCUMENTS

CN   108809580 A   11/2018
EP    3397015 A1   10/2018
(Continued)

OTHER PUBLICATIONS

R2-1802554 3GPP TSG-RAN WG2 #101, Athens, Greece, Feb. 26-Mar. 2, 2018, Source: ASUSTeK, Title Discussion on Beam Failure Recovery Request in NR.
(Continued)

*Primary Examiner* — Alpus Hsu
(74) *Attorney, Agent, or Firm* — Banner & Witcoff, Ltd.

(57) ABSTRACT

Systems, apparatuses, and methods are described for wireless communications. A base station may transmit an indication of a type of a beam failure recovery request. A wireless device may detect a beam failure and transmit a beam failure recovery requested based on the type.

50 Claims, 26 Drawing Sheets

(51) Int. Cl.
  *H04L 27/26*  (2006.01)
  *H04W 76/18*  (2018.01)
  *H04W 76/19*  (2018.01)
  *H04W 74/08*  (2009.01)
  *H04W 76/27*  (2018.01)
  *H04L 5/00*  (2006.01)

(56) References Cited

U.S. PATENT DOCUMENTS

| | | | |
|---|---|---|---|
| 9,585,188 | B2 | 2/2017 | Jang et al. |
| 9,736,795 | B2 | 8/2017 | Dinan |
| 9,949,298 | B1 | 4/2018 | Akoum et al. |
| 10,278,160 | B2 | 4/2019 | Agiwal et al. |
| 10,333,672 | B2 | 6/2019 | Nagaraja et al. |
| 10,461,994 | B2 * | 10/2019 | Liu ........................ H04L 5/0051 |
| 10,541,741 | B2 | 1/2020 | Islam et al. |
| 10,555,359 | B2 * | 2/2020 | Xia ........................ H04W 76/18 |
| 2010/0279700 | A1 | 11/2010 | Kim et al. |
| 2013/0039345 | A1 | 2/2013 | Kim et al. |
| 2013/0188580 | A1 | 7/2013 | Dinan |
| 2013/0250828 | A1 | 9/2013 | Chou et al. |
| 2015/0189574 | A1 | 7/2015 | Ng et al. |
| 2015/0208462 | A1 | 7/2015 | Lee et al. |
| 2015/0271796 | A1 | 9/2015 | Jang et al. |
| 2015/0365921 | A1 | 12/2015 | Wu |
| 2017/0195998 | A1 | 7/2017 | Zhang et al. |
| 2017/0207843 | A1 | 7/2017 | Jung et al. |
| 2017/0332406 | A1 | 11/2017 | Islam et al. |
| 2017/0339662 | A1 | 11/2017 | Lin et al. |
| 2017/0346545 | A1 | 11/2017 | Islam et al. |
| 2017/0373731 | A1 | 12/2017 | Guo et al. |
| 2018/0006770 | A1 | 1/2018 | Guo et al. |
| 2018/0034611 | A1 | 2/2018 | Nagaraja et al. |
| 2018/0054348 | A1 | 2/2018 | Luo et al. |
| 2018/0054382 | A1 | 2/2018 | Luo et al. |
| 2018/0054783 | A1 | 2/2018 | Luo et al. |
| 2018/0054811 | A1 | 2/2018 | Luo et al. |
| 2018/0054812 | A1 | 2/2018 | Luo et al. |
| 2018/0054832 | A1 | 2/2018 | Luo et al. |
| 2018/0083753 | A1 | 3/2018 | Nagaraja et al. |
| 2018/0098334 | A1 | 4/2018 | Tie et al. |
| 2018/0110066 | A1 | 4/2018 | Luo et al. |
| 2018/0115940 | A1 | 4/2018 | Abedini et al. |
| 2018/0115990 | A1 | 4/2018 | Abedini et al. |
| 2018/0124687 | A1 | 5/2018 | Park et al. |
| 2018/0132266 | A1 | 5/2018 | Chen et al. |
| 2018/0138962 | A1 | 5/2018 | Islam et al. |
| 2018/0176958 | A1 | 6/2018 | Islam et al. |
| 2018/0191422 | A1 | 7/2018 | Xia et al. |
| 2018/0219604 | A1 | 8/2018 | Lu et al. |
| 2018/0220448 | A1 | 8/2018 | Akkarakaran et al. |
| 2018/0227899 | A1 | 8/2018 | Yu et al. |
| 2018/0234960 | A1 | 8/2018 | Nagaraja et al. |
| 2018/0241452 | A1 | 8/2018 | Akkarakaran et al. |
| 2018/0249453 | A1 | 8/2018 | Nagaraja et al. |
| 2018/0270689 | A1 | 9/2018 | Akkarakaran et al. |
| 2018/0270698 | A1 | 9/2018 | Babaei et al. |
| 2018/0270699 | A1 | 9/2018 | Babaei et al. |
| 2018/0270700 | A1 | 9/2018 | Babaei et al. |
| 2018/0278310 | A1 | 9/2018 | Lee et al. |
| 2018/0279150 | A1 | 9/2018 | He et al. |
| 2018/0279193 | A1 | 9/2018 | Park et al. |
| 2018/0279229 | A1 | 9/2018 | Dinan et al. |
| 2018/0288756 | A1 | 10/2018 | Xia et al. |
| 2018/0302889 | A1 | 10/2018 | Guo et al. |
| 2018/0310321 | A1 | 10/2018 | Basu Mallick et al. |
| 2018/0317123 | A1 | 11/2018 | Chen et al. |
| 2018/0323856 | A1 | 11/2018 | Xiong et al. |
| 2018/0324723 | A1 | 11/2018 | Akkarakaran et al. |
| 2018/0324867 | A1 | 11/2018 | Basu Mallick et al. |
| 2018/0343653 | A1 | 11/2018 | Guo |
| 2018/0351611 | A1 | 12/2018 | Nagaraja et al. |
| 2018/0359790 | A1 | 12/2018 | Ingale et al. |
| 2018/0367374 | A1 | 12/2018 | Liu et al. |
| 2018/0368126 | A1 | 12/2018 | Islam et al. |
| 2018/0368142 | A1 | 12/2018 | Liou |
| 2018/0375560 | A1 | 12/2018 | Wei |
| 2019/0028174 | A1 | 1/2019 | Chakraborty et al. |
| 2019/0037423 | A1 | 1/2019 | Yu et al. |
| 2019/0037498 | A1 | 1/2019 | Tseng et al. |
| 2019/0044792 | A1 | 2/2019 | Kwon et al. |
| 2019/0052339 | A1 | 2/2019 | Zhou et al. |
| 2019/0053294 | A1 * | 2/2019 | Xia ........................ H04B 7/088 |
| 2019/0059129 | A1 | 2/2019 | Luo et al. |
| 2019/0074882 | A1 | 3/2019 | Zhou et al. |
| 2019/0075600 | A1 * | 3/2019 | Kwon ............... H04W 74/0833 |
| 2019/0090143 | A1 * | 3/2019 | Luo .................... H04B 7/0695 |
| 2019/0104549 | A1 * | 4/2019 | Deng .................. H04B 7/0617 |
| 2019/0141555 | A1 | 5/2019 | Tooher et al. |
| 2019/0159234 | A1 | 5/2019 | Yi et al. |
| 2019/0173740 | A1 | 6/2019 | Zhang et al. |
| 2019/0268893 | A1 | 8/2019 | Tsai et al. |
| 2020/0059285 | A1 * | 2/2020 | Zhang .................. H04W 24/10 |
| 2020/0059898 | A1 | 2/2020 | Osawa et al. |
| 2020/0068416 | A1 * | 2/2020 | Kang ...................... H04B 7/04 |
| 2020/0092785 | A1 * | 3/2020 | Yang .................... H04W 72/046 |
| 2020/0120714 | A1 * | 4/2020 | Wang .................. H04W 80/08 |
| 2020/0178338 | A1 * | 6/2020 | Ahn .................... H04W 74/004 |

FOREIGN PATENT DOCUMENTS

| | | |
|---|---|---|
| EP | 3424152 A1 | 1/2019 |
| WO | 2013025142 A1 | 2/2013 |
| WO | 2017024516 A1 | 2/2017 |
| WO | 2017123060 A1 | 7/2017 |
| WO | 2017135803 A1 | 8/2017 |
| WO | 2017151876 A1 | 9/2017 |
| WO | 2017196612 A1 | 11/2017 |
| WO | 2017217898 A1 | 12/2017 |
| WO | 2018017840 A1 | 1/2018 |
| WO | 2018031327 A1 | 2/2018 |
| WO | 2018031799 A1 | 2/2018 |
| WO | 2018038859 A1 | 3/2018 |
| WO | 2018038860 A1 | 3/2018 |
| WO | 2018038861 A1 | 3/2018 |
| WO | 2018038862 A1 | 3/2018 |
| WO | 2018038864 A1 | 3/2018 |
| WO | 2018075985 A1 | 4/2018 |
| WO | 2018084544 A1 | 5/2018 |
| WO | 2018128426 A1 | 7/2018 |
| WO | 2018129300 A1 | 7/2018 |
| WO | 2018136300 A1 | 7/2018 |
| WO | 2018141303 A1 | 8/2018 |
| WO | 2018144592 A1 | 8/2018 |
| WO | 2018148552 A1 | 8/2018 |
| WO | 2018156299 A1 | 8/2018 |
| WO | 2018156696 A1 | 8/2018 |
| WO | 2018169848 A1 | 9/2018 |
| WO | 2018170481 A1 | 9/2018 |
| WO | 2018171476 A1 | 9/2018 |
| WO | 2018174667 A1 | 9/2018 |
| WO | 2018174800 A1 | 9/2018 |
| WO | 2018175303 A1 | 9/2018 |
| WO | 2018190617 A1 | 10/2018 |
| WO | 2018195975 A1 | 11/2018 |
| WO | 2018196520 A1 | 11/2018 |
| WO | 2018199074 A1 | 11/2018 |
| WO | 2018199079 A1 | 11/2018 |
| WO | 2018199100 A1 | 11/2018 |
| WO | 2018199162 A1 | 11/2018 |
| WO | 2018199243 A1 | 11/2018 |
| WO | 2018200579 A1 | 11/2018 |
| WO | 2018201450 A1 | 11/2018 |
| WO | 2018201990 A1 | 11/2018 |
| WO | 2018203719 A1 | 11/2018 |
| WO | 2018203785 A1 | 11/2018 |
| WO | 2018204255 A1 | 11/2018 |
| WO | 2018204718 A1 | 11/2018 |
| WO | 2018204922 A1 | 11/2018 |
| WO | 2018222276 A1 | 12/2018 |
| WO | 2018227464 A1 | 12/2018 |
| WO | 2018227551 A1 | 12/2018 |
| WO | 2018228187 A1 | 12/2018 |
| WO | 2018230862 A1 | 12/2018 |

(56) References Cited

FOREIGN PATENT DOCUMENTS

| WO | 2018231655 A1 | 12/2018 |
|---|---|---|
| WO | 2018232090 A1 | 12/2018 |
| WO | 2018232259 A1 | 12/2018 |
| WO | 2018237400 A1 | 12/2018 |
| WO | 2019004694 A1 | 1/2019 |
| WO | 2019032882 A1 | 2/2019 |

OTHER PUBLICATIONS

R2-1803195 3GPP TSG-RAN WG2 #101, Athens, Greece, Feb. 26-Mar. 2, 2018, Source: Ericsson, Title: Beam Failure Recovery in Scell.
R2-1804877 3GPP TSG-RAN WG2 Meeting #101 bis, Sanya, China, Apr. 16-20, 2018, Source: Xiaomi, Title: Consideration on SR Transmission Occasion Overlap with a UL-SCH Resource.
R2-18006164 3GPP TSG-RAN WG2 Meeting #101bis, Sanya, China, Apr. 16-20, 2018, Source: Media Tek Inc., Title: On Parallel SR and RACH Procedure in NR.
R1-170xxxx 3GPP TSG RAN WG1 Meeting #88b, Spokane, USA, Apr. 3-7, 2017, Source: Huawei, HiSilicon, Title: WF on Beam Failure Recovery.
R1-171xxxx 3GPP TSG RAN WG1 Meeting #90, Prague, Czech Republic, Aug. 21-25, 2017, Source: MediaTek Inc. Title: Offline Discussion on Beam Recovery Mechanism.
R1-1704230 3GPP TSG RAN WG1 Meeting #88b, Spokane, USA, Apr. 3-7, 2017, Source: Huawei, HiSilicon, Title: Link recovery procedure for beam failure.
3GPP TS 36.212 V14.3.0 (Jun. 2017); Technical Specification; 3rd Generation Partnership Project; Technical Specification Group Radio Access Network; Evolved Universal Terrestrial Radio Access (E-UTRA); Multiplexing and channel coding (Release 14).
3GPP TSG RAN WG1 Meeting #90, Prague, Czech Republic, Aug. 21-25, 2017, Title: RAN1 Chairman's Notes.
R1-1705719 3GPP TSG RAN WG1 Meeting #88bis, Spokane, USA, Apr. 3-7, 2017, Source: NTT DOCOMO, Inc., Title: Further views on mechanism to recover from beam failure.
R1-1711016 3GPP TSG RAN WG1 #89AH-NR, Qingdao, China, Jun. 27-30, 2017, Source: Ericsson, Title: UL beam management details.
R1-1712223 3GPP TSG RAN WG1 Meeting #90, Prague, Czech Republic, Aug. 21-25, 2017, Source: Huawei, HiSilicon, Title: UL beam management.
R1-1712224 3GPP TSG RAN WG1 Meeting #90, Prague, Czech Republic, Aug. 21-25, 2017, Source: Huawei, HiSilicon, Title: Procedure details for beam failure recovery.
R1-1712268 3GPP TSG RAN WG1 Meeting #90, Prague, Czech Republic, Aug. 21-25, 2017, Source: Xinwei, Title: Discussion on beam failure recovery.
R1-1712299 3GPP TSG RAN WG1 Meeting #90, Prague, Czech Republic, Aug. 21-25, 2017, Source: ZTE, Title: UL beam management for NR MIMO.
R1-1712378 3GPP TSG RAN WG1 Meeting #90, Prague, Czech Republic, Aug. 21-25, 2017, Source: CATT, Title: Considerations on UL beam management.
R1-1712379 3GPP TSG RAN WG1 Meeting #90, Prague, Czech Republic, Aug. 21-25, 2017, Source: CATT, Title: Beam failure detection and recovery.
R1-1712551 3GPP TSG RAN WG1 Meeting #90, Prague, Czech Republic, Aug. 21-25, 2017, Source: Intel Corporation, Title: Details for UL beam management.
R1-1712552 3GPP TSG RAN WG1 Meeting #90, Prague, Czech Republic, Aug. 21-25, 2017, Source: Intel Corporation, Title: Discussion for mechanism to recover from beam failure.
R1-1721672 3GPP TSG RAN WG1 Meeting #90, Prague, Czech Republic, Aug. 21-25, 2017, Source: Lenovo, Motorola Mobility, Title: Discussion of beam failure recovery.
R1-1712713 3GPP TSG RAN WG1 Meeting #90, Prague, Czech Republic, Aug. 21-25, 2017, Source: AT&T, Title: Mechanisms to recover from beam failure.
R1-1712838 3GPP TSG RAN WG1 Meeting #90, Prague, Czech Republic, Aug. 21-25, 2017, Source: Vivo, Title: Discussion on uplink beam management.
R1-1712966 3GPP TSG RAN WG1 Meeting #90, Prague, Czech Republic, Aug. 21-25, 2017, Source: Sony, Title: Considerations on UL beam management.
R1-1713287 3GPP TSG RAN WG1 Meeting #90, Prague, Czech Republic, Aug. 21-25, 2017, Source: Guangdong OPPO Mobile Telecom, Title: Discussion on the UL beam management.
R1-1713596 3GPP TSG RAN WG1 Meeting #90, Prague, Czech Republic, Aug. 21-25, 2017, Source: Samsung, Title: Discussion on UL beam management.
R1-1714143 3GPP TSG RAN WG1 Meeting #90, Prague, Czech Republic, Aug. 21-25, 2017, Source: InterDigital, Inc., Title: On efficient UL beam management.
R1-1714250 3GPP TSG RAN WG1 Meeting #90, Prague, Czech Republic, Aug. 21-25, 2017, Source: Nokia, Nokia Shanghai Bell, Title: SRS transmission for beam management.
R1-1714292 3GPP TSG RAN WG1 Meeting #90, Prague, Czech Republic, Aug. 21-25, 2017, Source: Ericsson, Title: On UL beam management.
R1-1714383 3GPP TSG RAN WG1 Meeting #90, Prague, Czech Republic, Aug. 21-25, 2017, Source: ASUSTeK, Title: Considerations on UE Beamforming Management.
3GPP TSG RAN WG1 Meeting NR#3, Nagoya, Japan, Sep. 18-21, 2017, Title: RAN1 Chairman's Notes.
R1-1715441 3GPP TSG RAN WG1 Meeting NR#3, Nagoya, Japan, Sep. 18-21, 2017, Source: ZTE, Sanechips, Title: Discussion on beam recovery.
R1-1715620 3GPP TSG RAN WG1 Meeting NR#3, Nagoya, Japan, Sep. 18-21, 2017, Source: Vivo, Title: Discussion on beam failure recovery procedure.
R1-1715802 3GPP TSG RAN WG1 Meeting NR#3, Nagoya, Japan, Sep. 18-21, 2017, Source: CATT, Title: Beam failure detection and recovery.
R2-1708696 3GPP TSG RAN WG2 #99, Berlin, Germany, Aug. 21-25, 2017, Source: Huawei, HiSilicon, Title: Consideration on DRX with beam management.
R2-1708755 3GPP TSG RAN WG2 #99, Berlin, Germany, Aug. 21-25, 2017, Source: LG Electronics, Title: DRX related timers in NR (Revision of R2-1706750).
R2-1708791 3GPP TSG RAN WG2 #99, Berlin, Germany, Aug. 21-25, 2017, Source: Intel Corporation, Title: C-DRX enhancement in NR (Revision of R2-1707026).
R2-1709223 3GPP TSG RAN WG2 #99, Berlin, Germany, Aug. 21-25, 2017, Source: Qualcomm Incorporated, Title: Beam management in C-DRX.
R2-1709588 3GPP TSG RAN WG2 #99, Berlin, Germany, Aug. 21-25, 2017, Source: Samsung, Title: NR beamformed C-DRX operation (updated resubmission of R2-1705734).
R2-1709652 3GPP TSG RAN WG2 #99, Berlin, Germany, Aug. 21-25, 2017, Source: Qualcomm Incorporated, Apple, OPPO, Title: Wake-Up Signaling for C-DRX Mode.
R2-1709916 3GPP TSG RAN WG2 #99, Berlin, Germany, Aug. 21-25, 2017, Source: Ericsson, Title: Reply LS to SA2 on 5Qls for URLLC.
R1-1719423 3GPP TSG RAN WG1 Meeting #91, Reno, USA, Nov. 27-Dec. 1, 2017, Source: Huawei, HiSilicon, Title: Remaining details on beam failure recovery.
R1-1719619 3GPP TSG RAN WG1 Meeting #91, Reno, USA, Nov. 27-Dec. 1, 2017, Source: Fujitsu, Title: Discussion on beam failure recovery.
R1-1719633 3GPP TSG RAN WG1 Meeting #91, Reno, USA, Nov. 27-Dec. 1, 2017, Source: AT&T, Title: Remaining Details on Mechanisms to Recover from Beam Failure.
R1-1719695 3GPP TSG RAN WG1 Meeting #91, Reno, USA, Nov. 27-Dec. 1, 2017, Source: Spreadtrum Communications, Title: Remaining issues on beam failure recovery mechanism.
R1-1719770 3GPP TSG RAN WG1 Meeting #91, Reno, USA, Nov. 27-Dec. 1, 2017, Source: vivo, Title Remaining details on mechanism to recover from beam failure.

(56) References Cited

OTHER PUBLICATIONS

R1-1719809 3GPP TSG RAN WG1 Meeting #91, Reno, USA, Nov. 27-Dec. 1, 2017, Source: Huawei, HiSilicon, Title: Design of PUCCH-based Beam Failure Recovery.
R1-1719908 3GPP TSG RAN WG1 Meeting #91, Reno, USA, Nov. 27-Dec. 1, 2017, Source: LG Electronics, Title: Discussion on beam failure recovery.
R1-1719988 3GPP TSG RAN WG1 Meeting #91, Reno, USA, Nov. 27-Dec. 1, 2017, Source: Discussion on Beam Recovery Mechanism.
R1-1720072 3GPP TSG RAN WG1 Meeting #91, Reno, USA, Nov. 27-Dec. 1, 2017, Source: Intel Corporation, Title: Remaining Issues on Beam Failure Recovery.
R1-1720291 3GPP TSG RAN WG1 Meeting #91, Reno, USA, Nov. 27-Dec. 1, 2017, Source Samsung, Title: Beam failure recovery.
R1-1720305 3GPP TSG RAN WG1 Meeting #91, Reno, USA, Nov. 27-Dec. 1, 2017, Source: Samsung, Title: Discussion on cross-carrier beam management.
R1-1720574 3GPP TSG RAN WG1 Meeting #91, Reno, USA, Nov. 27-Dec. 1, 2017, Source: NEC, Title: On Partial Beam Failure Recovery.
R1-1720631 3GPP TSG RAN WG1 Meeting #91, Reno, USA, Nov. 27-Dec. 1, 2017, Source: InterDigital, Inc., Title: Remaining issues on beam recovery.
R1-1720804 3GPP TSG RAN WG1 Meeting #91, Reno, USA, Nov. 27-Dec. 1, 2017, Source: NTT DOCOMO, Title: Remaining issue on beam recovery.
R1-1720891 3GPP TSG RAN WG1 Meeting #91, Reno, USA, Nov. 27-Dec. 1, 2017, Source: Nokia, Nokia Shanghai Bell, Title: Beam Recovery in NR.
R1-1721523 3GPP TSG RAN WG1 Meeting #91, Reno, USA, Nov. 27-Dec. 1, 2017, Source: NTT DOCOMO, Samsung, Mediatek, AT&T, ZTE, Intel, Huawei, CATT, Qualcomm, Fujitsu, Spreadtrum, Title: WF for handling partial beam failure.
R1-1721673 3GPP TSG RAN WG1 Meeting #91, Reno, USA, Nov. 27-Dec. 1, 2017, Source: NTT DOCOMO, Intel, Huawei, NEC, Spreadtrum, Mediatek, China Telecom, AT&T, Samsung, ZTE, CATT, Qualcomm, Fujitsu, Nokia, Title: WF for handling partial beam failure.
R1-1800100 3GPP TSG RAN WG1 Meeting Ad Hoc, Vancouver, Canada, Jan. 22-26, 2018, Source: Huawei, HiSilicon, Title: Summary of remaining issues of beam measurement, reporting and indication.
R1-1800101 3GPP TSG RAN WG1 Meeting Ad Hoc, Vancouver, Canada, Jan. 22-26, 2018, Source: Huawei, HiSilicon, Title: Summary of remaining issues on beam failure recovery.
R1-1800110 3GPP TSG RAN WG1 Meeting Ad Hoc, Vancouver, Canada, Jan. 22-26, 2018, Source: ZTE, Sanechips, Title: Remaining details on bean management.
R1-1800111 3GPP TSG RAN WG1 Meeting Ad Hoc, Vancouver, Canada, Jan. 22-26, 2018, Source: ZTE, Sanechips, Title: Remaining details on mean management.
R1-1800312 3GPP TSG RAN WG1 Meeting Ad Hoc, Vancouver, Canada, Jan. 22-26, 2018, Source: Intel Corporation, Title: Remaining Issues on Beam Failure Recovery.
R1-1800526 3GPP TSG RAN WG1 Meeting Ad Hoc, Vancouver, Canada, Jan. 22-26, 2018, Source: Huawei, HiSilicon, Title: Remaining details of PHR.
R1-1800542 3GPP TSG RAN WG1 Meeting Ad Hoc, Vancouver, Canada, Jan. 22-26, 2018, Source: CMCC, Title: Discussion on remaining issues for beam indication.
R1-1800543 3GPP TSG RAN WG1 Meeting Ad Hoc, Vancouver, Canada, Jan. 22-26, 2018, Source: CMCC, Title: Discussion on beam recovery mechanism.
R1-1800582 3GPP TSG RAN WG1 Meeting Ad Hoc, Vancouver, Canada, Jan. 22-26, 2018, Source: AT&T, Title: TCI states configuration design to support dynamic BWP switching.
R1-1800583 3GPP TSG RAN WG1 Meeting Ad Hoc, Vancouver, Canada, Jan. 22-26, 2018, Source: AT&T, Title: In support of partial beam failure.
R1-1800622 3GPP TSG RAN WG1 Meeting Ad Hoc, Vancouver, Canada, Jan. 22-26, 2018, Source: ASUSTeK, Title: Remaining Issues for Beam Failure Recovery Procedure.
R1-1800629 3GPP TSG RAN WG1 Meeting Ad Hoc, Vancouver, Canada, Jan. 22-26, 2018, Source: InterDigital, Inc., Title: Remaining details on beam failure recovery.
R1-1800642 3GPP TSG RAN WG1 Meeting Ad Hoc, Vancouver, Canada, Jan. 22-26, 2018, Source: ITRI, Title: Discussion on timer for beam failure recovery.
R1-1800660 3GPP TSG RAN WG1 Meeting Ad Hoc, Vancouver, Canada, Jan. 22-26, 2018, Source: NTT DOCOMO, Title: Remaining Issue on Beam Indication.
R1-1800661 3GPP TSG RAN WG1 Meeting Ad Hoc, Vancouver, Canada, Jan. 22-26, 2018, Source: NTT DOCOMO, Title: Remaining issue on beam recovery.
R1-1800682 3GPP TSG RAN WG1 Meeting Ad Hoc, Vancouver, Canada, Jan. 22-26, 2018, Source: NTT DOCOMO, Inc., Title: Remaining issues on PHR.
R1-1800699 3GPP TSG RAN WG1 Meeting Ad Hoc, Vancouver, Canada, Jan. 22-26, 2018, Source: Ericsson, Title: Remaining details on beam management.
R1-1800700 3GPP TSG RAN WG1 Meeting Ad Hoc, Vancouver, Canada, Jan. 22-26, 2018, Source: Ericsson, Title: Remaining details and corrections for beam recovery.
R1-1800734 3GPP TSG RAN WG1 Meeting Ad Hoc, Vancouver, Canada, Jan. 22-26, 2018, Source: InterDigital, Inc., Title: Remaining issues on beam management.
R1-1800751 3GPP TSG RAN WG1 Meeting Ad Hoc, Vancouver, Canada, Jan. 22-26, 2018, Source: Nokia, Nokia Shanghai Bell, Title: Remaining details on beam indication, measurement and reporting.
R1-1800752 3GPP TSG RAN WG1 Meeting Ad Hoc, Vancouver, Canada, Jan. 22-26, 2018, Source: Nokia, Nokia Shanghai Bell, Title: Remaining Details on Beam Recovery.
R1-1800859 3GPP TSG RAN WG1 Meeting Ad Hoc, Vancouver, Canada, Jan. 22-26, 2018, Source: Qualcomm, Title: Beam management for NR.
R1-1800860 3GPP TSG RAN WG1 Meeting Ad Hoc, Vancouver, Canada, Jan. 22-26, 2018, Source: Qualcomm Incorporated, Title: Remaining details on beam recovery procedure.
R1-1801006 3GPP TSG RAN WG1 Meeting Ad Hoc, Vancouver, Canada, Jan. 22-26, 2018, Source: Ericsson, Title; Feature lead summary 1 of beam measurement and reporting.
R1-1801089 3GPP TSG RAN WG1 Meeting Ad Hoc, Vancouver, Canada, Jan. 22-26, 2018, Source: Media Tec Inc., Title: Summary for Remaining issue on Beam Failure Recovery.
R1-1801143 3GPP TSG RAN WG1 Meeting Ad Hoc, Vancouver, Canada, Jan. 22-26, 2018, Source: Ericsson, Title: Feature lead summary 2 of beam measurement and reporting.
R1-1801160 3GPP TSG RAN WG1 Meeting Ad Hoc, Vancouver, Canada, Jan. 22-26, 2018, Source: NTT DOCOMO, Qualcomm, Huawei, HiSilicon, ZIE, Sanechips, Fujitsu, Title: Updated offline proposal on PHR.
R1-1801187 3GPP TSG RAN WG1 Meeting Ad Hoc, Vancouver, Canada, Jan. 22-26, 2018, Source: Ericsson, Title: Feature lead summary 3 of beam measurement and reporting.
R1-1801197 3GPP TSG RAN WG1 Meeting Ad Hoc, Vancouver, Canada, Jan. 22-26, 2018, Source: MediaTek Inc., Title: Offline Summary for Remaining issues on Beam Failure Recovery.
R1-1801223 3GPP TSG RAN WG1 Meeting Ad Hoc, Vancouver, Canada, Jan. 22-26, 2018, Source: MediaTek Inc., Title: Offline Discussion Summary for Beam Failure Recovery.
R1-1801228 3GPP TSG RAN WG1 Meeting Ad Hoc, Vancouver, Canada, Jan. 22-26, 2018, Source: Ericsson, Title: Text proposal on source QCL for semi-persistent CSI-RS.
R1-1801229 3GPP TSG RAN WG1 Meeting Ad Hoc, Vancouver, Canada, Jan. 22-26, 2018, Source: Ericsson, Title: Text proposal for source spatial relation for semi-persistent SRS.
R1-1801230 3GPP TSG RAN WG1 Meeting Ad Hoc, Vancouver, Canada, Jan. 22-26, 2018, Source: Ericsson, Title: Text proposal on priority rules for PUCCH carrying RSRP reports and SRS.
Dec. 16, 2019—European Extended Search Report—EP 19191018.1.

(56) References Cited

OTHER PUBLICATIONS

Dec. 20, 2019—European Extended Search Report—EP 19199208.0.
R2-1811208 3GPP TSG-RAN WG2 Meeting #103, Gothenburg, Sweden, Aug. 20-24, 2018, Source: CATT, Title UL/DL BWP linkage for PDCCH order initiated CFRA.
R1-1704478 3GPP TSG RAN WG1 Meeting #88bis, Spokane, USA, April 3-7, 2017, Source: Fujitsu, Title: Discussion on beam failure recovery procedure.
R1-1704723 3GPP TSG RAN WG1 Meeting #88bis, Spokane, USA, Apr. 3-7, 2017, Source: Intel Corporation, Title: Details for UL Beam Management.
R1-1704725 3GPP TSG RAN WG1 Meeting #88bis, Spokane, USA, Apr. 3-7, 2017, Source: Intel Corporation, Title On UE Initiated Beam Recovery.
R1-1705582 3GPP TSG RAN WG1 Meeting #88bis, Spokane, USA, Apr. 3-7, 2017, Source: Qualcomm Incorporated, Title: Beam recovery procedures. actions.
R1-1705893 3GPP TSG RAN WG1 Meeting #88bis, Spokane, USA, Apr. 3-7, 2017, Source: Ericsson, Title: Beam failure detection and beam recovery
R1-1705961 3GPP TSG RAN WG1 Meeting #88bis, Spokane, USA, Apr. 3-7, 2017, Source: Nokia, Alcatel-Lucent Shanghai Bell, Title: Beam Recovery in NR.
R1-1706928 3GPP TSG RAN WG1 Meeting #89, Hangzhou, China, May 15-19, 2017, Source: Huawei, HiSilicon, Title: Beam management across multiple carriers.
R1-1707255 3GPP TSG RAN WG1 Meeting #89, Hangzhou, China, May 15-19, 2017, Source: Fujitsu, Title: Discussion on beam failure recovery procedure.
R1-1707356 3GPP TSG RAN WG1 Meeting #89, Hangzhou, China, May 15-19, 2017, Source: Intel Corporation, Title: Discussion for Mechanism to Recover from Beam Failure.
R1-1707477 3GPP TSG RAN WG1 Meeting #89, Hangzhou, China, May 15-19, 2017, Source: CATT, Title: Discussior on DL beam recovery.
R1-1707698 3GPP TSG RAN WG1 Meeting #89, Hangzhou, China, May 15-19, 2017, Source: Guangdong OPPO Mobile Telecom, Title: On Beam Recovery Mechanism.
R1-1707782 3GPP TSG RAN WG1 Meeting #89, Hangzhou, China, May 15-19, 2017, Source: Spreadtrum Communications, Title: Discussion on UE initiated recovery from beam failure.
R1-1707814 3GPP TSG RAN WG1 Meeting #89, Hangzhou, China, May 15-19, 2017, Source: NEC, Title: Low latency beam failure recovery by PRACH/PRACH-like.
R1-1707954 3GPP TSG RAN WG1 Meeting #89, Hangzhou, China, May 15-19, 2017, Source: Samsung, Title: Discussion on beam recovery procedure.
R1-1708678 3GPP TSG RAN WG1 Meeting #89, Hangzhou, China, May 15-19, 2017, Source: Ericsson, Title: Beam failure recovery mechanism.
R1-1708905 3GPP TSG RAN WG1 Meeting #89, Hangzhou, China, May 15-19, 2017, Source: Nokia, Alcatel-Lucent Shanghai Bell, Title: Beam Recovery.
R1-1710144 3GPP TSG RAN WG1 NR Ad-Hoc #2, Qingdao, China, Jun. 27-30, 2017, Source: Guangdong OPPO Mobile Telecom, Title: On Beam Recovery Mechanism.
R1-1710185 3GPP TSG RAN WG1 NR Ad-Hoc #2, Qingdao, China, Jun. 27-30, 2017, Source: ZTE, Title: Discussion on beam recovery mechanism.
R1-1710527 3GPP TSG RAN WG1 NR Ad-Hoc #2, Qingdao, China, Jun. 27-30, 2017, Source: Intel Corporation, Title: Discussion for mechanism to recover from beam failure.
R1-1710655 3GPP TSG RAN WG1 NR Ad-Hoc #2, Qingdao, China, Jun. 27-30, 2017, Source: Samsung, Title: Beam failure recovery.
R1-1714251 3GPP TSG RAN WG1 Meeting #90, Prague, Czech Republic, Aug. 21-25, 2017, Source: Nokia, Nokia Shanghai Bell, Title: Beam recovery in NR.
R1-1715468 3GPP TSG RAN WG1 Meeting NR#3, Nagoya, Japan, Sep. 18-21, 2017, Source: Huawei, HiSilicon, Title: Beam Failure Recovery Design Details.
R1-1715860 3GPP TSG RAN WG1 Meeting NR#3, Nagoya, Japan, Sep. 18-21, 2017, Source: LG Electronics, Title: Discussion on beam failure recovery.
R1-1800362 3GPP TSG RAN WG1 Meeting AH 1801, Vancouver, Canada, Jan. 22-26, 2018, Source: LG Electronics, Title: Clarification on PDCCH beam indication by higher-layers.
R1-1800363 3GPP TSG RAN WG1 Meeting AH 1801, Vancouver, Canada, Jan. 22-26, 2018, Source: LG Electronics, Title: Text proposals on UL beam management.
R1-1800364 3GPP TSG RAN WG1 Meeting AH 1801, Vancouver, Canada, Jan. 22-26, 2018, Source: LG Electronics, Title: Discussion on PHY and MAC operation for beam failure recovery.
R1-1800401 3GPP TSG RAN WG1 Meeting AH 1801, Vancouver, Canada, Jan. 22-26, 2018, Source: Lenovo, Motorola Mobility, Title: Corrections on beam management.
R1-1800402 3GPP TSG RAN WG1 Meeting AH 1801, Vancouver, Canada, Jan. 22-26, 2018, Source: Lenovo, Motorola Mobility, Title: Corrections on beam failure recovery.
R1-1800432 3GPP TSG RAN WG1 Meeting AH 1801, Vancouver, Canada, Jan. 22-26, 2018, Source: Samsung, Title: Issues on beam management.
R1-1800433 3GPP TSG RAN WG1 Meeting AH 1801, Vancouver, Canada, Jan. 22-26, 2018, Source: Samsung, Title: Aperiodic beam reporting.
R1-1800434 3GPP TSG RAN WG1 Meeting AH 1801, Vancouver, Canada, Jan. 22-26, 2018, Source: Samsung, Title: Issues on beam failure recovery.
R1-1800472 3GPP TSG RAN WG1 Meeting AH 1801, Vancouver, Canada, Jan. 22-26, 2018, Source: Samsung, Title: PHR for CA.
R1-1800498 3GPP TSG RAN WG1 Meeting AH 1801, Vancouver, Canada, Jan. 22-26, 2018, Source: OPPO, Title: Text Proposal for Beam Management.
R1-1800499 3GPP TSG RAN WG1 Meeting AH 1801, Vancouver, Canada, Jan. 22-26, 2018, Source: OPPO, Title: Text Proposal for Beam Failure Recovery.
R1-1715941 3GPP TSG RAN WG1 Meeting NR#3, Nagoya Japan, Sep. 18-21, 2017, Source: Samsung, Title: Beam Failure recovery.
R1-1716295 3GPP TSG RAN WG1 Meeting NR#3, Nagoya, Japan, Sep. 18-21, 2017, Source: Intel Corporation, Title: Remaining Issues on Beam Failure Recovery.
R1-1716397 3GPP TSG RAN WG1 Meeting NR#3, Nagoya, Japan, Sep. 18-21, 2017, Source: Qualcomm Incorporated. Title: Beam recovery procedure.
R1-1716500 3GPP TSG RAN WG1 Meeting NR#3, Nagoya, Japan, 18-21, Sep. 2017, Source: Nokia, Nokia Shanghai Bell, Title Beam Recovery in NR.
R1-1716469 3GPP TSG RAN WG1 Meeting NR#3, Nagoya, Japan, Sep. 18-21, 2017: Source: InterDigital, Inc., Title: Remaining issues on beam recovery.
R1-1717302 3GPP TSG RAN WG1 Meeting #90bis, Prague, Czech Republic, Oct. 9-13, 2017, Source: Huawei, HiSilicon Title: Beam failure recovery design details.
R1-1717369 3GPP TSG RAN WG1 Meeting #90bis, Prague, Czech Republic, Oct. 9-13, 2017, Source: Intel Corporation, Title: Remaining Issues on Beam Failure Recovery.
R1-1717473 3GPP TSG RAN WG1 Meeting #90bis, Prague, Czech Republic, Oct. 9-13, 2017, Source: vivo, Title Discussion on beam failure recovery.
R1-1717606 3GPP TSG RAN WG1 Meeting #90bis, Prague, Czech Republic, Oct. 9-13, 2017, Source: Samsung, Title: Beam failure recovery.
R1-1717942 3GPP TSG RAN WG1 Meeting #90bis, Prague, Czech Republic, Oct. 9-13, 2017, Source: LG Electronics, Title: Discussion on beam failure recovery.
R1-1718010 3GPP TSG RAN WG1 Meeting #90bis, Prague, Czech Republic, Oct. 9-13, 2017, Source: NEC, Title Discussion on Beam Failure Recovery.
R1-1718055 3GPP TSG RAN WG1 Meeting #90bis, Prague, Czech Republic, Oct. 9-13, 2017, Source: OPPO, Title: Discussion on Beam Recovery Mechanism.

(56) References Cited

OTHER PUBLICATIONS

R1-1718193 3GPP TSG RAN WG1 Meeting #90bis, Prague, Czech Republic, Oct. 9-13, 2017, Source: NTT Docomo, Title: Views on beam recovery.
R1-1718389 3GPP TSG RAN WG1 Meeting #90bis, Prague, Czech Republic, Oct. 9-13, 2017, Source: AT&T, Title: Beam Recovery for Full and Partial Control Channel Failure.
R1-1718512 3GPP TSG RAN WG1 Meeting #90bis, Prague, Czech Republic, Oct. 9-13, 2017, Source: Nokia, Nokia Shanghai Bell, Title: Beam Recovery in NR.
R1-1718542 3GPP TSG RAN WG1 Meeting #90bis, Prague Czech Republic, Oct. 9-13, 2017, Source: Qualcomm Incorpated, Title: Beam recovery procedure.
R1-1801454 3GPP TSG RAN WG1 Meeting #92, Athens, Greece, Feb. 26-Mar. 2, 2018, Source: Huawei, HiSilicon, Title: Remaining issues on beam failure recovery.
R1-1801722 3GPP TSG RAN WG1 Meeting #92, Athens, Greece, Feb. 26-Mar. 2, 2018, Source: CATT, Title: Remaining issues on DL beam failure recovery.
R1-1802393 3GPP TSG RAN WG1 Meeting #92, Athens, Greece, Feb. 26-Mar. 2, 2018, Source: Intel Corporation, Title: On beam management issues for mutli-CC operation.
R1-1802397 3GPP TSG RAN WG1 Meeting #92, Athens, Greece, Feb. 26-Mar. 2, 2018, Source: Intel Corporation, Title: Remaining Issues on Beam Failure Recovery.
R1-1802472 3GPP TSG RAN WG1 Meeting #92, Athens, Greece, Feb. 26-Mar. 2, 2018, Source: NTT DOCOMO, Title: Remaining issues on beam recovery.
R1-1802557 3GPP TSG RAN WG1 Meeting #92, Athens, Greece, Feb. 26-Mar. 2, 2018, Source: Nokia, Nokia Shanghai Bell, Title: Remaining Details on Beam Recovery.
R1-1802593 3GPP TSG RAN WG1 Meeting #92, Athens, Greece, Feb. 26-Mar. 2, 2018, Source: AT&T, Title: In support of partial beam failure.
R1-1802744 3GPP TSG RAN WG1 Meeting #92, Athens, Greece, Feb. 26-Mar. 2, 2018, Source: Ericsson, Title: Remaining details on beam recovery.
R1-1802824 3GPP TSG RAN WG1 Meeting #92, Athens, Greece, Feb. 26-Mar. 2, 2018, Source: Qualcomm Incorporated. Title: Beam recovery procedures.
R1-1803362 3GPP TSG RAN WG1 Meeting #92, Athens, Greece, Feb. 26- Mar. 2, 2018, Source: MediaTek Inc., Title: Summary on Remaining issues on Beam Failure Recovery.
R1-1803397 3GPP TSG RAN WG1 Meeting #92, Athens, Greece, Feb. 26-Mar. 2, 2018, Source: CATT, Title Summary of Email Discussion on Beam Failure Recovery on Scell.
R1-1803745 3GPP TSG-RAN WG1 Meeting #92bis, Sanya, China, Apr. 16-20, 2018, Source: CATT, Title: Remaining Details on Beam Failure Recovery.
R1-1804210 3GPP TSG-RAN WG1 Meeting #92bis, Sanya, China, Apr. 16-20, 2018, Source: Lenovo, Motorola Mobility, Title: Discussion of Beam Measurement for Carrier Aggregation.
R1-1804363 3GPP TSG-RAN WG1 Meeting #92bis, Sanya, China, Apr. 16-20, 2018, Source: Samsung, Title Simultaneous Reception of Physical Channels and Reference Signals.
R1-1804789 3GPP TSG-RAN WG1 Meeting #92bis, Sanya, China, Apr. 16-20, 2018, Source: Qualcomm Incorporated. Title: Details on Simultaneous Reception/Transmission of PHY Channels and RS in FR2.
R1-1804975 3GPP TSG-RAN WG1 Meeting #92bis, Sanya, China, Apr. 16-20, 2018, Source: Ericsson, Title Remaining Issues on Beam Recovery.
R1-1804977 3GPP TSG-RAN WG1 Meeting #92bis, Sanya, China, Apr. 16-20, 2018, Source: Ericsson, Title: On Simultaneous Reception of Physical and Reference Signals Across CCs.
R1-1805538 3GPP TSG-RAN WG1 Meeting #92bis, Sanya, China, Apr. 16-20, 2018, Source: NTT DOCOMO, Inc., Title: Offline Summary for Al 7.1.3.1.2 Search Space.
R1-1806616 3GPP TSG-RAN WG1 #93, Busan, Korea, May 21-25, 2018, Source: LG Electronics, Title: Remaining Issues on Search Space.
R1-1806729 3GPP TSG-RAN WG1 #93, Busan, Korea, May 21-25, 2018, Source: Samsung, Title: Corrections on Search Space Design.
R2-1707999 3GPP TSG-RAN WG2 #99, Berlin, Germany, Aug. 21-25, 2017, Source: MediaTek Inc., Title: Beam Management and Beam Recovery in MAC.
R2-1708677 3GPP TSG RAN WG2 #99, Berlin, Germany, Aug. 21-25, 2017, Source: Nokia, Nokia Shanghai Bell, Title: Beam Recovery in NR.
R2-1708697 3GPP TSG RAN WG2 #99, Berlin, Germany, Aug. 21-25, 2017, Source: Huawei, HiSilicon, Title Handling of Resources for Beam Failure Recovery.
R2-1709085 3GPP TSG-RAN WG2 #99, Bedin, Germany, Aug. 21-25, 2017, Source: Qualcomm Incorporated, Title: Beam Recovery Request.
R2-1709320 3GPP TSG-RAN WG2 #99, Berlin, Germany, Aug. 21-25, 2017, Source: ASUSTeK, Title: Discussion an Beam Recover Request in NR.
R2-1800042 3GPP TSG-RAN WG2 AH, Vancouver, Canada, Jan. 22-26, 2018, Source: ASUSTeK, Title: Discussion on Beam Failure Recovery Request in NR.
R2-1800049 3GPP TSG-RAN WG2 AH, Vancouver, Canada, Jan. 22-26, 2018, Source: ASUSTeK, Title: UE Behaviours Upon Beam Failure and Recovery.
R2-1800168 3GPP TSG-RAN WG2 AH, Vancouver, Canada, Jan. 22-26, 2018, Source: CATT, Title: Solution for PH Type Inconsistency Between RAN1 and RAN2.
R2-1800169 3GPP TSG-RAN WG2 AH, Vancouver, Canada, Jan. 22-26, 2018, Source: CATT, Title: PHR MAC DE for EN-DC.
R2-1800231 3GPP TSG-RAN WG2 #100, Reno, USA, Nov. 27-Dec. 1, 2017, Source: Xiaomi, Title: Consideration on PHR Trigger Condition for Supporting SUL.
R2-1800253 3GPP TSG-RAN WG2 AH, Vancouver, Canada, Jan. 22-26, 2018, Source: ASUSTeK, Title: Pathloss Change for Triggering PHR.
R2-1800254 3GPP TSG-RAN WG2 AH, Vancouver, Canada, Jan. 22-26, 2018, Source: CATT, Title: RA Procedure and Parameters for BFR.
R2-1800343 3GPP TSG-RAN WG2 AH, Vancouver, Canada, Jan. 22-26, 2018, Source: Ericsson, Title: PHR Format for SUL.
R2-1800614 3GPP TSG-RAN WG2 AH, Vancouver, Canada, Jan. 22-26, 2018, Source: Samsung, Title: Support tor Type 2 PH in NR.
R2-1800619 3GPP TSG-RAN WG2 AH, Vancouver, Canada, Jan. 22-26, 2018, Source: Samsung, Title: SUL and PHR.
R2-1800642 3GPP TSG-RAN WG2 AH, Vancouver, Canada, Jan. 22-26, 2018, Source: Huawei, HiSilicon, Title: PHR Alignment Between RAN1 and RAN2.
R2-1800680 3GPP TSG-RAN WG2 AH, Vancouver, Canada, Jan. 22-26, 2018, Source: Lenovo, Motorola Mobility, Title: PHR for NR CA.
R2-1800822 3GPP TSG-RAN WG2 AH, Vancouver, Canada, Jan. 22-26, 2018, Source: Spreadtrum Communications, Title: Beam Failure Recovery Clarification.
R2-1801008 3GPP TSG-RAN WG2 AH, Vancouver, Canada, Jan. 22-26, 2018, Source: Huawei, HiSilicon, Title: Discussion on Power Sharing and its Impact on PHR for EN-DC.
R2-1801009 3GPP TSG-RAN WG2 AH, Vancouver, Canada, Jan. 22-26, 2018, Source: Huawei, HiSilicon, Title: General Consideration on RA Procedure for Beam Failure Recovery.
R2-1801041 3GPP TSG-RAN WG2 AH, Vancouver, Canada, Jan. 22-26, 2018, Source: Huawei, HiSilicon, Title: Remaining Issue of Power Management in NR.
R2-1801043 3GPP TSG-RAN WG2 AH, Vancouver, Canada, Jan. 22-26, 2018, Source: Huawei, HiSilicon, Title: Consideration of PHR with Multi-Beam Operation.
R2-1801404 3GPP TSG-RAN WG2 AH, Vancouver, Canada, Jan. 22-26, 2018, Source: NTT Docomo, Inc., Title: Discussion on Beam Failure Recovery.
R2-1801406 3GPP TSG-RAN WG2 AH, Vancouver, Canada, Jan. 22-26, 2018, Source: NTT Docomo, Inc., Title: Remaining Issue on PHR.

(56) References Cited

OTHER PUBLICATIONS

R2-1801539 3GPP TSG-RAN WG2 AH, Vancouver, Canada, Jan. 22-26, 2018, Source: CATT, Title: PHR MAC DE for EN-DC.
R2-1801540 3GPP TSG-RAN WG2 AH, Vancouver, Canada, Jan. 22-26, 2018, Source: CATT, Title: Correction on PHR MAC CE in EN-DC in TS38.321.
R2-1801564 3GPP TSG-RAN WG2 AH, Vancouver, Canada, Jan. 22-26, 2018, Source: NTT DOCOMO, Inc., Title: LS on PHR.
R2-1801568 3GPP TSG-RAN WG2 AH, Vancouver, Canada, Jan. 22-26, 2018, Source: RAN WG2, Title: LS on PHR.
R2-1801814 3GPP TSG-RAN WG2 #101, Athens, Greece, Feb. 26-Mar. 2, 2018, Source: Huawei, HiSilicon, Title: Beam Failure Recovery on SCell.
R2-1802490 3GPP TSG-RAN WG2 #101, Athens, Greece, Feb. 26-Mar. 2, 2018, Source: CATT, Huawei, HiSilicon, Title: Discussion on Beam Failure Recovery for CE.
R2-1707001 3GPP TSG-RAN WG2 Meeting #AH, Qingdao, China, Jun. 27-29, 2017, Source: Lenovo, Motorola Mobility, Title: Random access procedure for beam recovery request.
R1-17111617 3GPP TSG RAN WG1 NR AH#2, Qingdao, China, Jun. 27-30, 2017, Source: CATT, Title: RACH power control and power ramping procedure (revision of R1-1710034).
R1-171 1161 3GPP TSG RAN WG1 NR#2, Qingdao, China, Jun. 27-30, 2017, Source: Qualcomm Incorporated, Title Beam recovery procedures.
International Search Report and Written Opinion for PCT/US2018/046368 dated Dec. 13, 2018.
Apr. 15, 2019—Extented European Search Report—EP 19150964.5.
R1-1708678 3GPP TSG-RAN WG1 #89, Hangzhou, China, May 15-19, 2017, Source: Ericsson, Title: Beam failure recovery mechanism.
May 22, 2019—Extended European Search Report—19156175.2.
R2-1800560 3GPP TSG-RAN WG2 NR, Vancouver, Canada, Jan. 22-26, 2018, Source: Sharp, Title: Remaining Bsues on beam failure recovery.
R2-1800632 3GPP TSG-RAN WG2 AH, Vancouver, Canada, Jan. 22-26, 2018, Source: Huawei, HiSilicon, Title Remaining issue for beam failure recovery.
R2-1801049 3GPP TSG-RAN WG2 AH, Vancouver, Canada, Jan. 22-26, 2018, Source: Huawei, HiSilicon, Title Non-contention based random access for beam failure recovery in CA.
3GPP TS 38.321 V15.0.0 (Dec. 2017); Technical Specification; 3rd Generation Partnership Project; Technical Specification Group Radio Access Network; NR; Medium Access Control (MAC) protocol specification (Release 15).
3GPP TS 38.213 V15.0.1 (Feb. 2018); Technical Specification; 3rd Generation Partnership Project; Technical Specification Group Radio Access Network; NR; Physical layer procedures for control (Release 15).
R2-1804475 3GPP TSG-RAN WG2 Meeting #101 bis, Sanya, China, Apr. 16-20, 2018, Source: Spreadtrum Communications, Title: Beam Failure recovery on SCell.
May 1, 20194—European Extended Search Report—19157460.7.
R2-1710562 3GPP TSG-RAN WG2 #99bis, Prague, Czech Republic, Oct. 9-13, 2017, Source: Huawei, HiSilicon, Title: RAN2 aspects of DL beam management (revision of R2-1708695).
3GPP TS 36.211 V14.3.0 (Jun. 2017); Technical Specification; 3rd Generation Partnership Project; Technical Specification Group Radio Access Network; Evolved Universal Terrestrial Radio Access (E-UTRA); Physical channels and modulation (Release 14).
3GPP TS 36.213 V14.3.0 (Jun. 2017); Technical Specification; 3rd Generation Partnership Project; Technical Specification Group Radio Access Network; Evolved Universal Terrestrial Radio Access (E-UTRA); Physical layer procedures (Release 14).
3GPP TS 36.321 V.14.3.0 (Jun. 2017); Technical Specification; 3rd Generation Partnership Project; Technical Specification Group Radio Access Network; Evolved Universal Terrestrial Radio Access (E-UTRA); Medium Access Control (MAC) protocol specification (Release 14).
3GPP TS 36.331 V.14.3.0 (Jun. 2017); Technical Specification; 3rd Generation Partnership Project; Technical Specification Group Radio Access Network; Evolved Universal Terrestrial Radio Access (E-UTRA); Radio Resource Control (RRC); Protocol specification (Release 14).
3GPP TR 38.802 V14.1.0 (Jun. 2017); Technical Report; 3rd Generation Partnership Project; Technical Specification Group Radio Access Network; Study on New Radio Access Technology; Physical Layer Aspects (Release 14).
3GPP TR 38.912 V14.0.0 (Mar. 2017); Technical Report; 3rd Generation Partnership Project; Technical Specification Group Radio Access Network; Study on New Radio (NR) Access Technology (Release 14).
R1-171xxxx 3GPP TSG RAN WG1 Meeting #90, Prague, Czech Republic, Aug. 21-25, 2017, Source: MCC Support, Title: Draft Report of 3GPP TSG RAN WG1 #89 v0.2.0 (Hangzhou, China, May 15-19, 2017).
R1-171xxxx 3GPP TSG RAN WG1 Meeting #90, Prague, Czech Republic, Aug. 21-25, 2017, Source: MCC Support, Title: Draft Report of 3GPP TSG RAN WG1 #AH NR2 v0.1.0 (Qingdao, China, Jun. 27-30, 2017).
R1-1708890 3GPP TSG RAN WG1 Meeting #89, Hangzhou, China, May 15-19, 2017, Source: MCC Support, Title: Final Report of 3GPP TSG RAN WG1 #88bis v1.0.0 (Spokane, Washington, Apr. 3-7, 2017).
R1-1709907 3GPP TSG RAN WG1 NR Ad-Hoc#2, Qingdao, China, Jun. 27-30, 2017, Source: Xinwei, Title: Discussion on Beam Failure Recovery.
R1-1709929 3GPP TSG RAN WG1 NR Ad Hoc Meeting, Qingdao, China, Jun. 27-30, 2017, Source: Huawei, HiSilicon, Title: General views on beam failure recovery.
R1-1710058 3GPP TSG RAN WG1 NR Ad-Hoc#2, Qingdao, China, Jun. 27-30, 2017, Source: CATT, Title: Considerations on DL beam failure and recovery.
R1-1710283 3GPP TSG RAN WG1 NR Ad-Hoc#2, Qingdao, China, Jun. 27-30, 2017, Source: LG Electronics, Title: Discussion on beam failure recovery.
R1-1710400 3GPP TSG RAN WG1 NR Ad-Hoc#2, Qingdao, China, Jun. 27-30, 2017, Source: Vivo, Title: Beam failure recovery procedure.
R1-1710596 3GPP TSG RAN WG1 NR Ad-Hoc#2, Qingdao, China, Jun. 27-30, 2017, Source: Lenovo, Motorola Mobility, Title: Discussion of beam recovery procedure.
R1-1710810 3GPP TSG RAN WG1 AH_NR Meeting, Qingdao, China, Jun. 27-30, 2017, Source: MediaTek Inc., Title: Mechanism for flexible beam failure recovery.
R1-1710926 3GPP TSG RAN WG1 NR Ad-Hoc#2, Qingdao, China, Jun. 27-30, 2017, Source: InterDigital, Inc., Title: On Remaining Details of Beam Failure Recovery.
R1-1711017 3GPP TSG RAN WG1 #89ah-NR, Qingdao, China, Jun. 27-30, 2017, Source: Ericsson, Title: Mechanism to recover from beam failure.
R1-1711291 3GPP TSG RAN WG1 NR Ad-Hoc#2, Qingdao, China, Jun. 27-30, 2017, Source: Nokia, Alcatel-Lucent Shanghai Bell, Title: Beam Recovery.
R2-1706680 3GPP TSG-RAN WG2 NR-Adhoc, Qingdao, China, Jun. 27-29, 2017, Source: AT&T, Title: Beam Failure Recovery Mechanism and RLF.
3GPP TSG-RAN WG2 NR Ad Hoc, Qingdao, China, Jun. 27-29, 2017, Source: RAN2 Chairman (Intel), Object: Chairman Notes.
Jul. 16, 2019—European Extended Search Report—EP 19166184.2.
R1-1702078 3GPP TSG RAN WG1 Meeting #88, Athens, Greece, Feb. 13-17, 2017, Source: CATT, Title: Considerations on beam recovery mechanism.
R1-1707121 3GPP TSG RAN WG1 Meeting #89, Hangzhou, China, May 15-19, 2017, Source: ZTE, Title: Discussion on beam recovery mechanism.
3GPP TS 38.213 V15.0.0 (Dec. 2017); Technical Specification; 3rd Generation Partnership Project; Technical Specification Group Radio Access Network; NR; Physical layer procedures for control (Release 15).

(56) References Cited

OTHER PUBLICATIONS

3GPP TS 38.213 V15.1.0 (Mar. 2018); Technical Specification; 3rd Generation Partnership Project; Technical Specification Group Radio Access Network; NR; Physical layer procedures for control (Release 15).
3GPP TS 38.321 V15.1.0 (Mar. 2018); Technical Specification; 3rd Generation Partnership Project; Technical Specification Group Radio Access Network; NR; Medium Access Control (MAC) protocol specification (Release 15).
3GPP TS 38.331 V15.1.0 (Mar. 2018); Technical Specification; 3rd Generation Partnership Project; Technical Specification Group Radio Access Network; NR; Radio Resource Control (RRC) protocol specification (Release 15).
R1-180xxxx 3GPP TSG RAN WG1 Meeting #93 Busan, South Korea, May 21-25, 2018, Source: Ericsson, Title: Feature lead summary for beam measurement and reporting.
R1-180xxxx 3GPP TSG RAN WG1 Meeting #92bis, Sanya, China, Apr. 16-20, 2018, Source: MediaTek, Inc., Title: Summary 1 on Remaining issues on Beam Failure Recovery.
R1-180xxxx 3GPP TSG RAN WG1 Meeting #93 Busan, South Korea, May 21-25, 2018, Source: MediaTek Inc., Title: Summary on Remaining issues on Beam Failure Recovery.
R1-1704400 3GPP TSG RAN WG1 Meeting #8 8bis, Spokane, USA, Apr. 3-7, 2017, Source: ZTE, ZTE Microelectronics, Title: Discussion on beam recovery mechanism.
R1-1704465 3GPP TSG RAN WG1 Meeting #88bis, Spokane, USA, Apr. 3-7, 2017, Source: MediaTek, Inc., Title: Discussion on beam recovery mechanism.
R2-1811483 3GPP TSG-RAN WG2 Meeting #103, Gothenburg, Sweden, Aug. 20-24, 2018, Source: ZTE, Sanechips, Title: CR for the reset of BFD in 38.321.
R2-1812108 3GPP TSG-RAN WG2 Meeting #103, Gothenburg, Sweden, Aug. 20-24, 2018, Source: Nokia, Nokia Shanghai Bell, Title: Reset of BFD.
3GPP TS 38.213 V15.2.0 (Jun. 2018), Technical Specification, 3rd Generation Partnership Project; Technical Specification Group Radio Access Network; NR; Physical layer procedures for control (Release 15).
R2-1806229 3GPP TSG-RAN WG2 Meeting #101 bis, Sanya, China, Apr. 16-20, 2018, Source: Samsung, Title: Miscellaneous corrections.
R2-1815644 3GPP TSG-RAN WG2 Meeting #103bis, Chengdu, PR China, Oct. 8-12, 2018, Source: Ericsson, Samsung, Title: Correction for Reconfiguration of CFRA during ongoing RA.
R2-1811325 3GPP TSG-RAN WG2 Meeting #103, Gothenburg, Sweden, Aug. 20-24, 2018, Source: Samsung Electronics, Title: Handling Beam Failure Recovery Configuration Update.
3GPP TS 38.321 V15.2.0 (Jun. 2018), Technical Specification, 3rd Generation Partnership Project; Technical Specification Group Radio Access Network; NR; Medium Access Control (MAC) protocol specification (Release 15).
R2-18111149 3GPP TSG-RAN WG2 Meeting #103, Gothenburg, Sweden, Aug. 20-24, 2018, Source: OPPO, Title: CR on beam failure recovery configuration.
R2-1811593 3GPP TSG-RAN WG2 Meeting #103, Gothenburg, Sweden, Aug. 20-24, 2018, Source: ZTE Corporation, Sanechips, Title: CR for the configuration of BeamFailureRecoveryConfig.
3GPP TS 38.331 V15.2.1 (Jun. 2018), Technical Specification, 3rd Generation Partnership Project; Technical Specification Group Radio Access Network; NR; Radio Resource Control (RRC) protocol specification (Release 15).
R1-180XXXX 3GPP TSG-RAN WG1 Meeting #94, Gothenburg, Sweden, Aug. 20-24, 2018, Source: Ericsson, Title: Feature lead summary beam management v2.
R2-1804763 3GPP TSG-RAN WG2 Meeting #101bis, Sanya, China, April 16-20, 2018, Source: Nokia, Nokia Shangha Bell, Title: Running MAC CR for euCA.
R1-180XXXX 3GPP TSG-RAN WG1 Meeting #94, Gothenburg, Sweden, Aug. 20-24, 2018, Source: NTT DOCOMO, Inc., Title: Offline summary for PDCCH structure and search space.

R1-180XXXX 3GPP TSG-RAN WG1 Meeting #94, Gothenburg, Sweden, Aug. 20-24, 2018, Source: MediaTek Inc., Title: Summary #1 on Remaining Issues on Beam Failure Recovery.
R1-1712153 3GPP TSG RAN WG1 Meeting #90, Prague, Czech Republic, Aug. 21-25, 2017, Source: Huawei, HiSilicon, Title: Overview of bandwidth part.
R1-1713Z04 3GPP TSG RAN WG1 Meeting #90, Prague, Czech Republic, Aug. 21-25, 2017, Source: LG Electronics, Title: Further remaining details on wider bandwidth operation.
R1-1713978 3GPP TSG RAN WG1 Meeting #90, Prague, Czech Republic, Aug. 21-25, 2017, Source: MediaTek Inc., Title: Further Details on Bandwidth Part Operation in NR.
R1-1719650 3GPP TSG RAN WG1 Meeting #91, Reno, USA, Nov. 27-Dec. 1, 2017, Source: AT&T, Title Remaining details on bandwidth parts.
R1-1719651 3GPP TSG RAN WG1 Meeting #91, Reno, USA, Nov, 27-Dec. 1, 2017, Source: AT&T, Title: Remaining details on carrier aggregation.
R1-1721027 3GPP TSG RAN WG1 Meeting #91, Reno, USA, Nov. 27-Dec. 1, 2017, Source: Ericsson, Title: On Carrier aggregation related aspects.
R1-1800879 3GPP TSG RAN WG1 NR AD Hoc, Vancouver, Canada, Jan. 22-26, 2018, Source: Qualcomm Incorporated. Title: Remaining Issues on BWP.
R1-1803622 3GPP TSG RAN WG1 Meeting #92, Sanya, China, Apr. 16-20, 2018, Source: NEC, Title: Remaining Issues on beam failure recovery.
R1-1804211 3GPP TSG-RAN WG1 Meeting #92bis, Sanya, China, Apr. 16-20, 2018, Source: Lenovo, Motorola Mobility, Title: Discussion of beam failure recovery for Carrier Aggregation.
R1-1806281 3GPP TSG-RAN WG1 #93, Busan, Korea, May 21-25, 2018, Source: CATT, Title: Remaining issues on beam failure recovery.
R1-1806508 3GPP TSG-RAN WG1 #93, Busan, Korea, May 21-25, 2018, Source: Intel Corporation, Title: Remaining Issues on beam failure recovery.
R1-1806789 3GPP TSG-RAN WG1 #93, Busan, Korea, May 21-25, 2018, Source: MediaTek Inc., Title: Remaining Issues on beam failure recovery.
R1-1807796 3GPP TSG-RAN WG1 #93, Busan, Korea, May 21-25, 2018, Source: MediaTek Inc., Title: Summary 2 on Remaining issues on beam failure recovery.
R1-1808720 3GPP TSG-RAN WG1 Meeting #94, Gothenburg, Sweden, Aug. 20-24, 2018, Source: Intel Corporation, Title: On SCell Beam Failure Recovery.
R1-1810020 3GPP TSG-RAN WG1 Meeting #94, Gothenburg, Sweden, Aug. 20-24, 2018, Source: Samsung, Title CR to 38.213 capturing the RAN1#94 meeting agreements.
R2-1713170 3GPP TSG RAN WG2 Meeting #100, Reno, USA, Nov. Z7-Dec. 1, 2017, Source: Nokia (rapporteur), Title: Report of [99bis#32][LTE/euCA] Faster activation for Scells (Nokia).
R2-1714Z89 3GPP TSG RAN WG2 Meeting #100, Reno, USA, Nov. Z7-Dec. 1, 2017, Source: Nokia, Nokia Shanghai Bell, Title: Running CR for euCA Stage-2.
R2-1800866 3GPP TSG-RAN WG2 AH, Vancouver, Canada, Jan. 22-26, 2018, Source: vivo, Title: RACH configuration for beam recovery.
R2-1800895 3GPP TSG-RAN WG2 AH, Vancouver, Canada, Jan. 22-26, 2018, Source: vivo, Title: Discussion on the impact on beam failure recovery.
R2-1801432 3GPP TSG RAN WG2 NR Ad Hoc, Vancouver, Canada, Jan. 22-26, 2018, Source: Qualcomm Incorporated, Title: Dormant BWP for fast SCell activation.
R2-18019Z6 3GPP TSG-RAN WG2 #101, Athens, Greece, Feb. 26-Mar. 2, Z018, Source: ZTE, Sanechips, Title: Remaining considerations on RACH procedure for BFR.
R2-1802143 3GPP TSG-RAN WG2 #101, Athens, Greece, Feb. 26-Mar. 2, 2018, Source: CATT, Title: RACH reattempt considering beam selection.
R2-1802151 3GPP TSG-RAN WG2 #101, Athens, Greece, Feb. 26-Mar. 2, 2018, Source: CATT, Title: Beam failure recovery.

(56) References Cited

OTHER PUBLICATIONS

R2-1802756 3GPP TSG RAN WG2 Meeting #101, Athens, Greece, Feb. 26-Mar. 2, 2018, Source: Nokia, Nokia Shanghai Bell, Title: Remaining details on temporary CQI reporting during activation.
R2-1803ZZ9 3GPP TSG-RAN WG2 #101, Athens, Greece, Feb. 26-Mar. 2, 2018, Source: Nokia, Nokia Shanghai Bell, Title: BWP switch interaction with contention free BFR preamble.
R2-1803564 3GPP TSG RAN WG2 Meeting #101, Athens, Greece, Feb. 26-Mar. 2, 2018, Source: Qualcomm Incorporated, Title: Dormant BWP for fast SCell activation.
R2-1804279 3GPP TSG-RAN WG2 Meeting #101, Sanya, China, Apr. 16-20, 2018, Source: ASUSTeK, Title: UE behaviours upon beam failure and recovery.
R2-1804303 3GPP TSG-RAN WG2 Meeting #101, Sanya, China, Apr. 16-20, 2018, Source: Samsung, Title: MAC Impacts: Beam Failure Recovery for SCell.
R2-1804407 3GPP TSG-RAN WG2 Meeting #101, Sanya, China, Apr. 16-20, 2018, Source: ZTE, Sanechips, Title: Consideration on beam failure recovery for SCell.
R2-1804410 3GPP TSG-RAN WG2 Meeting #101, Sanya, China, Apr. 16-20, 2018, Source: Huawei, HiSilicon, Title: Beam failure recovery using MAC CE.
R2-1804411 3GPP TSG-RAN WG2 Meeting #101, Sanya, China, Apr. 16-20, 2018, Source: Huawei, HiSilicon, Title: BWP issues for BFR.
R2-1804434 3GPP TSG-RAN WG2 Meeting #101, Sanya, China, Apr. 16-20, 2018, Source: OPPO, Title: Issues on supporting SCell BFR RACH.
R2-1804481 3GPP TSG-RAN WG2 Meeting #101, Sanya, China, Apr. 16-20, Z018, Source: CATT, Title: Leftover Issues for BFR.
RZ-180448Z 3GPP TSG-RAN WG2 Meeting #101, Sanya, China, Apr. 16-20, 2018, Source: CATT, Title: BFR configurations and fallback options.
R2-1804483 3GPP TSG-RAN WG2 Meeting #101, Sanya, China, Apr. 16-20, Z018, Source: CATT, Title: BFR on SCell.
R2-1804696 3GPP TSG-RAN WG2 Meeting #101, Sanya, China, Apr. 16-20, 2018, Source: vivo, Title: Discussion on the SCell BFR.
R2-1805204 3GPP TSG-RAN WG2 Meeting #101, Sanya, China, Apr. 16-20, 2018, Source: Lenovo, Motorola Mobility, Title: Dedicated PRACH resource for beam failure recovery.
R2-1805414 3GPP TSG-RAN WG2 Meeting #101, Sanya, China, Apr. 16-20, 2018, Source: Ericsson, Title: Beam Failure Recovery in SCell and contention-based BFR on SpCell.
R2-1805896 3GPP TSG-RAN WG2 Meeting #101, Sanya, China, Apr. 16-20, 2018, Source: Huawei, HiSilicon, Title ASN.1 for Beam Failure Recovery.
R2-1805905 3GPP TSG-RAN WG2 Meeting #101, Sanya, China, Apr. 16-20, 2018, Source: Huawei, HiSilicon, Title Discussions on RA for SCells BFR.
R2-1806120 3GPP TSG-RAN WG2 Meeting #101, Sanya, China, Apr. 16-20, 2018, Source: ITL, Title: Beam Failure Recovery on SCell.
R2-1806166 3GPP TSG-RAN WG2 Meeting #101, Sanya, China, Apr. 16-20, 2018, Source: MediaTek, Inc., Title: On switching between CFRA and CBRA.
R2-1806774 3GPP TSG-RAN WG2 Meeting #102, Sanya, China, Apr. 16-20, 2018, Source: Nokia, Nokia Shanghai Bell, Title: Finalization of dormant SCell state.
R2-1806819 3GPP TSG-RAN WG2 Meeting #102, Busan, Korea, May 21-25, 2018, Source: Samsung, Title: MAC Impacts: Beam Failure Recovery for SCell.
R2-1806924 3GPP TSG-RAN WG2 Meeting #102, Busan, Korea, May 21-25, 2018, Source: Qualcomm, Inc., Title SCell Dormant State Transitions based on New Timers & MAC-CEs.
R2-1806998 3GPP TSG-RAN WG2 Meeting #102, Busan, Korea, May 21-25, 2018, Source: CATT, Title: The validity of CFRA resources for BFR.
R2-1807160 3GPP TSG-RAN WG2 Meeting #102, Busan, Korea, May 21-25, 2018, Source: Panasonic, Title: Timer associated with the dedicated BFR PRACH resource.
R2-1807405 3GPP TSG-RAN WG2 Meeting #102, Busan, Korea, May 21-25, 2018, Source: ZTE, Title: Discussion on the beam failure recovery timer.
R2-1807415 3GPP TSG-RAN WG2 Meeting #102, Busan, Korea, May 21-25, 2018, Source: OPPO, Title: MAC Impacts on supporting BFR procedure on SCell.
R2-1807444 3GPP TSG-RAN WG2 Meeting #102, Busan, Korea, May 21-25, Z018, Source: Huawei, HiSilicon, Title BWP switch for BFR.
R2-1807481 3GPP TSG-RAN WG2 Meeting #102, Busan, Korea, May 21-25, 2018, Source: Huawei, HiSilicon, Title Remaining issues of temporary CQI reporting.
R2-1807584 3GPP TSG-RAN WG2 Meeting #102, Busan, Korea, May 21-25, 2018, Source: vivo, Title: Discussion on the SCell BFR.
R2-1807961 3GPP TSG-RAN WG2 Meeting #102, Busan, Korea, May 21-25, 2018, Source: Huawei, HiSilicon, Title Discussion on BFR-config for SCell BFR.
R2-1807975 3GPP TSG-RAN WG2 Meeting #102, Busan, Korea, May 21-25, 2018, Source: Huawei, HiSilicon, Title Discussion on beam failure recovery for SCell.
R2-1808024 3GPP TSG-RAN WG2 Meeting #102, Busan, Korea, May 21-25, 2018, Source: Nokia, Nokia Shanghai Bell, Title: SCell Beam Failure Recovery.
R2-1808570 3GPP TSG-RAN WG2 Meeting #102, Busan, Korea, May 21-25, Z018, Source: Qualcomm Incorporated, Title: Dormant BWP for fast SCell activation.
R2-1808658 3GPP TSG-RAN WG2 Meeting #102, Busan, Korea, May 21-25, 2018, Source: ITL, Title: Beam failure Yecovery on SCell.
R2-1808809 3GPP TSG-RAN WG2 Meeting #102, Busan, Korea, May 21-25, 2018, Source: Ericsson, Title: CR on Dormat SCell state transition MAC CE.
R2-1809515 3GPP TSG RAN WG2 AH-1807, Montreal, Canada, Jul. 2-6, 2018, Source: CATT, Title: Further issues with DL BWP switching for CFRA.
R2-1809523 3GPP TSG RAN WG2 AH-1807, Montreal, Canada, Jul. 2-6, 2018, Source: CATT, Title: Further discussion on BFR termination criterion.
R2-1809721 3GPP TSG RAN WG2 AH-1807, Montreal, Canada, Jul. 2-6, 2018, Source: InterDigital, Title: BWP switching for RA-BFR.
R2-1809872 3GPP TSG RAN WG2 AH-1807, Montreal, Canada, Jul. 2-6, 2018, Source: vivo, Title: Remaining configuration issues for BFR.
R2-1809894 3GPP TSG RAN WG2 AH-1807, Montreal, Canada, Jul. 2-6, 2018, Source: vivo, Title: Preamble Selection when CFRA Resource Available.
R2-1809925 3GPP TSG RAN WG2 AH-1807, Montreal, Canada, Jul. 2-6, 2018, Source: OPPO, Title: The issue of BWP switching for BFR RACH.
R2-1810008 3GPP TSG RAN WG2 AH-1807, Montreal, Canada, Jul. 2-6, 2018, Source: Sharp, Title: Remaining issues on DL BWP switching upon RACH procedure initiation.
R2-1810063 3GPP TSG RAN WG2 AH-1807, Montreal, Canada, Jul. 2-6, 2018, Source: Ericsson, Title: Dormant SCell state in NR.
R2-1810091 3GPP TSG RAN WG2 AH-1807, Montreal, Canada, Jul. 2-6, 2018, Source: Huawei, HiSilicon, Title: BWP switch for BFR.
R2-1810424 3GPP TSG RAN WG2 AH-1807, Montreal, Canada, Jul. 2-6, 2018, Source: Qualcomm Inc., Title: BFD procedure in DRX mode.
R2-1810513 3GPP TSG RAN WG2 AH-1807, Montreal, Canada, Jul. 2-6, 2018, Source: Huawei, HiSilicon, Title: Clarification on RA procedure for BFR on BWPs without CBRA occasions.
R2-1810641 3GPP TSG RAN WG2 AH-1807, Montreal, Canada, Jul. 2-6, 2018, Source: Huawei, HiSilicon, Title: Issues on BWP switch and search space configuration for BFR.
R2-1810643 3GPP TSG RAN WG2 AH-1807, Montreal, Canada, Jul. 2-6, 2018, Source: Huawei, HiSilicon, Title: RACH configuration on BWPs.
R2-1810797 3GPP TSG RAN WG2 AH-1807, Montreal, Canada, Jul. 2-6, 2018, Source: CATT, Title: Offline discussion #100 on DL-UL linking for CFRA.

(56) References Cited

OTHER PUBLICATIONS

R2-181148Z 3GPP TSG-RAN WG2 Meeting #103, Gothenburg, Sweden, Aug. 20-24, Z018, Source: ZTE, Sanechips, Title: Consideration on implicit configuration of RS for BFD.
R2-1811896 3GPP TSG-RAN WG2 Meeting #103, Gothenburg, Sweden, Aug. 20-24, 2018, Source: Huawei, HiSilicon, Title: BWP switch for BFR.
R2-1812639 3GPP TSG-RAN WG2 Meeting #103, Gothenburg, Sweden, Aug. 20-Z4, 2018, Source: LG Electronics Inc., Title: BWP operation for BFR RA.
R2-1814198 3GPP TSG-RAN WG2 Meeting #103bis, Chengdu, China, Oct. 8-12, 2018, Source: vivo, Title: Clarification on the beam change during BFR.
RP-181344 3GPP TSG RAN Meeting #80, La Jolla, USA, June 11-14, 2018, Source: Ericsson, Nokia, Nokia Shanghai Bell, Huawei, Title: New WID on MR-DC enhancements (NR_MRDC_Enh).
R1-1807210 3GPP TSG RAN WG1 Meeting #93, Busan, Korea, May 21-25, 2018, Source: ASUSTeK, Title: Remaining issues on beam management.
R1-1804788 3GPP TSG RAN WG1 Meeting #92b, Sanya, China, Apr. 16-20, 2018, Source: Qualcomm, Title: Beam failure recovery procedure.
Jan. 24, 2020—European Extended Search Report—EP 19199658.6.
Sep. 25, 2019—European Extended Search Report—EP 19166863.1.
R1-1803368 3GPP TSG RAN WG1 Meeting #92, Athens, Greece, Feb. 26-Mar. 2, 2018, Source: [RAN1], Title Draft LS reply to RAN2 on beam failure recovery.
R1-1803441 3GPP TSG RAN WG1 Meeting #92, Athens, Greece, Feb. 26-Mar. 2, 2018, Source: MediaTek Inc., Title: Summary 2 on Remaing issues on Beam Failure Recovery.
Aug. 2, 20197—European Extended Search Report—EP 19173892.1.
3GPP TSG-RAN WG1 #89: "Beam failure recovery mechanism", May 15, 2017.
3GPP TSG-RAN WG2 Meeting#AH: "Random access procedure for beam recovery request", Jun. 27, 2017.
U.S. Appl. No. 16/101,189, Priority of Beam Failure Recovery Request and Uplink Channels, Aug. 10, 2018.
U.S. Appl. No. 16/101,239, Resource Configuration of Beam Failure Recovery Request Transmission, Aug. 10, 2018.
U.S. Appl. No. 16/101,283, Transmission Power Control for Beam Failure Recovery Requests, Aug. 10, 2018.
U.S. Appl. No. 16/125,434, Unified Downlink Control Information for Beam Management, filed Sep. 7, 2018.
U.S. Appl. No. 16/146,913, Beam Management with DRX Configuration, Sep. 28, 2018.
U.S. Appl. No. 16/193,971, Beam Paging Assistance, filed Nov. 16, 2018.
U.S. Appl. No. 16/243,714, Beam Selection in Beam Failure Recovery Request Retransmission, filed Jan. 9, 2019.
U.S. Appl. No. 16/271,435, Beam Failure Recovery in Carrier Aggregation, filed Feb. 8, 2019.
U.S. Appl. No. 16/277,400, Beam Failure Report, filed Feb. 15, 2019.
U.S. Appl. No. 16/354,752, Downlink Partial Beam Failure Recovery, filed Mar. 15, 2019.
U.S. Appl. No. 16/370,476, Configuration for Beam Failure Recovery, filed Mar. 29, 2019.
U.S. Appl. No. 16/372,858, Beam Failure Recovery, filed Apr. 2, 2019.
U.S. Appl. No. 16/409,103, Prioritization in Beam Failure Recovery Procedures, filed May 10, 2019.

* cited by examiner

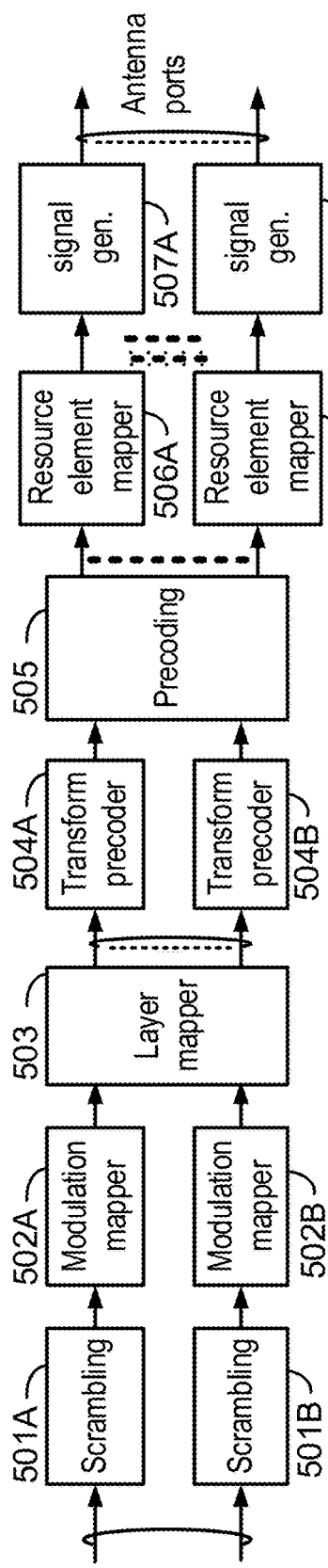
FIG. 5A Example uplink physical channel
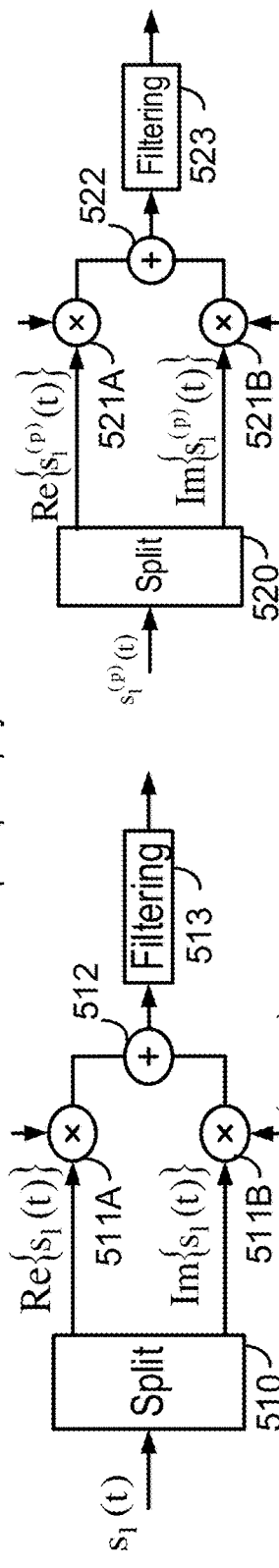
FIG. 5B Example uplink modulation
FIG. 5D Example downlink modulation
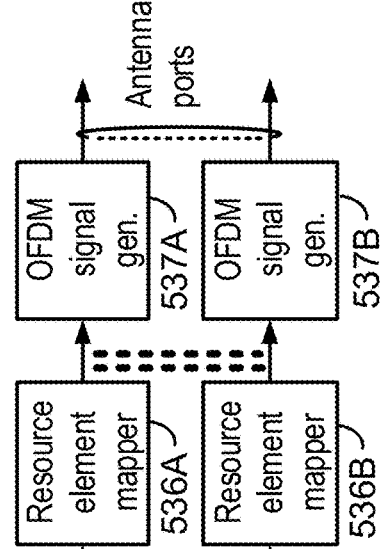
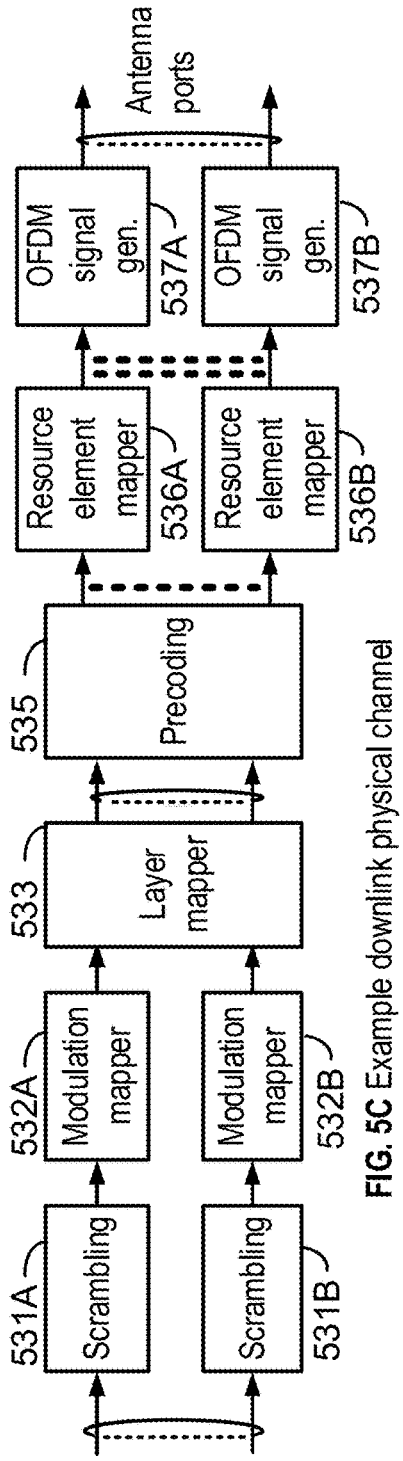
FIG. 5C Example downlink physical channel

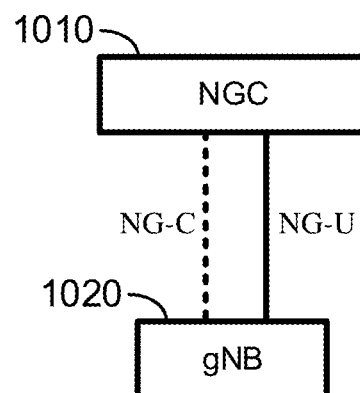
FIG. 10A  gNB connected to NGC
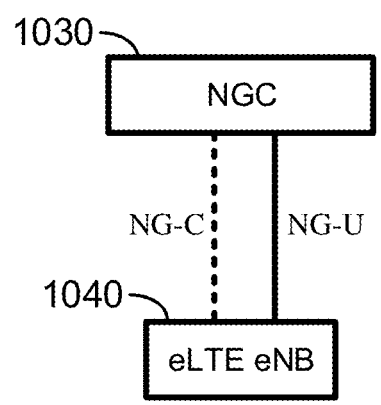
FIG. 10B  eLTE eNB connected to NGC

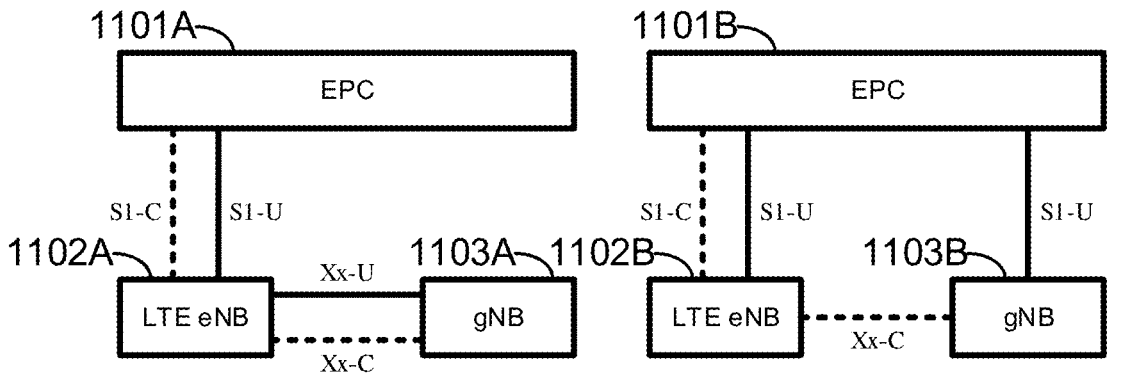

FIG. 11A LTE eNB connected to EPC with non-standalone gNB.
gNB user plane connected to EPC via LTE eNB.

FIG. 11B LTE eNB connected to EPC with non-standalone gNB.
gNB user plane connected to EPC directly.

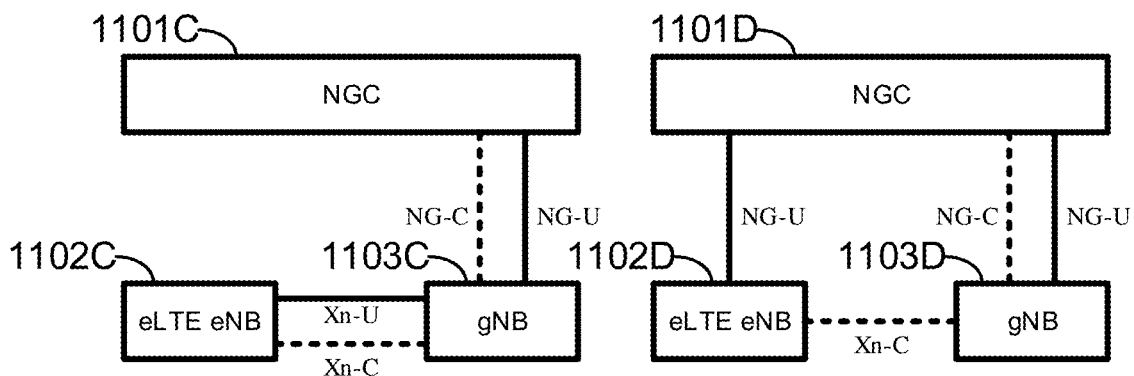

FIG. 11C gNB connected to NGC with non-standalone eLTE eNB.
eLTE eNB user plane connected to NGC via gNB.

FIG. 11D gNB connected to NGC with non-standalone eLTE eNB.
eLTE eNB user plane connected to NGC directly.

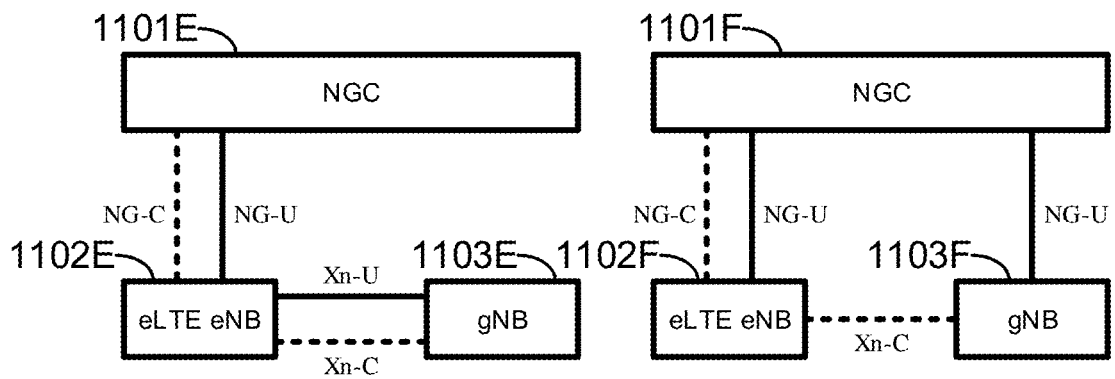

FIG. 11E eLTE eNB connected to NGC with non-standalone gNB.
gNB user plane connected to NGC via eLTE eNB.

FIG. 11F eLTE eNB connected to NGC with non-standalone gNB.
gNB user plane connected to NGC directly.

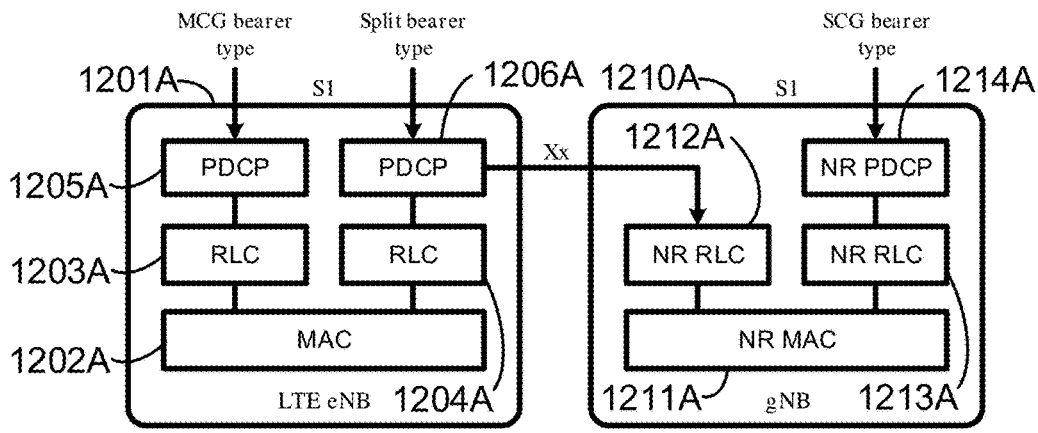
FIG. 12A Radio protocol architecture for split bearer and SCG bearer. LTE eNB connected to EPC with non-standalone gNB.
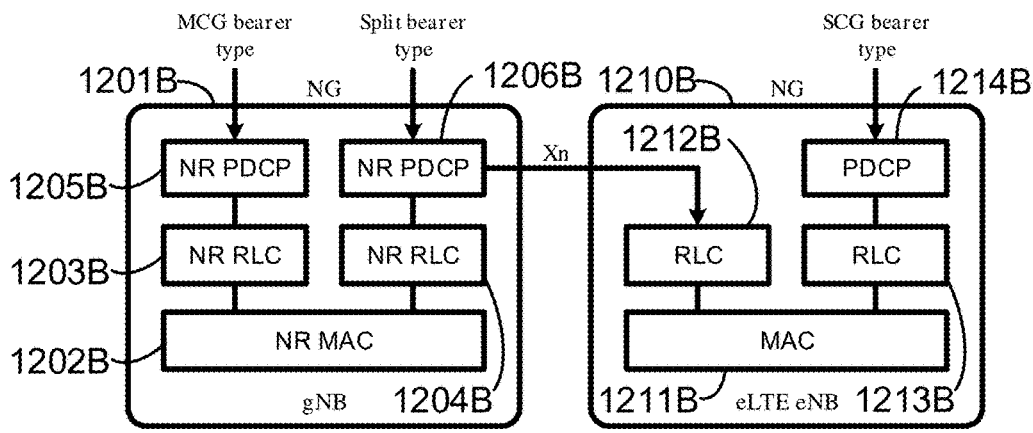
FIG. 12B Radio protocol architecture for split bearer and SCG bearer. gNB connected to NGC with non-standalone eLTE eNB.
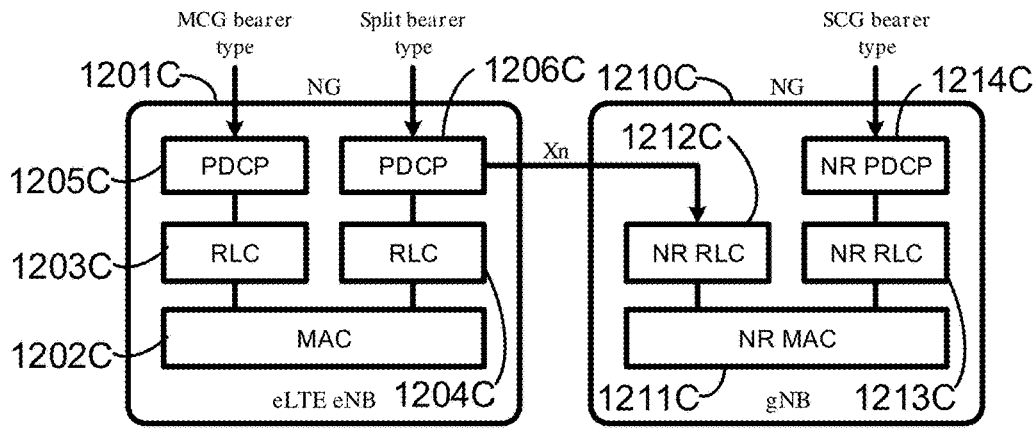
FIG. 12C Radio protocol architecture for split bearer and SCG bearer. eLTE eNB connected to NGC with non-standalone gNB.

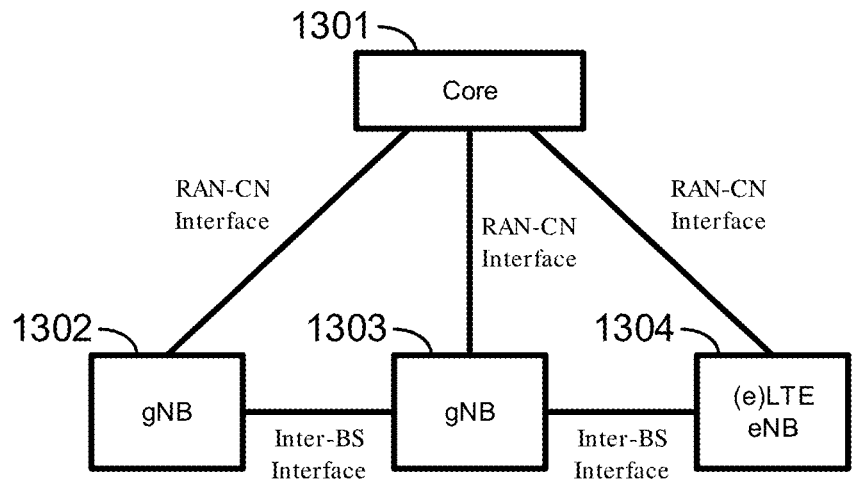
FIG. 13A Non-centralized deployment
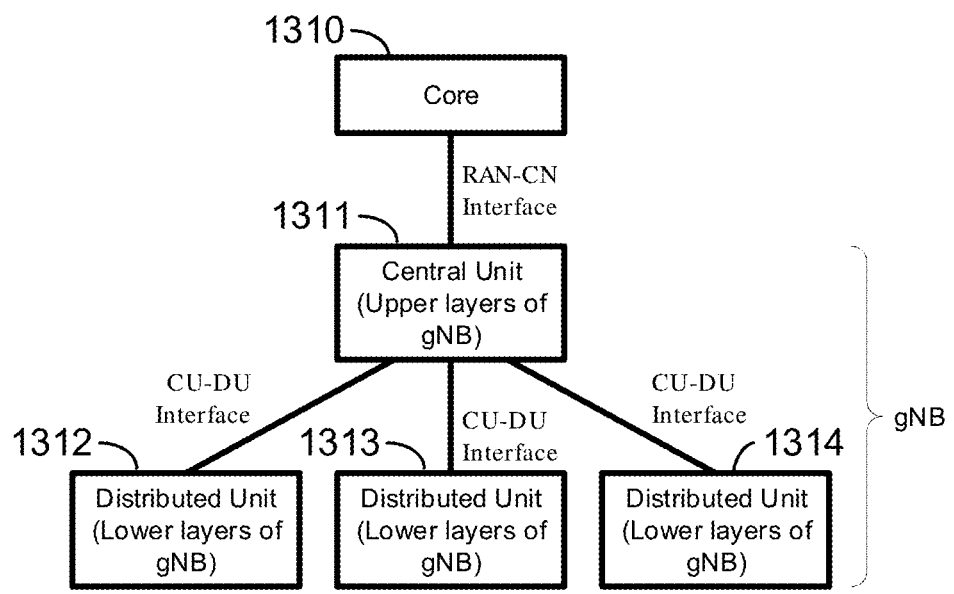
FIG. 13B Centralized deployment

BEAM FAILURE RECOVERY REQUEST TRANSMISSION

CROSS-REFERENCE TO RELATED APPLICATIONS

This application claims the benefit of U.S. Provisional Application No. 62/543,816, titled "BFR Request Transmission," which was filed on Aug. 10, 2017, and which is hereby incorporated by reference in its entirety.

BACKGROUND

In wireless communications, beam failure recovery may be used for determining a candidate beam upon a beam failure. If a beam failure is detected, difficulties may arise in determining a new beam in a timely and efficient manner.

SUMMARY

The following summary presents a simplified summary of certain features. The summary is not an extensive overview and is not intended to identify key or critical elements.

Systems, apparatuses, and methods are described for communications associated with beam failure recovery. A base station may determine a type of a beam failure recovery for a wireless device. The base station may transmit, to the wireless device, one or more messages comprising configuration parameters. The configuration parameters may comprise an indication of the type of a beam failure recovery for the wireless device. The wireless device may detect a beam failure. Based on the type of a beam failure, the wireless device may transmit a beam failure recovery request with or without an indication of one or more candidate beams.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 5A, FIG. 5B, FIG. 5C and FIG. 5D show examples for uplink and downlink signal transmission.

FIG. 10A and FIG. 10B show examples for interfaces between a 5G core network and base stations.

FIG. 11A, FIG. 11B, FIG. 11C, FIG. 11D, FIG. 11E, and FIG. 11F show examples for architectures of tight interworking between a 5G RAN and a long term evolution (LTE) radio access network (RAN).

FIG. 12A, FIG. 12B, and FIG. 12C show examples for radio protocol structures of tight interworking bearers.

FIG. 13A and FIG. 13B show examples for gNodeB (gNB) deployment.

DETAILED DESCRIPTION

Figure 1:
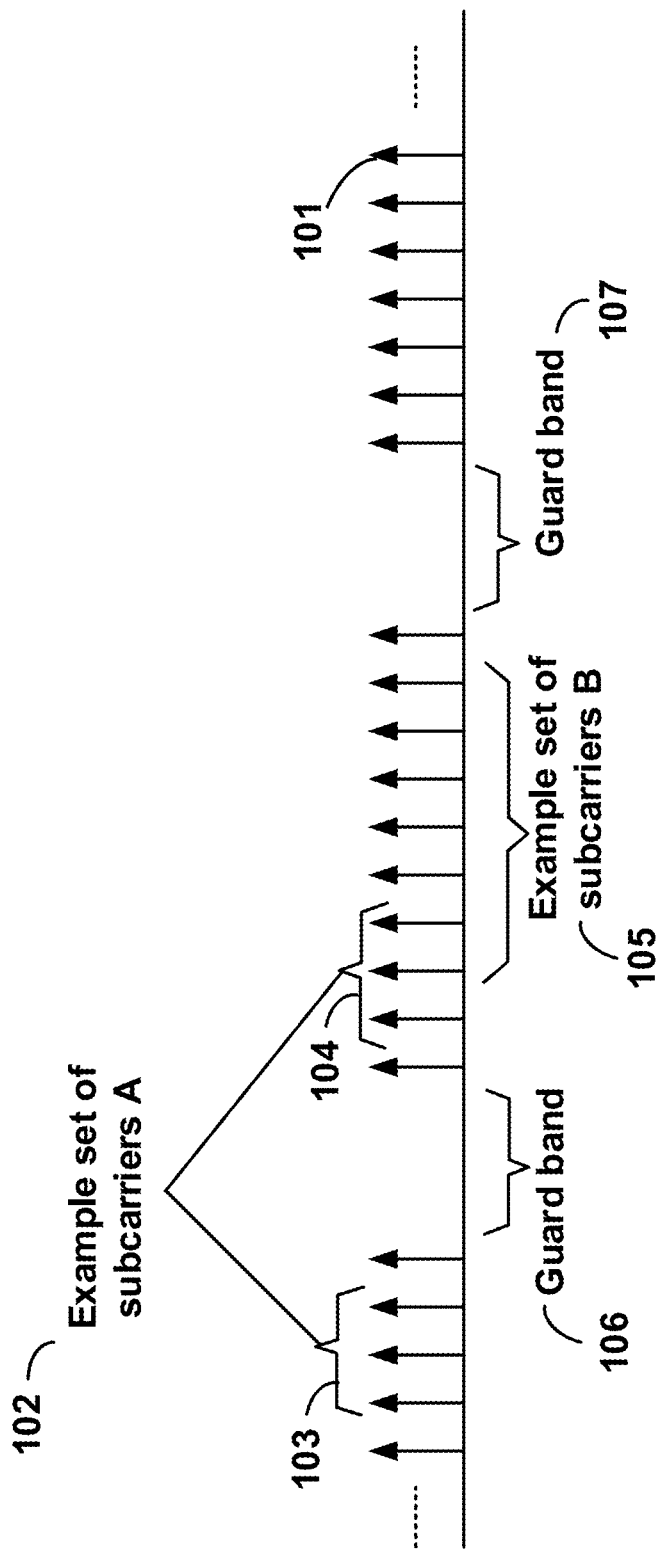
FIG. 1 shows example sets of orthogonal frequency division multiplexing (OFDM) subcarriers.

The accompanying drawings, which form a part hereof, show examples of the disclosure. It is to be understood that the examples shown in the drawings and/or discussed herein are non-exclusive and that there are other examples of how the disclosure may be practiced.

Examples may enable operation of carrier aggregation and may be employed in the technical field of multicarrier communication systems. Examples may relate to beam failure recovery in a multicarrier communication system.

The following acronyms are used throughout the present disclosure, provided below for convenience although other acronyms may be introduced in the detailed description:
3GPP 3rd Generation Partnership Project
5G 5th generation wireless systems
5GC 5G Core Network
ACK Acknowledgement
AMF Access and Mobility Management Function
ASIC application-specific integrated circuit
BFR beam failure recovery
BPSK binary phase shift keying
CA carrier aggregation
CC component carrier
CDMA code division multiple access
CP cyclic prefix
CPLD complex programmable logic devices
CSI channel state information
CSS common search space
CU central unit
DC dual connectivity
DCI downlink control information
DFTS-OFDM discrete fourier transform spreading OFDM
DL downlink
DU distributed unit
eLTE enhanced LTE
eMBB enhanced mobile broadband
eNB evolved Node B EPC evolved packet core
E-UTRAN evolved-universal terrestrial radio access network
FDD frequency division multiplexing
FPGA field programmable gate arrays
Fs-C Fs-control plane
Fs-U Fs-user plane
gNB next generation node B
HARQ hybrid automatic repeat request
HDL hardware description languages
ID identifier
IE information element
LTE long term evolution
MAC media access control
MCG master cell group
MeNB master evolved node B
MIB master information block
MME mobility management entity
mMTC massive machine type communications
NACK Negative Acknowledgement
NAS non-access stratum
NG CP next generation control plane core
NGC next generation core
NG-C NG-control plane
NG-U NG-user plane
NR MAC new radio MAC
NR PDCP new radio PDCP
NR PHY new radio physical
NR RLC new radio RLC
NR RRC new radio RRC
NR new radio
NSSAI network slice selection assistance information
OFDM orthogonal frequency division multiplexing
PCC primary component carrier
PCell primary cell
PDCCH physical downlink control channel
PDCP packet data convergence protocol
PDU packet data unit
PHICH physical HARQ indicator channel
PHY physical
PLMN public land mobile network
PSCell primary secondary cell
pTAG primary timing advance group
PUCCH physical uplink control channel
PUSCH physical uplink shared channel
QAM quadrature amplitude modulation
QPSK quadrature phase shift keying
RA random access
RACH random access channel
RAN radio access network
RAP random access preamble
RAR random access response
RB resource blocks
RBG resource block groups
RLC radio link control
RRC radio resource control
RRM radio resource management
RV redundancy version
SCC secondary component carrier
SCell secondary cell
SCG secondary cell group
SC-OFDM single carrier-OFDM
SDU service data unit
SeNB secondary evolved node B
SFN system frame number
S-GW serving gateway
SIB system information block
SC-OFDM single carrier orthogonal frequency division multiplexing
SRB signaling radio bearer
sTAG(s) secondary timing advance group(s)
TA timing advance
TAG timing advance group
TAI tracking area identifier
TAT time alignment timer
TDD time division duplexing
TDMA time division multiple access
TTI transmission time interval
TB transport block
UE user equipment
UL uplink
UPGW user plane gateway
URLLC ultra-reliable low-latency communications
VHDL VHSIC hardware description language
Xn-C Xn-control plane
Xn-U Xn-user plane
Xx-C Xx-control plane
Xx-U Xx-user plane Examples may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be used for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 shows example sets of OFDM subcarriers. As shown in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is shown as an example, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As shown in FIG. 1, guard band 106 is between subcarriers 103 and subcarriers 104. The example set of subcarriers A 102 includes subcarriers 103 and subcarriers 104. FIG. 1 also shows an example set of subcarriers B 105. As shown, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
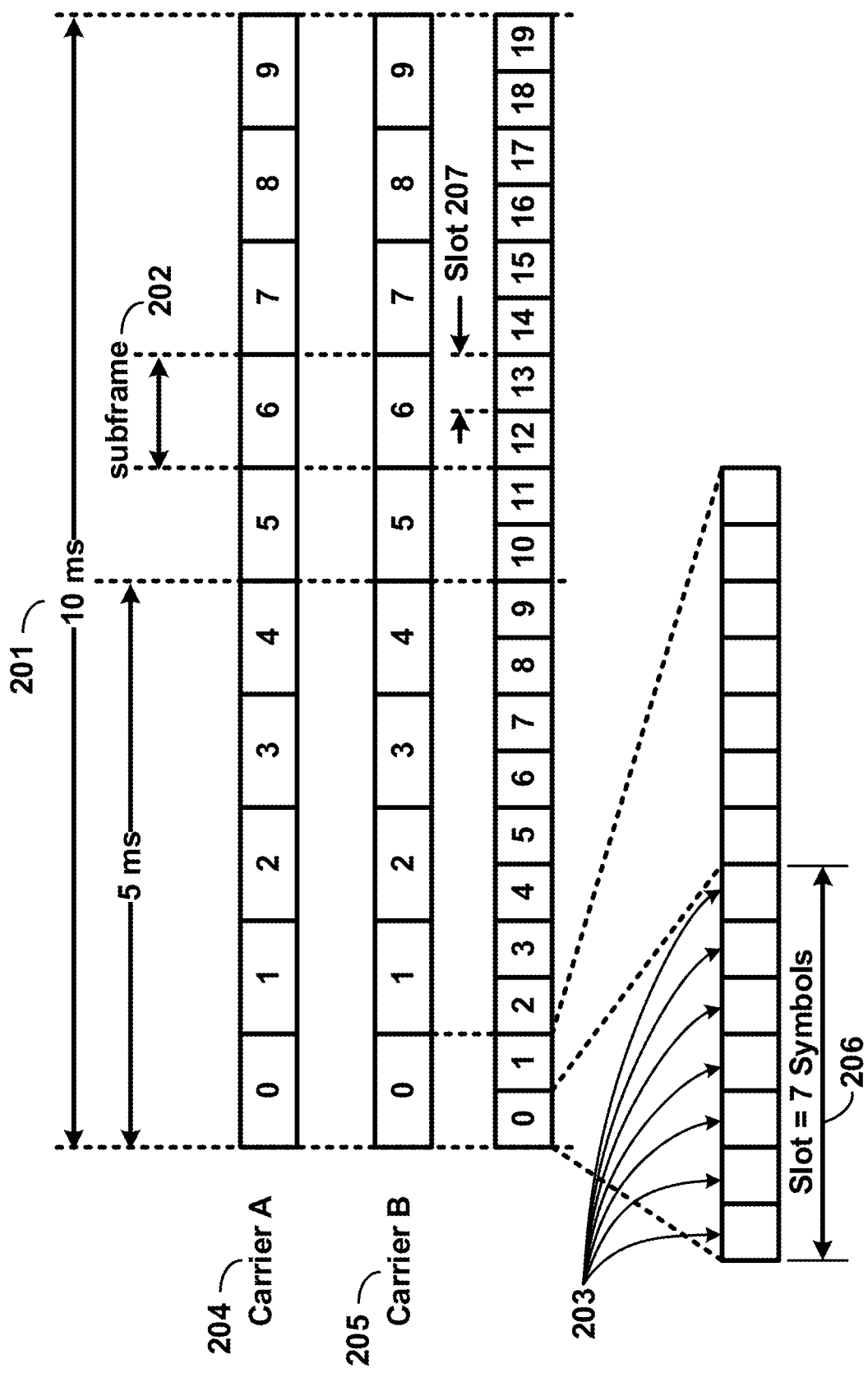
FIG. 2 shows example transmission time and reception time for two carriers in a carrier group.

FIG. 2 shows an example timing arrangement with transmission time and reception time for two carriers. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing.

Downlink and uplink transmissions may be organized into radio frames 201. In this example, radio frame duration is 10 milliseconds (msec). Other frame durations, for example, in the range of 1 to 100 msec may also be supported. In this example, each 10 msec radio frame 201 may be divided into ten equally sized subframes 202. Other subframe durations such as including 0.5 msec, 1 msec, 2 msec, and 5 msec may also be supported. Subframe(s) may consist of two or more slots (e.g., slots 206 and 207). For the example of FDD, 10 subframes may be available for downlink transmission and 10 subframes may be available for uplink transmissions in each 10 msec interval. Uplink and downlink transmissions may be separated in the frequency domain. A slot may be 7 or 14 OFDM symbols for the same subcarrier spacing of up to 60 kHz with normal CP. A slot may be 14 OFDM symbols for the same subcarrier spacing higher than 60 kHz with normal CP. A slot may include all downlink, all uplink, or a downlink part and an uplink part, and/or alike. Slot aggregation may be supported, e.g., data transmission may be scheduled to span one or multiple slots. For example, a mini-slot may start at an OFDM symbol in a subframe. A mini-slot may have a duration of one or more OFDM symbols. Slot(s) may include a plurality of OFDM symbols 203. The number of OFDM symbols 203 in a slot 206 may depend on the cyclic prefix length and subcarrier spacing.

Figure 3:
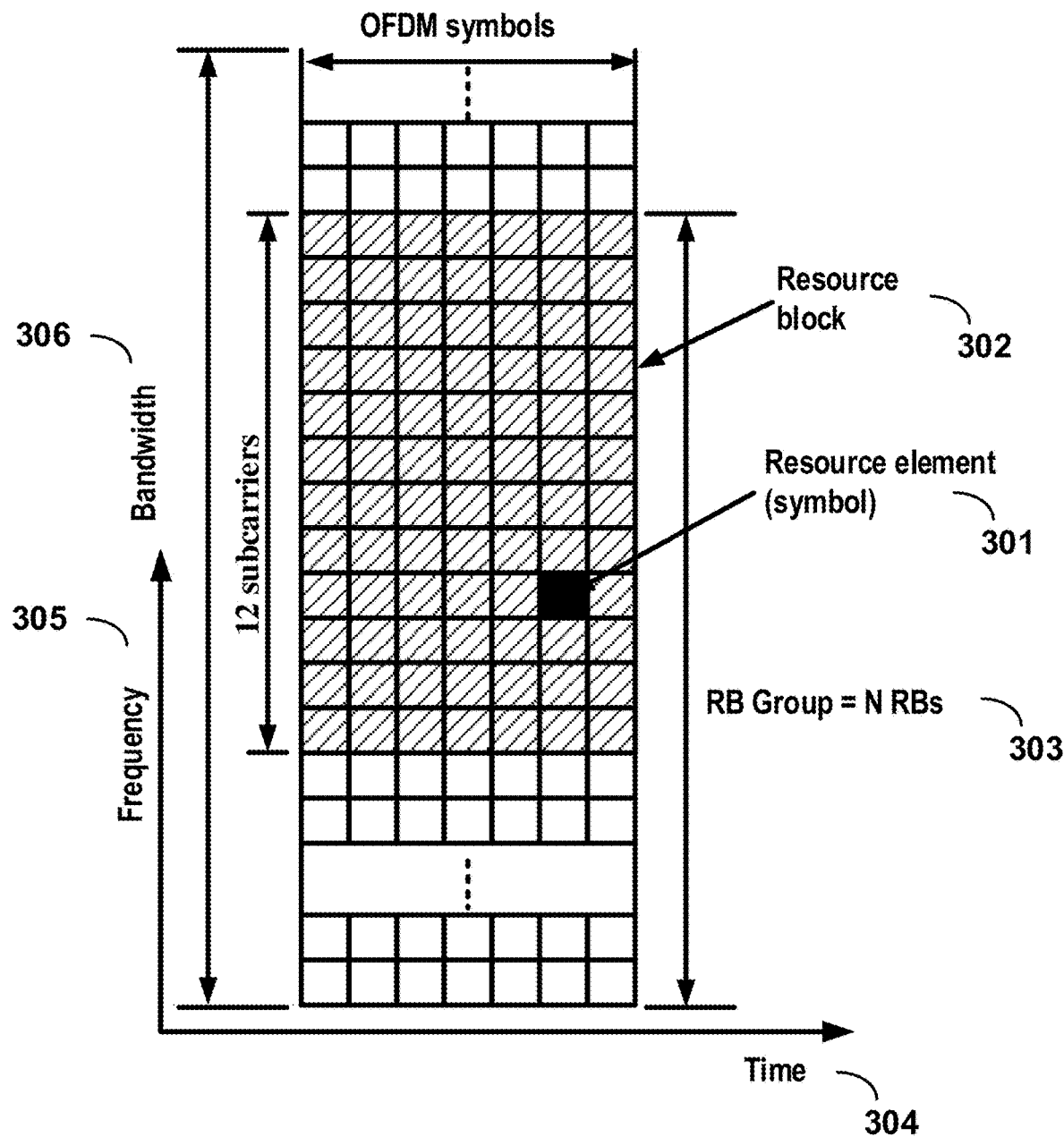
FIG. 3 shows example OFDM radio resources.

FIG. 3 shows an example of OFDM radio resources, including a resource grid structure in time 304 and frequency 305. The quantity of downlink subcarriers or RBs may depend, at least in part, on the downlink transmission bandwidth 306 configured in the cell. The smallest radio resource unit may be called a resource element (e.g., 301). Resource elements may be grouped into resource blocks (e.g., 302). Resource blocks may be grouped into larger radio resources called Resource Block Groups (RBG) (e.g., 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. A resource block may correspond to one slot in the time domain and 180 kHz in the frequency domain (for 15 kHz subcarrier bandwidth and 12 subcarriers).

Multiple numerologies may be supported. A numerology may be derived by scaling a basic subcarrier spacing by an integer N. Scalable numerology may allow at least from 15 kHz to 480 kHz subcarrier spacing. The numerology with 15 kHz and scaled numerology with different subcarrier spacing with the same CP overhead may align at a symbol boundary every 1 msec in a NR carrier.

Figure 4:
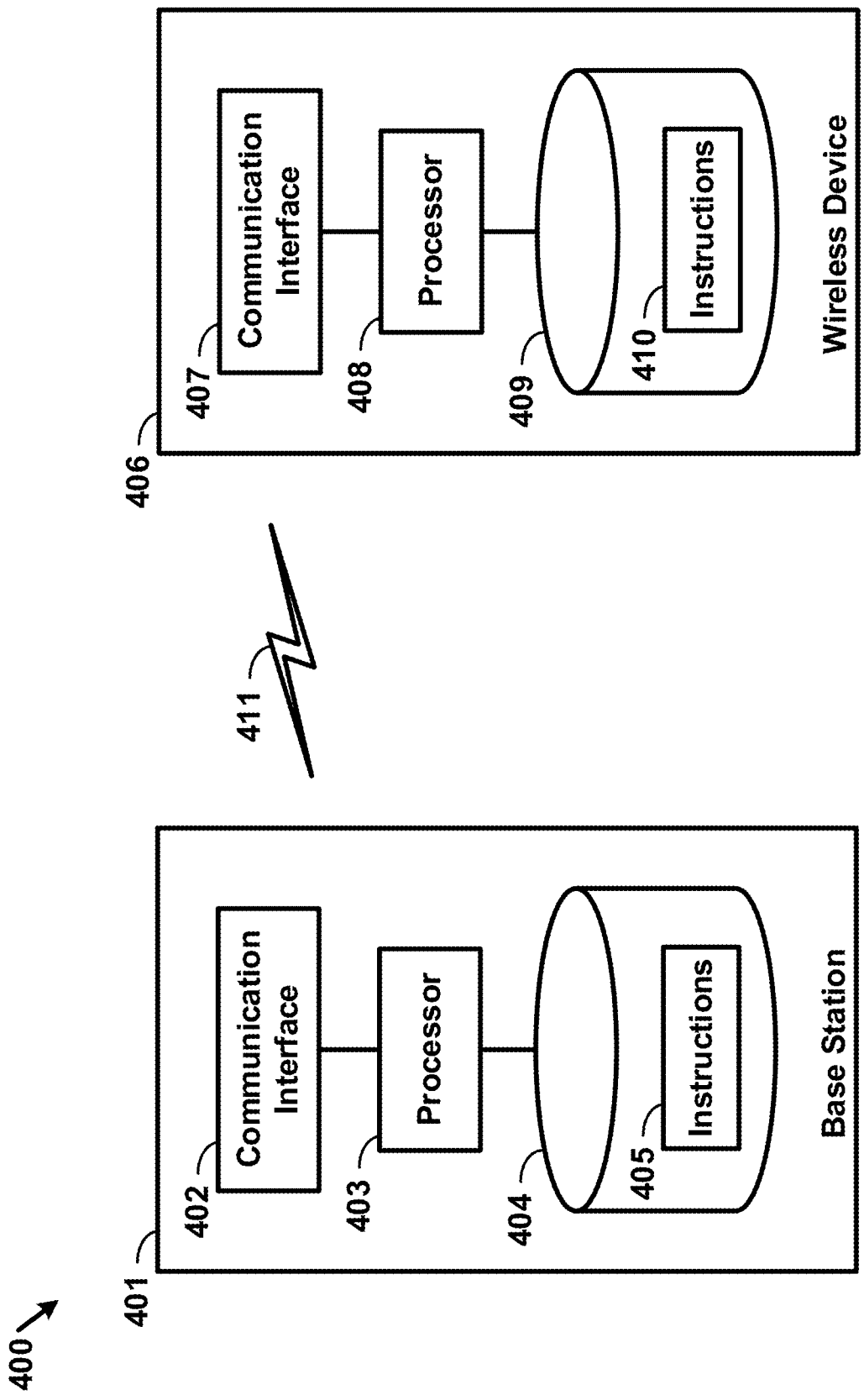
FIG. 4 shows hardware elements of a base station and a wireless device.

FIG. 4 shows hardware elements of a base station 401 and a wireless device 406. A communication network 400 may include at least one base station 401 and at least one wireless device 406. The base station 401 may include at least one communication interface 402, one or more processors 403, and at least one set of program code instructions 405 stored in non-transitory memory 404 and executable by the one or more processors 403. The wireless device 406 may include at least one communication interface 407, one or more processors 408, and at least one set of program code instructions 410 stored in non-transitory memory 409 and executable by the one or more processors 408. A communication interface 402 in the base station 401 may be configured to engage in communication with a communication interface 407 in the wireless device 406, such as via a communication path that includes at least one wireless link 411. The wireless link 411 may be a bi-directional link. The communication interface 407 in the wireless device 406 may also be configured to engage in communication with the communication interface 402 in the base station 401. The base station 401 and the wireless device 406 may be configured to send and receive data over the wireless link 411 using multiple frequency carriers. Base stations, wireless devices, and other communication devices may include structure and operations of transceiver(s). A transceiver is a device that includes both a transmitter and receiver. Transceivers may be employed in devices such as wireless devices, base stations, relay nodes, and/or the like. Examples for radio technology implemented in the communication interfaces 402, 407 and the wireless link 411 are shown in FIG. 1, FIG. 2, FIG. 3, FIG. 5, and associated text. The communication network 400 may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network 400, and any other network referenced herein, may comprise an LTE network, a 5G network, or any other network for wireless communications. Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network. As used throughout, the term "base station" may comprise one or more of: a base station, a node, a Node B, a gNB, an eNB, an ng-eNB, a relay node (e.g., an integrated access and backhaul (IAB) node), a donor node (e.g., a donor eNB, a donor gNB, etc.), an access point (e.g., a WiFi access point), a computing device, a device capable of wirelessly communicating, or any other device capable of sending and/or receiving signals. As used throughout, the term "wireless device" may comprise one or more of: a UE, a handset, a mobile device, a computing device, a node, a device capable of wirelessly communicating, or any other device capable of sending and/or receiving signals. Any reference to one or more of these terms/devices also considers use of any other term/device mentioned above.

The communications network 400 may comprise Radio Access Network (RAN) architecture. The RAN architecture may comprise one or more RAN nodes that may be a next generation Node B (gNB) (e.g., 401) providing New Radio (NR) user plane and control plane protocol terminations towards a first wireless device (e.g. 406). A RAN node may be a next generation evolved Node B (ng-eNB), providing Evolved UMTS Terrestrial Radio Access (E-UTRA) user plane and control plane protocol terminations towards a second wireless device. The first wireless device may communicate with a gNB over a Uu interface. The second wireless device may communicate with a ng-eNB over a Uu interface. Base station 401 may comprise one or more of a gNB, ng-eNB, and/or the like.

A gNB or an ng-eNB may host functions such as: radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of wireless devices in RRC_INACTIVE state, distribution function for Non-Access Stratum (NAS) messages, RAN sharing, and dual connectivity or tight interworking between NR and E-UTRA.

One or more gNBs and/or one or more ng-eNBs may be interconnected with each other by means of Xn interface. A gNB or an ng-eNB may be connected by means of NG interfaces to 5G Core Network (5GC). 5GC may comprise one or more AMF/User Plane Function (UPF) functions. A gNB or an ng-eNB may be connected to a UPF by means of an NG-User plane (NG-U) interface. The NG-U interface may provide delivery (e.g., non-guaranteed delivery) of user plane Protocol Data Units (PDUs) between a RAN node and the UPF. A gNB or an ng-eNB may be connected to an AMF by means of an NG-Control plane (e.g., NG-C) interface. The NG-C interface may provide functions such as NG interface management, UE context management, UE mobility management, transport of NAS messages, paging, PDU session management, configuration transfer or warning message transmission.

A UPF may host functions such as anchor point for intra-/inter-Radio Access Technology (RAT) mobility (if applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

An AMF may host functions such as NAS signaling termination, NAS signaling security, Access Stratum (AS) security control, inter Core Network (CN) node signaling for mobility between $3^{rd}$ Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or a non-operational state. Configured may also refer to specific settings in a device that effect the operational characteristics of the device whether the device is in an operational or a non-operational state. In other words, the hardware, software, firmware, registers, memory values, and/or the like may be "configured" within a device, whether the device is in an operational or a nonoperational state, to provide the device with specific characteristics. Terms such as "a control message to cause in a device" may mean that a control message has parameters that may be used to configure specific characteristics in the device, whether the device is in an operational or a non-operational state.

A 5G network may include a multitude of base stations, providing a user plane NR PDCP/NR RLC/NR MAC/NR PHY and control plane (NR RRC) protocol terminations towards the wireless device. The base station(s) may be interconnected with other base station(s) (e.g., employing an Xn interface). The base stations may also be connected employing, for example, an NG interface to an NGC. FIG. 10A and FIG. 10B show examples for interfaces between a 5G core network (e.g., NGC) and base stations (e.g., gNB and eLTE eNB). For example, the base stations may be interconnected to the NGC control plane (e.g., NG CP) employing the NG-C interface and to the NGC user plane (e.g., UPGW) employing the NG-U interface. The NG interface may support a many-to-many relation between 5G core networks and base stations.

A base station may include many sectors, for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g., TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC); in the uplink, the carrier corresponding to the PCell may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC); in the uplink, the carrier corresponding to an SCell may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or cell index may also identify the downlink carrier or uplink carrier of the cell (depending on the context in which it is used). The cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, reference to a first physical cell ID for a first downlink carrier may indicate that the first physical cell ID is for a cell comprising the first downlink carrier. The same concept may apply to, for example, carrier activation. Reference to a first carrier that is activated may indicate that the cell comprising the first carrier is activated.

A device may be configured to operate as needed by freely combining any of the examples. The disclosed mechanisms may be performed if certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. One or more criteria may be satisfied. It may be possible to implement examples that selectively implement disclosed protocols.

A base station may communicate with a variety of wireless devices. Wireless devices may support multiple technologies, and/or multiple releases of the same technology. Wireless devices may have some specific capability(ies) depending on its wireless device category and/or capability(ies). A base station may comprise multiple sectors. Reference to a base station communicating with a plurality of wireless devices may indicate that a base station may communicate with a subset of the total wireless devices in a coverage area. A plurality of wireless devices of a given LTE or 5G release, with a given capability and in a given sector of the base station, may be used. The plurality of wireless devices may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE or 5G technology.

A base station may transmit (e.g., to a wireless device) one or more messages (e.g. RRC messages) that may comprise a plurality of configuration parameters for one or more cells. One or more cells may comprise at least one primary cell and at least one secondary cell. An RRC message may be broadcasted or unicasted to the wireless device. Configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). The other SI may be transmitted via SystemInformationBlockType2. For a wireless device in an RRC_Connected state, dedicated RRC signaling may be employed for the request and delivery of the other SI. For the wireless device in the RRC_Idle state and/or the RRC_Inactive state, the request may trigger a random-access procedure.

A wireless device may send its radio access capability information which may be static. A base station may request what capabilities for a wireless device to report based on band information. If allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., static capabilities may be stored in 5GC).

If CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. If adding a new SCell, dedicated RRC signaling may be employed to send all required system information of the SCell. In connected mode, wireless devices may not need to acquire broadcasted system information directly from the SCells.

An RRC connection reconfiguration procedure may be used to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be used to establish (or reestablish, resume) an RRC connection. An RRC connection establishment procedure may comprise SRB1 establishment. The RRC connection establishment procedure may be used to transfer the initial NAS dedicated information message from a wireless device to E-UTRAN. The RRCConnectionReestablishment message may be used to re-establish SRB1.

A measurement report procedure may be to transfer measurement results from a wireless device to NG-RAN. The wireless device may initiate a measurement report procedure, e.g., after successful security activation. A measurement report message may be employed to transmit measurement results.

FIG. 5A, FIG. 5B, FIG. 5C, and FIG. 5D show examples of architecture for uplink and downlink signal transmission. FIG. 5A shows an example for an uplink physical channel. The baseband signal representing the physical uplink shared channel may be processed according to the following processes, which may be performed by structures described below. These structures and corresponding functions are shown as examples, however, it is anticipated that other structures and/or functions may be implemented in various examples. The structures and corresponding functions may comprise, e.g., one or more scrambling devices 501A and 501B configured to perform scrambling of coded bits in each of the codewords to be transmitted on a physical channel; one or more modulation mappers 502A and 502B configured to perform modulation of scrambled bits to generate complex-valued symbols; a layer mapper 503 configured to perform mapping of the complex-valued modulation symbols onto one or several transmission layers; one or more transform precoders 504A and 504B to generate complex-valued symbols; a precoding device 505 configured to perform precoding of the complex-valued symbols; one or more resource element mappers 506A and 506B configured to perform mapping of precoded complex-valued symbols to resource elements; one or more signal generators 507A and 507B configured to perform the generation of a complex-valued time-domain DFTS-OFDM/SC-FDMA signal for each antenna port; and/or the like.

FIG. 5B shows an example for performing modulation and up-conversion to the carrier frequency of the complex-valued DFTS-OFDM/SC-FDMA baseband signal, e.g., for each antenna port and/or for the complex-valued physical random access channel (PRACH) baseband signal. For example, the baseband signal, represented as $s_1(t)$, may be split, by a signal splitter 510, into real and imaginary components, $\text{Re}\{s_1(t)\}$ and $\text{Im}\{s_1(t)\}$, respectively. The real component may be modulated by a modulator 511A, and the imaginary component may be modulated by a modulator 511B. The output signal of the modulator 511A and the output signal of the modulator 511B may be mixed by a mixer 512. The output signal of the mixer 512 may be input to a filtering device 513, and filtering may be employed by the filtering device 513 prior to transmission.

FIG. 5C shows an example structure for downlink transmissions. The baseband signal representing a downlink physical channel may be processed by the following processes, which may be performed by structures described below. These structures and corresponding functions are shown as examples, however, it is anticipated that other structures and/or functions may be implemented in various examples. The structures and corresponding functions may comprise, e.g., one or more scrambling devices 531A and 531B configured to perform scrambling of coded bits in each of the codewords to be transmitted on a physical channel; one or more modulation mappers 532A and 532B configured to perform modulation of scrambled bits to generate complex-valued modulation symbols; a layer mapper 533 configured to perform mapping of the complex-valued modulation symbols onto one or several transmission layers; a precoding device 534 configured to perform precoding of the complex-valued modulation symbols on each layer for transmission on the antenna ports; one or more resource element mappers 535A and 535B configured to perform mapping of complex-valued modulation symbols for each antenna port to resource elements; one or more OFDM signal generators 536A and 536B configured to perform the generation of complex-valued time-domain OFDM signal for each antenna port; and/or the like.

FIG. 5D shows an example structure for modulation and up-conversion to the carrier frequency of the complex-valued OFDM baseband signal for each antenna port. For example, the baseband signal, represented as $s_1^{(p)}(t)$, may be split, by a signal splitter 520, into real and imaginary components, $\text{Re}\{s_1^{(p)}(t)\}$ and $\text{Im}\{s_1^{(p)}(t)\}$, respectively. The real component may be modulated by a modulator 521A, and the imaginary component may be modulated by a modulator 521B. The output signal of the modulator 521A and the output signal of the modulator 521B may be mixed by a mixer 522. The output signal of the mixer 522 may be input to a filtering device 523, and filtering may be employed by the filtering device 523 prior to transmission.

Figure 6:
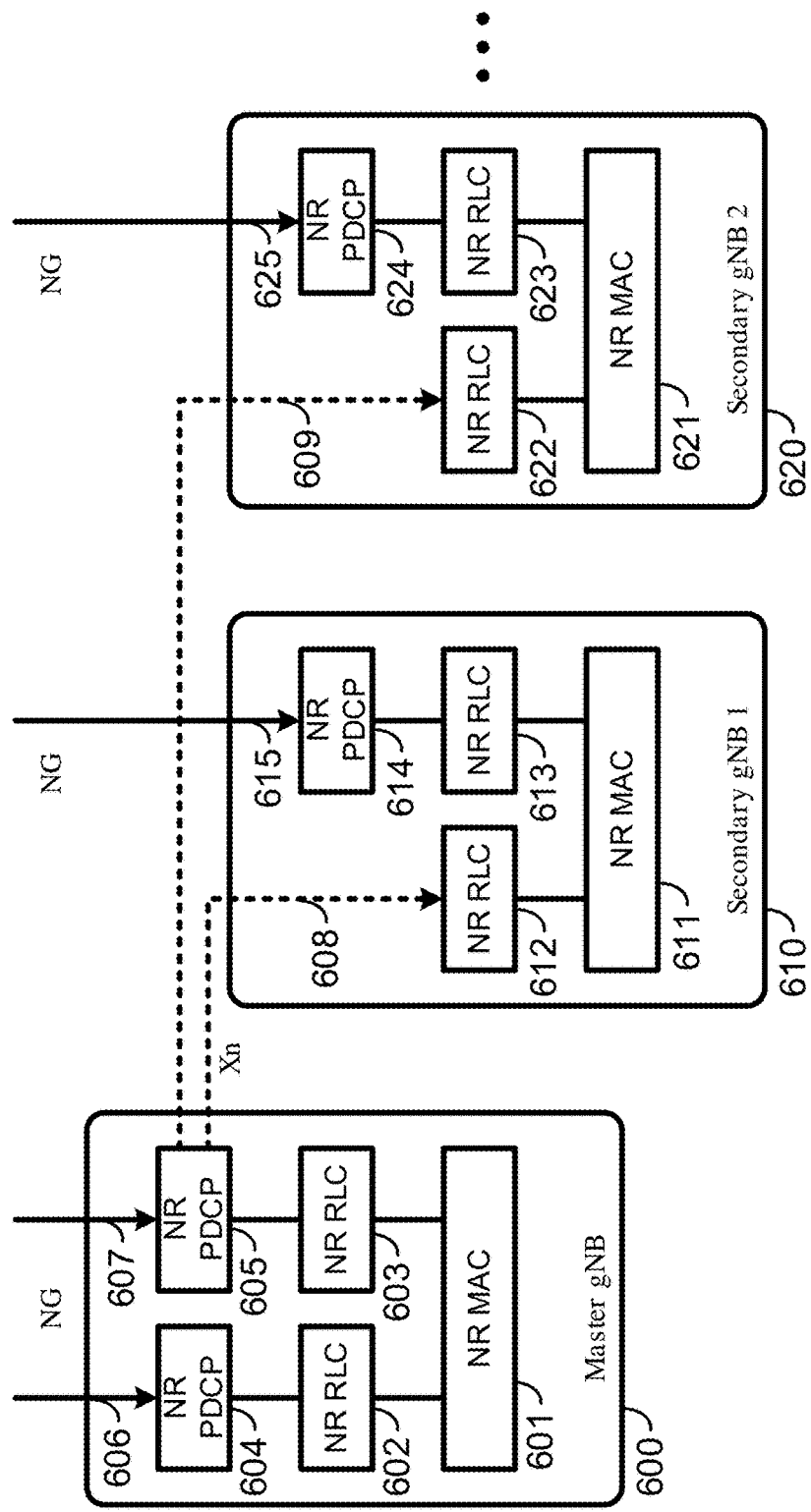
FIG. 6 shows an example protocol structure with multi-connectivity.
Figure 7:
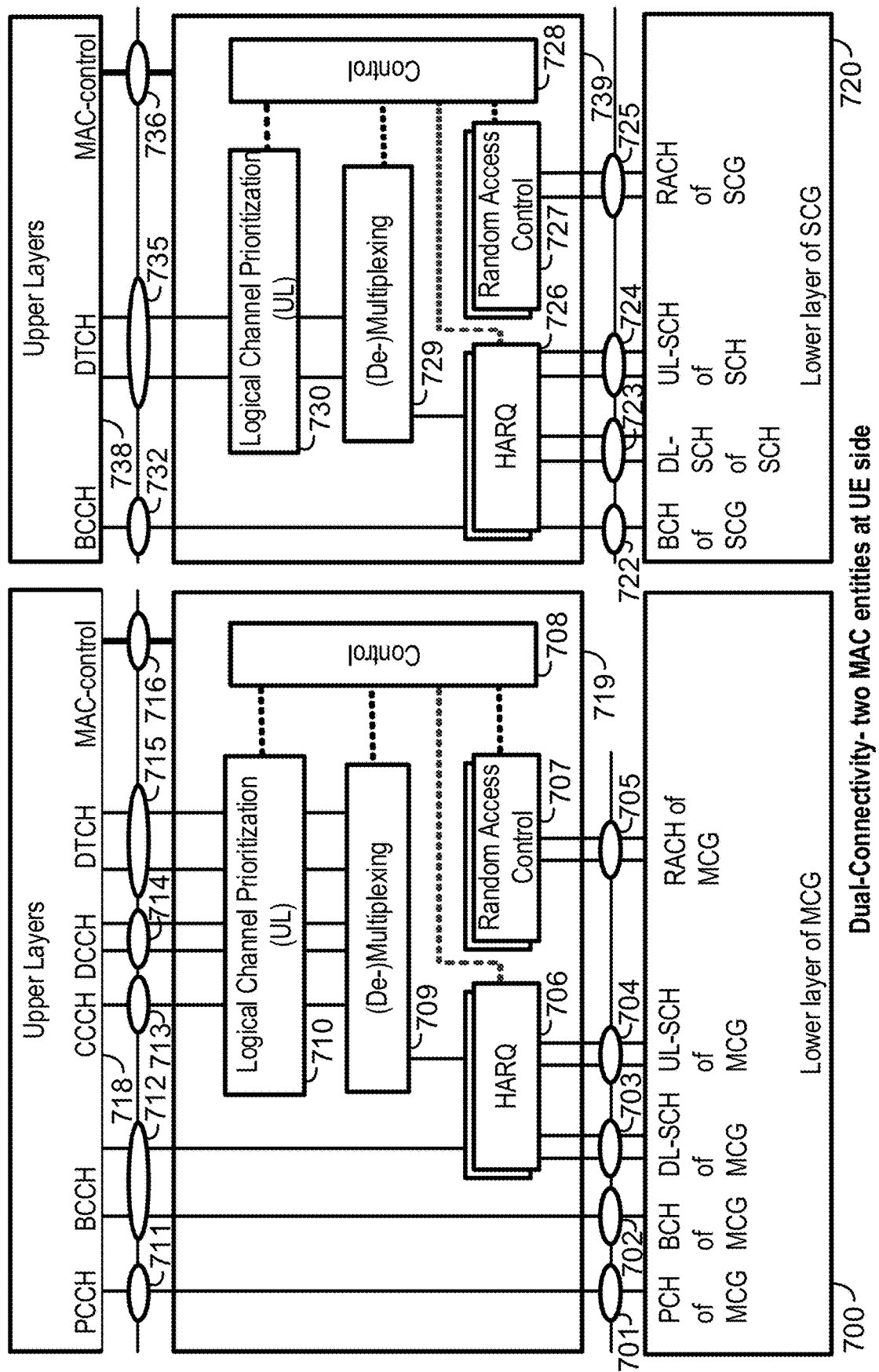
FIG. 7 shows an example protocol structure with carrier aggregation (CA) and dual connectivity (DC).

FIG. 6 and FIG. 7 show examples for protocol structures with CA and multi-connectivity. NR may support multi-connectivity operation, whereby a multiple receiver/transmitter (RX/TX) wireless device in RRC_CONNECTED may be configured to utilize radio resources provided by multiple schedulers located in multiple gNBs connected via a non-ideal or ideal backhaul over the Xn interface. gNBs involved in multi-connectivity for a certain wireless device may assume two different roles: a gNB may either act as a master gNB (e.g., 600) or as a secondary gNB (e.g., 610 or 620). In multi-connectivity, a wireless device may be connected to one master gNB (e.g., 600) and one or more secondary gNBs (e.g., 610 and/or 620). Any one or more of the Master gNB 600 and/or the secondary gNBs 610 and 620 may be a Next Generation (NG) NodeB. The master gNB 600 may comprise protocol layers NR MAC 601, NR RLC 602 and 603, and NR PDCP 604 and 605. The secondary gNB may comprise protocol layers NR MAC 611, NR RLC 612 and 613, and NR PDCP 614. The secondary gNB may comprise protocol layers NR MAC 621, NR RLC 622 and 623, and NR PDCP 624. The master gNB 600 may communicate via an interface 606 and/or via an interface 607, the secondary gNB 610 may communicate via an interface 615, and the secondary gNB 620 may communicate via an interface 625. The master gNB 600 may also communicate with the secondary gNB 610 and the secondary gNB 621 via interfaces 608 and 609, respectively, which may include Xn interfaces. For example, the master gNB 600 may communicate via the interface 608, at layer NR PDCP 605, and with the secondary gNB 610 at layer NR RLC 612. The master gNB 600 may communicate via the interface 609, at layer NR PDCP 605, and with the secondary gNB 620 at layer NR RLC 622.

FIG. 7 shows an example structure for the UE side MAC entities, e.g., if a Master Cell Group (MCG) and a Secondary Cell Group (SCG) are configured. Media Broadcast Multicast Service (MBMS) reception may be included but is not shown in this figure for simplicity.

In multi-connectivity, the radio protocol architecture that a particular bearer uses may depend on how the bearer is set up. As an example, three alternatives may exist, an MCG bearer, an SCG bearer, and a split bearer, such as shown in FIG. 6. NR RRC may be located in a master gNB and SRBs may be configured as a MCG bearer type and may use the radio resources of the master gNB. Multi-connectivity may have at least one bearer configured to use radio resources provided by the secondary gNB. Multi-connectivity may or may not be configured or implemented.

For multi-connectivity, the wireless device may be configured with multiple NR MAC entities: e.g., one NR MAC entity for a master gNB, and other NR MAC entities for secondary gNBs. In multi-connectivity, the configured set of serving cells for a wireless device may comprise two subsets: e.g., the Master Cell Group (MCG) including the serving cells of the master gNB, and the Secondary Cell Groups (SCGs) including the serving cells of the secondary gNBs.

At least one cell in a SCG may have a configured UL component carrier (CC) and one of the UL CCs, e.g., named PSCell (or PCell of SCG, or sometimes called PCell), may be configured with PUCCH resources. If the SCG is configured, there may be at least one SCG bearer or one split bearer. If a physical layer problem or a random access problem on a PSCell occurs or is detected, if the maximum number of NR RLC retransmissions has been reached associated with the SCG, or if an access problem on a PSCell during a SCG addition or a SCG change occurs or is detected, then an RRC connection re-establishment procedure may not be triggered, UL transmissions towards cells of the SCG may be stopped, a master gNB may be informed by the wireless device of a SCG failure type, and for a split bearer the DL data transfer over the master gNB may be maintained. The NR RLC Acknowledge Mode (AM) bearer may be configured for the split bearer. Like the PCell, a PSCell may not be de-activated. The PSCell may be changed with an SCG change (e.g., with a security key change and a RACH procedure). A direct bearer type may change between a split bearer and an SCG bearer, or a simultaneous configuration of an SCG and a split bearer may or may not be supported.

A master gNB and secondary gNBs may interact for multi-connectivity. The master gNB may maintain the RRM measurement configuration of the wireless device, and the master gNB may, (e.g., based on received measurement reports, and/or based on traffic conditions and/or bearer types), decide to ask a secondary gNB to provide additional resources (e.g., serving cells) for a wireless device. If a request from the master gNB is received, a secondary gNB may create a container that may result in the configuration of additional serving cells for the wireless device (or the secondary gNB decide that it has no resource available to do so). For wireless device capability coordination, the master gNB may provide some or all of the Active Set (AS) configuration and the wireless device capabilities to the secondary gNB. The master gNB and the secondary gNB may exchange information about a wireless device configuration, such as by employing NR RRC containers (e.g., inter-node messages) carried in Xn messages. The secondary gNB may initiate a reconfiguration of its existing serving cells (e.g., PUCCH towards the secondary gNB). The secondary gNB may decide which cell is the PSCell within the SCG. The master gNB may or may not change the content of the NR RRC configuration provided by the secondary gNB. In an SCG addition and an SCG SCell addition, the master gNB may provide the latest measurement results for the SCG cell(s). Both a master gNB and a secondary gNBs may know the system frame number (SFN) and subframe offset of each other by operations, administration, and maintenance (OAM) (e.g., for the purpose of discontinuous reception (DRX) alignment and identification of a measurement gap). If adding a new SCG SCell, dedicated NR RRC signaling may be used for sending required system information of the cell for CA, except, e.g., for the SFN acquired from an MIB of the PSCell of an SCG.

FIG. 7 shows an example of dual-connectivity (DC) for two MAC entities at a wireless device side. A first MAC entity may comprise a lower layer of an MCG 700, an upper layer of an MCG 718, and one or more intermediate layers of an MCG 719. The lower layer of the MCG 700 may comprise, e.g., a paging channel (PCH) 701, a broadcast channel (BCH) 702, a downlink shared channel (DL-SCH) 703, an uplink shared channel (UL-SCH) 704, and a random access channel (RACH) 705. The one or more intermediate layers of the MCG 719 may comprise, e.g., one or more hybrid automatic repeat request (HARQ) processes 706, one or more random access control processes 707, multiplexing and/or de-multiplexing processes 709, logical channel prioritization on the uplink processes 710, and a control processes 708 providing control for the above processes in the one or more intermediate layers of the MCG 719. The upper layer of the MCG 718 may comprise, e.g., a paging control channel (PCCH) 711, a broadcast control channel (BCCH) 712, a common control channel (CCCH) 713, a dedicated control channel (DCCH) 714, a dedicated traffic channel (DTCH) 715, and a MAC control 716.

A second MAC entity may comprise a lower layer of an SCG 720, an upper layer of an SCG 738, and one or more intermediate layers of an SCG 739. The lower layer of the SCG 720 may comprise, e.g., a BCH 722, a DL-SCH 723, an UL-SCH 724, and a RACH 725. The one or more intermediate layers of the SCG 739 may comprise, e.g., one or more HARQ processes 726, one or more random access control processes 727, multiplexing and/or de-multiplexing processes 729, logical channel prioritization on the uplink processes 730, and a control processes 728 providing control for the above processes in the one or more intermediate layers of the SCG 739. The upper layer of the SCG 738 may comprise, e.g., a BCCH 732, a DCCH 714, a DTCH 735, and a MAC control 736.

Serving cells may be grouped in a TA group (TAG). Serving cells in one TAG may use the same timing reference. For a given TAG, a wireless device may use at least one downlink carrier as a timing reference. For a given TAG, a wireless device may synchronize uplink subframe and frame transmission timing of uplink carriers belonging to the same TAG. Serving cells having an uplink to which the same TA applies may correspond to serving cells hosted by the same receiver. A wireless device supporting multiple TAs may support two or more TA groups. One TA group may include the PCell and may be called a primary TAG (pTAG). In a multiple TAG configuration, at least one TA group may not include the PCell and may be called a secondary TAG (sTAG). Carriers within the same TA group may use the same TA value and/or the same timing reference. If DC is configured, cells belonging to a cell group (e.g., MCG or SCG) may be grouped into multiple TAGs including a pTAG and one or more sTAGs.

Figure 8:
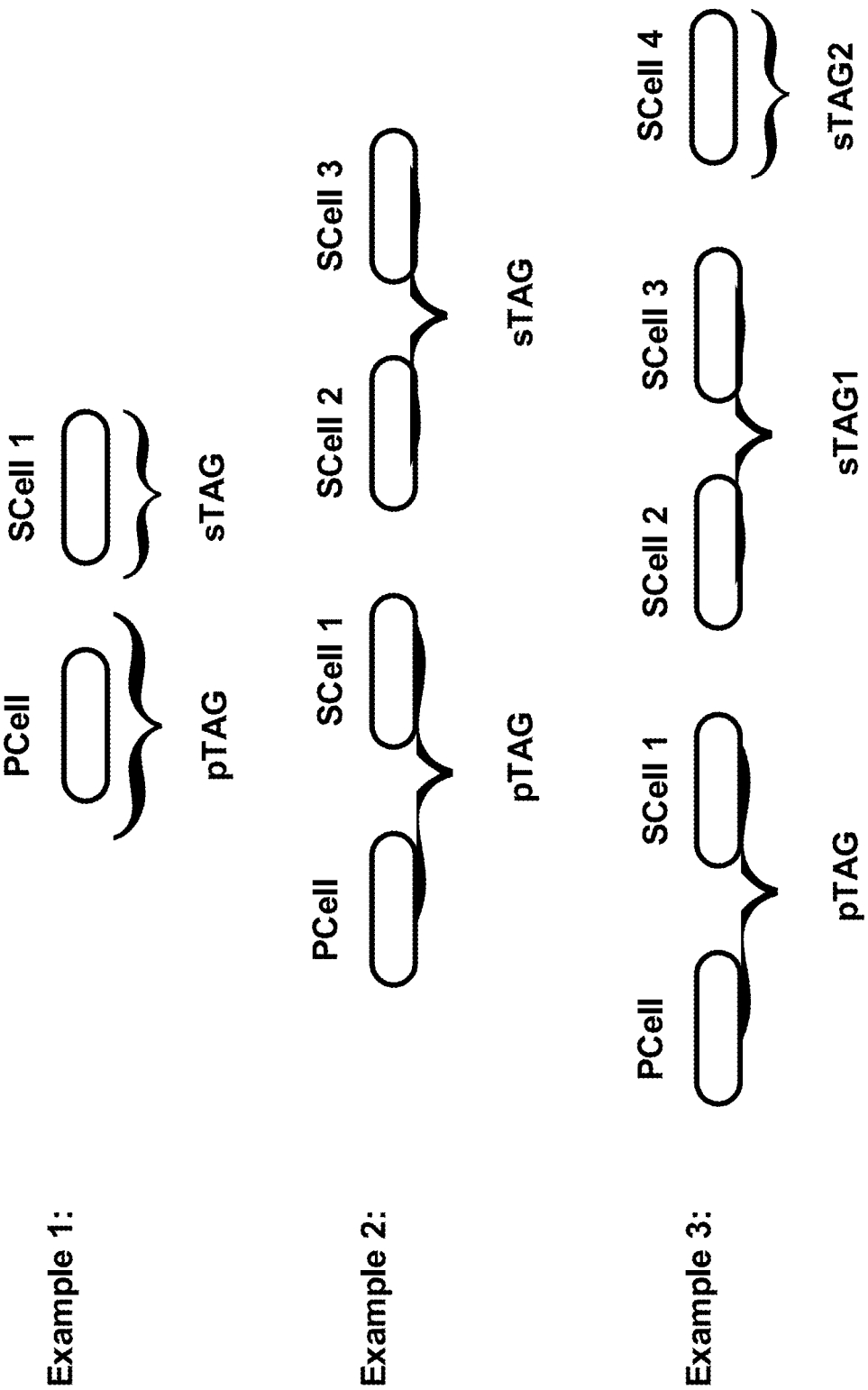
FIG. 8 shows example timing advance group (TAG) configurations.

FIG. 8 shows example TAG configurations. In Example 1, a pTAG comprises a PCell, and an sTAG comprises an SCell1. In Example 2, a pTAG comprises a PCell and an SCell1, and an sTAG comprises an SCell2 and an SCell3. In Example 3, a pTAG comprises a PCell and an SCell1, and an sTAG1 comprises an SCell2 and an SCell3, and an sTAG2 comprises a SCell4. Up to four TAGs may be supported in a cell group (MCG or SCG), and other example TAG configurations may also be provided. In various examples, structures and operations are described for use with a pTAG and an sTAG. Some of the examples may be used for configurations with multiple sTAGs.

An eNB may initiate an RA procedure, via a PDCCH order, for an activated SCell. The PDCCH order may be sent on a scheduling cell of this SCell. If cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
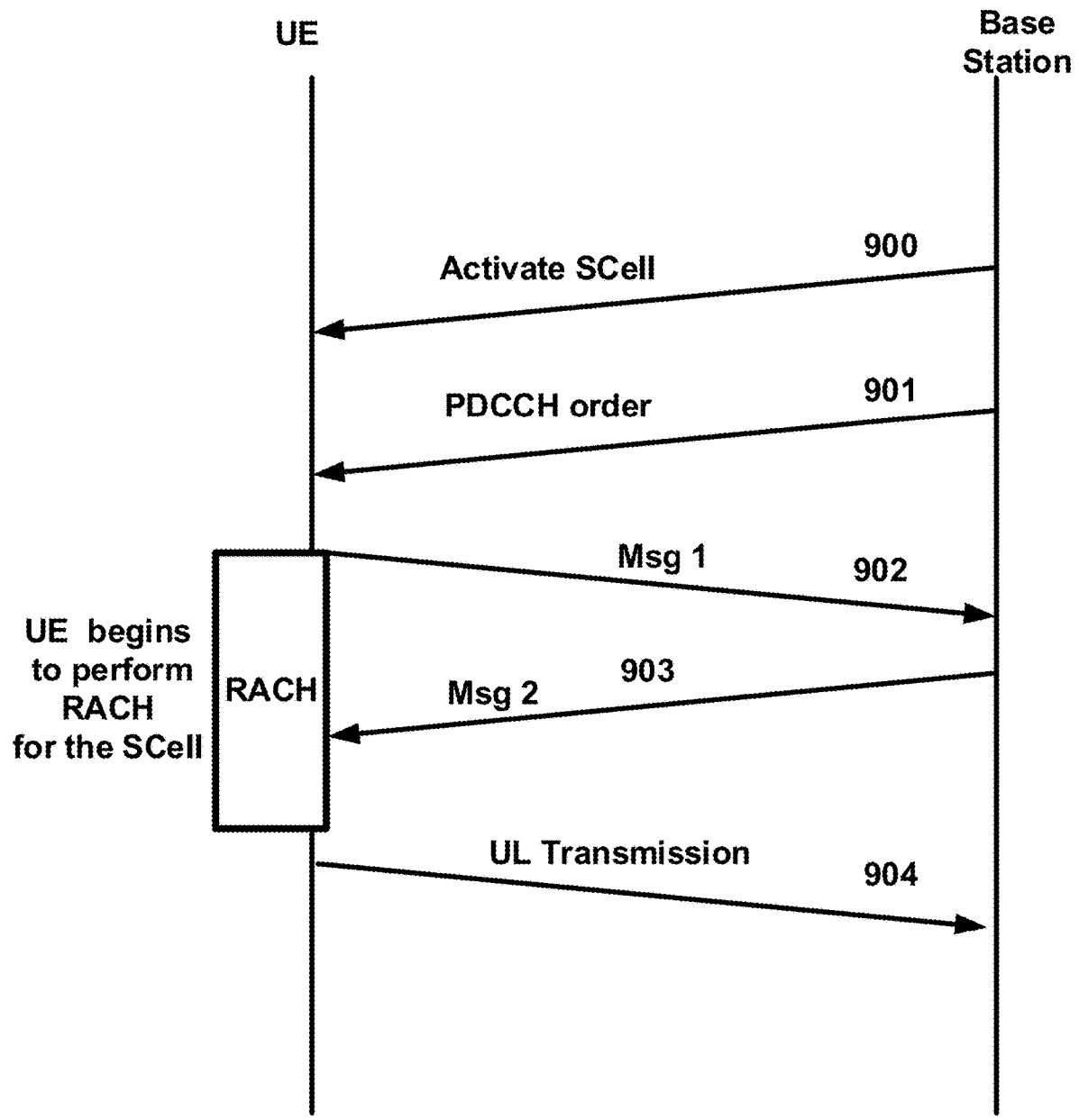
FIG. 9 shows example message flow in a random access process in a secondary TAG.

FIG. 9 shows an example of random access processes, and a corresponding message flow, in a secondary TAG. A base station, such as an eNB, may transmit an activation command 900 to a wireless device, such as a UE. The activation command 900 may be transmitted to activate an SCell. The base station may also transmit a PDDCH order 901 to the wireless device, which may be transmitted, e.g., after the activation command 900. The wireless device may begin to perform a RACH process for the SCell, which may be initiated, e.g., after receiving the PDDCH order 901. A wireless device may transmit to the base station (e.g., as part of a RACH process) a preamble 902 (e.g., Msg1), such as a random access preamble (RAP). The preamble 902 may be transmitted in response to the PDCCH order 901. The wireless device may transmit the preamble 902 via an SCell belonging to an sTAG. Preamble transmission for SCells may be controlled by a network using PDCCH format 1A. The base station may send a random access response (RAR) 903 (e.g., Msg2 message) to the wireless device. The RAR 903 may be in response to the preamble 902 transmission via the SCell. The RAR 903 may be addressed to a random access radio network temporary identifier (RA-RNTI) in a PCell common search space (CSS). If the wireless device receives the RAR 903, the RACH process may conclude. The RACH process may conclude, e.g., after or in response to the wireless device receiving the RAR 903 from the base station. After the RACH process, the wireless device may transmit an uplink transmission 904. The uplink transmission 904 may comprise uplink packets transmitted via the same SCell used for the preamble 902 transmission.

Initial timing alignment for communications between the wireless device and the base station may be performed through a random access procedure, such as described above regarding FIG. 9. The random access procedure may involve a wireless device, such as a UE, transmitting a random access preamble and a base station, such as an eNB, responding with an initial TA command NTA (amount of timing advance) within a random access response window. The start of the random access preamble may be aligned with the start of a corresponding uplink subframe at the wireless device assuming NTA=0. The eNB may estimate the uplink timing from the random access preamble transmitted by the wireless device. The TA command may be derived by the eNB based on the estimation of the difference between the desired UL timing and the actual UL timing. The wireless device may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. If an eNB performs an SCell addition configuration, the related TAG configuration may be configured for the SCell. An eNB may modify the TAG configuration of an SCell by removing (e.g., releasing) the SCell and adding (e.g., configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In some examples, it may not be possible to change the TAG associated with an SCell, but rather, the SCell may need to be removed and a new SCell may need to be added with another TAG. For example, if there is a need to move an SCell from an sTAG to a pTAG, at least one RRC message, such as at least one RRC reconfiguration message, may be sent to the wireless device. The at least one RRC message may be sent to the wireless device to reconfigure TAG configurations, e.g., by releasing the SCell and configuring the SCell as a part of the pTAG. If, e.g., an SCell is added or configured without a TAG index, the SCell may be explicitly assigned to the pTAG. The PCell may not change its TA group and may be a member of the pTAG.

In LTE Release-10 and Release-11 CA, a PUCCH transmission is only transmitted on a PCell (e.g., a PSCell) to an eNB. In LTE-Release 12 and earlier, a wireless device may transmit PUCCH information on one cell (e.g., a PCell or a PSCell) to a given eNB. As the number of CA capable wireless devices increase, and as the number of aggregated carriers increase, the number of PUCCHs and the PUCCH payload size may increase. Accommodating the PUCCH transmissions on the PCell may lead to a high PUCCH load on the PCell. A PUCCH on an SCell may be used to offload the PUCCH resource from the PCell. More than one PUCCH may be configured. For example, a PUCCH on a PCell may be configured and another PUCCH on an SCell may be configured. One, two, or more cells may be configured with PUCCH resources for transmitting CSI, acknowledgment (ACK), and/or non-acknowledgment (NACK) to a base station. Cells may be grouped into multiple PUCCH groups, and one or more cell within a group may be configured with a PUCCH. In some examples, one SCell may belong to one PUCCH group. SCells with a configured PUCCH transmitted to a base station may be called a PUCCH SCell, and a cell group with a common PUCCH resource transmitted to the same base station may be called a PUCCH group.

A MAC entity may have a configurable timer, e.g., timeAlignmentTimer, per TAG. The timeAlignmentTimer may be used to control how long the MAC entity considers the serving cells belonging to the associated TAG to be uplink time aligned. If a Timing Advance Command MAC control element is received, the MAC entity may apply the Timing Advance Command for the indicated TAG; and/or the MAC entity may start or restart the timeAlignmentTimer associated with a TAG that may be indicated by the Timing Advance Command MAC control element. If a Timing Advance Command is received in a Random Access Response message for a serving cell belonging to a TAG, the MAC entity may apply the Timing Advance Command for this TAG and/or start or restart the timeAlignmentTimer associated with this TAG. Additionally or alternatively, if the Random Access Preamble is not selected by the MAC entity, the MAC entity may apply the Timing Advance Command for this TAG and/or start or restart the timeAlignmentTimer associated with this TAG. If the timeAlignmentTimer associated with this TAG is not running, the Timing Advance Command for this TAG may be applied, and the timeAlignmentTimer associated with this TAG may be started. If the contention resolution is not successful, a timeAlignmentTimer associated with this TAG may be stopped. If the contention resolution is successful, the MAC entity may ignore the received Timing Advance Command. The MAC entity may determine whether the contention resolution is successful or whether the contention resolution is not successful.

FIG. 10A and FIG. 10B show examples for interfaces between a 5G core network (e.g., NGC) and base stations (e.g., gNB and eLTE eNB). A base station, such as a gNB 1020, may be interconnected to an NGC 1010 control plane employing an NG-C interface. The base station, e.g., the gNB 1020, may also be interconnected to an NGC 1010 user plane (e.g., UPGW) employing an NG-U interface. As another example, a base station, such as an eLTE eNB 1040, may be interconnected to an NGC 1030 control plane employing an NG-C interface. The base station, e.g., the eLTE eNB 1040, may also be interconnected to an NGC 1030 user plane (e.g., UPGW) employing an NG-U interface. An NG interface may support a many-to-many relation between 5G core networks and base stations.

FIG. 11A, FIG. 11B, FIG. 11C, FIG. 11D, FIG. 11E, and FIG. 11F are examples for architectures of tight interworking between a 5G RAN and an LTE RAN. The tight interworking may enable a multiple receiver/transmitter (RX/TX) wireless device in an RRC_CONNECTED state to be configured to utilize radio resources provided by two schedulers located in two base stations (e.g., an eLTE eNB and a gNB). The two base stations may be connected via a non-ideal or ideal backhaul over the Xx interface between an LTE eNB and a gNB, or over the Xn interface between an eLTE eNB and a gNB. Base stations involved in tight interworking for a certain wireless device may assume different roles. For example, a base station may act as a master base station or a base station may act as a secondary base station. In tight interworking, a wireless device may be connected to both a master base station and a secondary base station. Mechanisms implemented in tight interworking may be extended to cover more than two base stations.

A master base station may be an LTE eNB 1102A or an LTE eNB 1102B, which may be connected to EPC nodes 1101A or 1101B, respectively. This connection to EPC nodes may be, e.g., to an MME via the S1-C interface and/or to an S-GW via the S1-U interface. A secondary base station may be a gNB 1103A or a gNB 1103B, either or both of which may be a non-standalone node having a control plane connection via an Xx-C interface to an LTE eNB (e.g., the LTE eNB 1102A or the LTE eNB 1102B). In the tight interworking architecture of FIG. 11A, a user plane for a gNB (e.g., the gNB 1103A) may be connected to an S-GW (e.g., the EPC 1101A) through an LTE eNB (e.g., the LTE eNB 1102A), via an Xx-U interface between the LTE eNB and the gNB, and via an S1-U interface between the LTE eNB and the S-GW. In the architecture of FIG. 11B, a user plane for a gNB (e.g., the gNB 1103B) may be connected directly to an S-GW (e.g., the EPC 1101B) via an S1-U interface between the gNB and the S-GW.

A master base station may be a gNB 1103C or a gNB 1103D, which may be connected to NGC nodes 1101C or 1101D, respectively. This connection to NGC nodes may be, e.g., to a control plane core node via the NG-C interface and/or to a user plane core node via the NG-U interface. A secondary base station may be an eLTE eNB 1102C or an eLTE eNB 1102D, either or both of which may be a non-standalone node having a control plane connection via an Xn-C interface to a gNB (e.g., the gNB 1103C or the gNB 1103D). In the tight interworking architecture of FIG. 11C, a user plane for an eLTE eNB (e.g., the eLTE eNB 1102C) may be connected to a user plane core node (e.g., the NGC 1101C) through a gNB (e.g., the gNB 1103C), via an Xn-U interface between the eLTE eNB and the gNB, and via an NG-U interface between the gNB and the user plane core node. In the architecture of FIG. 11D, a user plane for an eLTE eNB (e.g., the eLTE eNB 1102D) may be connected directly to a user plane core node (e.g., the NGC 1101D) via an NG-U interface between the eLTE eNB and the user plane core node.

A master base station may be an eLTE eNB 1102E or an eLTE eNB 1102F, which may be connected to NGC nodes 1101E or 1101F, respectively. This connection to NGC nodes may be, e.g., to a control plane core node via the NG-C interface and/or to a user plane core node via the NG-U interface. A secondary base station may be a gNB 1103E or a gNB 1103F, either or both of which may be a non-standalone node having a control plane connection via an Xn-C interface to an eLTE eNB (e.g., the eLTE eNB 1102E or the eLTE eNB 1102F). In the tight interworking architecture of FIG. 11E, a user plane for a gNB (e.g., the gNB 1103E) may be connected to a user plane core node (e.g., the NGC 1101E) through an eLTE eNB (e.g., the eLTE eNB 1102E), via an Xn-U interface between the eLTE eNB and the gNB, and via an NG-U interface between the eLTE eNB and the user plane core node. In the architecture of FIG. 11F, a user plane for a gNB (e.g., the gNB 1103F) may be connected directly to a user plane core node (e.g., the NGC 1101F) via an NG-U interface between the gNB and the user plane core node.

FIG. 12A, FIG. 12B, and FIG. 12C are examples for radio protocol structures of tight interworking bearers.

An LTE eNB 1201A may be an S1 master base station, and a gNB 1210A may be an S1 secondary base station. An example for a radio protocol architecture for a split bearer and an SCG bearer is shown. The LTE eNB 1201A may be connected to an EPC with a non-standalone gNB 1210A, via an Xx interface between the PDCP 1206A and an NR RLC 1212A. The LTE eNB 1201A may include protocol layers MAC 1202A, RLC 1203A and RLC 1204A, and PDCP 1205A and PDCP 1206A. An MCG bearer type may interface with the PDCP 1205A, and a split bearer type may interface with the PDCP 1206A. The gNB 1210A may include protocol layers NR MAC 1211A, NR RLC 1212A and NR RLC 1213A, and NR PDCP 1214A. An SCG bearer type may interface with the NR PDCP 1214A.

A gNB 1201B may be an NG master base station, and an eLTE eNB 1210B may be an NG secondary base station. An example for a radio protocol architecture for a split bearer and an SCG bearer is shown. The gNB 1201B may be connected to an NGC with a non-standalone eLTE eNB 1210B, via an Xn interface between the NR PDCP 1206B and an RLC 1212B. The gNB 1201B may include protocol layers NR MAC 1202B, NR RLC 1203B and NR RLC 1204B, and NR PDCP 1205B and NR PDCP 1206B. An MCG bearer type may interface with the NR PDCP 1205B, and a split bearer type may interface with the NR PDCP 1206B. The eLTE eNB 1210B may include protocol layers MAC 1211B, RLC 1212B and RLC 1213B, and PDCP 1214B. An SCG bearer type may interface with the PDCP 1214B.

An eLTE eNB 1201C may be an NG master base station, and a gNB 1210C may be an NG secondary base station. An example for a radio protocol architecture for a split bearer and an SCG bearer is shown. The eLTE eNB 1201C may be connected to an NGC with a non-standalone gNB 1210C, via an Xn interface between the PDCP 1206C and an NR RLC 1212C. The eLTE eNB 1201C may include protocol layers MAC 1202C, RLC 1203C and RLC 1204C, and PDCP 1205C and PDCP 1206C. An MCG bearer type may interface with the PDCP 1205C, and a split bearer type may interface with the PDCP 1206C. The gNB 1210C may include protocol layers NR MAC 1211C, NR RLC 1212C and NR RLC 1213C, and NR PDCP 1214C. An SCG bearer type may interface with the NR PDCP 1214C.

In a 5G network, the radio protocol architecture that a particular bearer uses may depend on how the bearer is setup. At least three alternatives may exist, e.g., an MCG bearer, an SCG bearer, and a split bearer, such as shown in FIG. 12A, FIG. 12B, and FIG. 12C. The NR RRC may be located in a master base station, and the SRBs may be configured as an MCG bearer type and may use the radio resources of the master base station. Tight interworking may have at least one bearer configured to use radio resources provided by the secondary base station. Tight interworking may or may not be configured or implemented.

The wireless device may be configured with two MAC entities: e.g., one MAC entity for a master base station, and one MAC entity for a secondary base station. In tight interworking, the configured set of serving cells for a wireless device may comprise of two subsets: e.g., the Master Cell Group (MCG) including the serving cells of the master base station, and the Secondary Cell Group (SCG) including the serving cells of the secondary base station.

At least one cell in a SCG may have a configured UL CC and one of them, e.g., a PSCell (or the PCell of the SCG, which may also be called a PCell), is configured with PUCCH resources. If the SCG is configured, there may be at least one SCG bearer or one split bearer. If one or more of a physical layer problem or a random access problem is detected on a PSCell, if the maximum number of (NR) RLC retransmissions associated with the SCG has been reached, and/or if an access problem on a PSCell during an SCG addition or during an SCG change is detected, then: an RRC connection re-establishment procedure may not be triggered, UL transmissions towards cells of the SCG may be stopped, a master base station may be informed by the wireless device of a SCG failure type, and/or for a split bearer the DL data transfer over the master base station may be maintained. The RLC AM bearer may be configured for the split bearer. Like the PCell, a PSCell may not be de-activated. A PSCell may be changed with an SCG change, e.g., with security key change and a RACH procedure. A direct bearer type change, between a split bearer and an SCG bearer, may not be supported. Simultaneous configuration of an SCG and a split bearer may not be supported.

A master base station and a secondary base station may interact. The master base station may maintain the RRM measurement configuration of the wireless device. The master base station may determine to ask a secondary base station to provide additional resources (e.g., serving cells) for a wireless device. This determination may be based on, e.g., received measurement reports, traffic conditions, and/or bearer types. If a request from the master base station is received, a secondary base station may create a container that may result in the configuration of additional serving cells for the wireless device, or the secondary base station may determine that it has no resource available to do so. The master base station may provide at least part of the AS configuration and the wireless device capabilities to the secondary base station, e.g., for wireless device capability coordination. The master base station and the secondary base station may exchange information about a wireless device configuration such as by using RRC containers (e.g., inter-node messages) carried in Xn or Xx messages. The secondary base station may initiate a reconfiguration of its existing serving cells (e.g., PUCCH towards the secondary base station). The secondary base station may determine which cell is the PSCell within the SCG. The master base station may not change the content of the RRC configuration provided by the secondary base station. If an SCG is added and/or an SCG SCell is added, the master base station may provide the latest measurement results for the SCG cell(s). Either or both of a master base station and a secondary base station may know the SFN and subframe offset of each other by OAM, (e.g., for the purpose of DRX alignment and identification of a measurement gap). If a new SCG SCell is added, dedicated RRC signaling may be used for sending required system information of the cell, such as for CA, except, e.g., for the SFN acquired from an MIB of the PSCell of an SCG.

FIG. 13A and FIG. 13B show examples for gNB deployment. A core 1301 and a core 1310 may interface with other nodes via RAN-CN interfaces. In a non-centralized deployment example, the full protocol stack (e.g., NR RRC, NR PDCP, NR RLC, NR MAC, and NR PHY) may be supported at one node, such as a gNB 1302, a gNB 1303, and/or an eLTE eNB or LTE eNB 1304. These nodes (e.g., the gNB 1302, the gNB 1303, and the eLTE eNB or LTE eNB 1304) may interface with one of more of each other via a respective inter-BS interface. In a centralized deployment example, upper layers of a gNB may be located in a Central Unit (CU) 1311, and lower layers of the gNB may be located in Distributed Units (DU) 1312, 1313, and 1314. The CU-DU interface (e.g., Fs interface) connecting CU 1311 and DUs 1312, 1312, and 1314 may be ideal or non-ideal. The Fs-C may provide a control plane connection over the Fs interface, and the Fs-U may provide a user plane connection over the Fs interface. In the centralized deployment, different functional split options between the CU 1311 and the DUs 1312, 1313, and 1314 may be possible by locating different protocol layers (e.g., RAN functions) in the CU 1311 and in the DU 1312, 1313, and 1314. The functional split may support flexibility to move the RAN functions between the CU 1311 and the DUs 1312, 1313, and 1314 depending on service requirements and/or network environments. The functional split option may change during operation (e.g., after the Fs interface setup procedure), or the functional split option may change only in the Fs setup procedure (e.g., the functional split option may be static during operation after Fs setup procedure).

Figure 14:
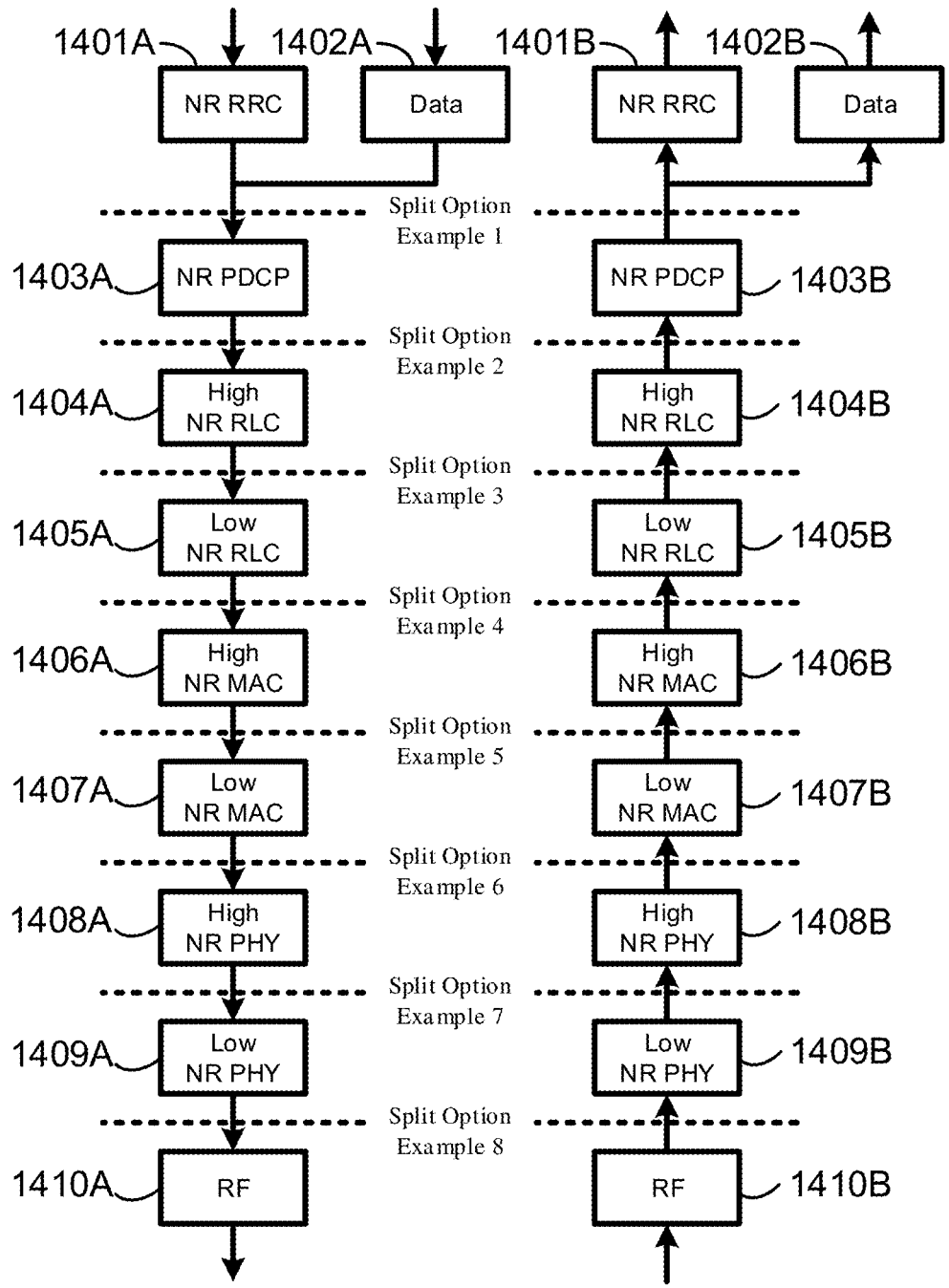
FIG. 14 shows functional split option examples of a centralized gNB deployment.

FIG. 14 shows examples for different functional split options of a centralized gNB deployment. Element numerals that are followed by "A" or "B" designations in FIG. 14 may represent the same elements in different traffic flows, e.g., either receiving data (e.g., data 1402A) or sending data (e.g., 1402B). In the split option example 1, an NR RRC 1401 may be in a CU, and an NR PDCP 1403, an NR RLC (e.g., comprising a High NR RLC 1404 and/or a Low NR RLC 1405), an NR MAC (e.g., comprising a High NR MAC 1406 and/or a Low NR MAC 1407), an NR PHY (e.g., comprising a High NR PHY 1408 and/or a LOW NR PHY 1409), and an RF 1410 may be in a DU. In the split option example 2, the NR RRC 1401 and the NR PDCP 1403 may be in a CU, and the NR RLC, the NR MAC, the NR PHY, and the RF 1410 may be in a DU. In the split option example 3, the NR RRC 1401, the NR PDCP 1403, and a partial function of the NR RLC (e.g., the High NR RLC 1404) may be in a CU, and the other partial function of the NR RLC (e.g., the Low NR RLC 1405), the NR MAC, the NR PHY, and the RF 1410 may be in a DU. In the split option example 4, the NR RRC 1401, the NR PDCP 1403, and the NR RLC may be in a CU, and the NR MAC, the NR PHY, and the RF 1410 may be in a DU. In the split option example 5, the NR RRC 1401, the NR PDCP 1403, the NR RLC, and a partial function of the NR MAC (e.g., the High NR MAC 1406) may be in a CU, and the other partial function of the NR MAC (e.g., the Low NR MAC 1407), the NR PHY, and the RF 1410 may be in a DU. In the split option example 6, the NR RRC 1401, the NR PDCP 1403, the NR RLC, and the NR MAC may be in CU, and the NR PHY and the RF 1410 may be in a DU. In the split option example 7, the NR RRC 1401, the NR PDCP 1403, the NR RLC, the NR MAC, and a partial function of the NR PHY (e.g., the High NR PHY 1408) may be in a CU, and the other partial function of the NR PHY (e.g., the Low NR PHY 1409) and the RF 1410 may be in a DU. In the split option example 8, the NR RRC 1401, the NR PDCP 1403, the NR RLC, the NR MAC, and the NR PHY may be in a CU, and the RF 1410 may be in a DU.

The functional split may be configured per CU, per DU, per wireless device, per bearer, per slice, and/or with other granularities. In a per CU split, a CU may have a fixed split, and DUs may be configured to match the split option of the CU. In a per DU split, each DU may be configured with a different split, and a CU may provide different split options for different DUs. In a per wireless device split, a gNB (e.g., a CU and a DU) may provide different split options for different wireless devices. In a per bearer split, different split options may be utilized for different bearer types. In a per slice splice, different split options may be applied for different slices.

A new radio access network (new RAN) may support different network slices, which may allow differentiated treatment customized to support different service requirements with end to end scope. The new RAN may provide a differentiated handling of traffic for different network slices that may be pre-configured, and the new RAN may allow a single RAN node to support multiple slices. The new RAN may support selection of a RAN part for a given network slice, e.g., by one or more slice ID(s) or NSSAI(s) provided by a wireless device or provided by an NGC (e.g., an NG CP). The slice ID(s) or NSSAI(s) may identify one or more of pre-configured network slices in a PLMN. For an initial attach, a wireless device may provide a slice ID and/or an NSSAI, and a RAN node (e.g., a gNB) may use the slice ID or the NSSAI for routing an initial NAS signaling to an NGC control plane function (e.g., an NG CP). If a wireless device does not provide any slice ID or NSSAI, a RAN node may send a NAS signaling to a default NGC control plane function. For subsequent accesses, the wireless device may provide a temporary ID for a slice identification, which may be assigned by the NGC control plane function, to enable a RAN node to route the NAS message to a relevant NGC control plane function. The new RAN may support resource isolation between slices. If the RAN resource isolation is implemented, shortage of shared resources in one slice does not cause a break in a service level agreement for another slice.

The amount of data traffic carried over networks is expected to increase for many years to come. The number of users and/or devices is increasing and each user/device accesses an increasing number and variety of services, e.g., video delivery, large files, and images. This requires not only high capacity in the network, but also provisioning very high data rates to meet customers' expectations on interactivity and responsiveness. More spectrum may be required for network operators to meet the increasing demand. Considering user expectations of high data rates along with seamless mobility, it is beneficial that more spectrum be made available for deploying macro cells as well as small cells for communication systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, if present, may be an effective complement to licensed spectrum for network operators, e.g., to help address the traffic explosion in some examples, such as hotspot areas. Licensed Assisted Access (LAA) offers an alternative for operators to make use of unlicensed spectrum, e.g., if managing one radio network, offering new possibilities for optimizing the network's efficiency.

Listen-before-talk (clear channel assessment) may be implemented for transmission in an LAA cell. In a listen-before-talk (LBT) procedure, equipment may apply a clear channel assessment (CCA) check before using the channel. For example, the CCA may utilize at least energy detection to determine the presence or absence of other signals on a channel to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

Discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access, e.g., via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by wireless devices, time synchronization of wireless devices, and frequency synchronization of wireless devices.

DL LAA design may employ subframe boundary alignment according to LTE-A carrier aggregation timing relationships across serving cells aggregated by CA. This may not indicate that the eNB transmissions may start only at the subframe boundary. LAA may support transmitting PDSCH if not all OFDM symbols are available for transmission in a subframe according to LBT. Delivery of necessary control information for the PDSCH may also be supported.

LBT procedures may be employed for fair and friendly coexistence of LAA with other operators and technologies operating in unlicensed spectrum. LBT procedures on a node attempting to transmit on a carrier in unlicensed spectrum may require the node to perform a clear channel assessment to determine if the channel is free for use. An LBT procedure may involve at least energy detection to determine if the channel is being used. For example, regulatory requirements in some regions, e.g., in Europe, specify an energy detection threshold such that if a node receives energy greater than this threshold, the node assumes that the channel is not free. Nodes may follow such regulatory requirements. A node may optionally use a lower threshold for energy detection than that specified by regulatory requirements. LAA may employ a mechanism to adaptively change the energy detection threshold, e.g., LAA may employ a mechanism to adaptively lower the energy detection threshold from an upper bound. Adaptation mechanism may not preclude static or semi-static setting of the threshold. A Category 4 LBT mechanism or other type of LBT mechanisms may be implemented.

Various example LBT mechanisms may be implemented. For some signals, in some implementation scenarios, in some situations, and/or in some frequencies, no LBT procedure may performed by the transmitting entity. For example, Category 2 (e.g., LBT without random back-off) may be implemented. The duration of time that the channel is sensed to be idle before the transmitting entity transmits may be deterministic. For example, Category 3 (e.g., LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle, e.g., before the transmitting entity transmits on the channel. For example, Category 4 (e.g., LBT with random back-off with a contention window of variable size) may be implemented. The transmitting entity may draw a random number N within a contention window. The size of contention window may be specified by the minimum and maximum value of N. The transmitting entity may vary the size of the contention window if drawing the random number N. The random number N may be used in the LBT procedure to determine the duration of time that the channel is sensed to be idle, e.g., before the transmitting entity transmits on the channel.

LAA may employ uplink LBT at the wireless device. The UL LBT scheme may be different from the DL LBT scheme, e.g., by using different LBT mechanisms or parameters. These differences in schemes may be due to the LAA UL being based on scheduled access, which may affect a wireless device's channel contention opportunities. Other considerations motivating a different UL LBT scheme may include, but are not limited to, multiplexing of multiple wireless devices in a single subframe.

A DL transmission burst may be a continuous transmission from a DL transmitting node, e.g., with no transmission immediately before or after from the same node on the same CC. An UL transmission burst from a wireless device perspective may be a continuous transmission from a wireless device, e.g., with no transmission immediately before or after from the same wireless device on the same CC. A UL transmission burst may be defined from a wireless device perspective or from an eNB perspective. If an eNB is operating DL and UL LAA over the same unlicensed carrier, DL transmission burst(s) and UL transmission burst(s) on LAA may be scheduled in a TDM manner over the same unlicensed carrier. An instant in time may be part of a DL transmission burst or part of an UL transmission burst.

A base station may transmit a plurality of beams to a wireless device. A serving beam may be determined, from the plurality of beams, for the wireless communications between the base station and the wireless device. One or more candidate beams may also be determined, from the plurality of beams, for providing the wireless communications if a beam failure event occurs, e.g., such that the serving beam becomes unable to provide the desired communications. One or more candidate beams may be determined by a wireless device and/or by a base station. By determining and configuring a candidate beam, the wireless device and base station may continue wireless communications if the serving beam experiences a beam failure event.

Single beam and multi-beam operations may be supported, e.g., in a NR (New Radio) system. In a multi-beam example, a base station (e.g., a gNB in NR) may perform a downlink beam sweep to provide coverage for DL synchronization signals (SSs) and common control channels. Wireless devices may perform uplink beam sweeps for UL direction to access a cell. In a single beam example, a base station may configure time-repetition within one synchronization signal (SS) block. This time-repetition may comprise, e.g., one or more of a primary synchronization signal (PSS), a secondary synchronization signal (SSS), and a physical broadcast channel (PBCH). These signals may be in a wide beam. In a multi-beam example, a base station may configure one or more of these signals and physical channels, such as an SS Block, in multiple beams. A wireless device may identify, e.g., from an SS block, an OFDM symbol index, a slot index in a radio frame, and a radio frame number.

Figure 15:
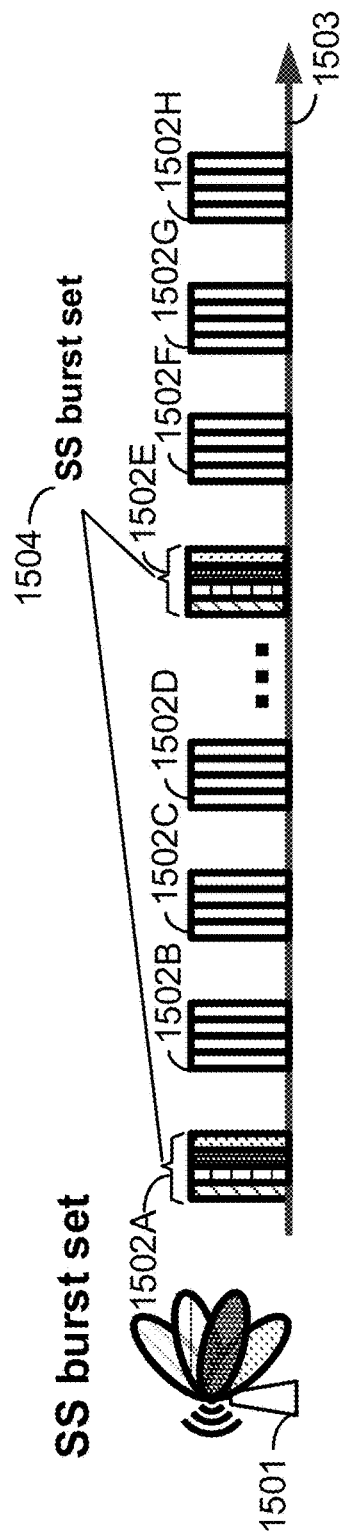
FIG. 15 shows an example of a synchronization signal burst set.

In an RRC_INACTIVE state or in an RRC_IDLE state, a wireless device may assume that SS blocks form an SS burst and an SS burst set. An SS burst set may have a given periodicity. SS blocks may be transmitted together in multiple beams (e.g., in multiple beam examples) to form an SS burst. One or more SS blocks may be transmitted via one beam. A beam may have a steering direction. If multiple SS bursts transmit beams, these SS bursts together may form an SS burst set, such as shown in FIG. 15. A base station 1501 (e.g., a gNB in NR) may transmit SS bursts 1502A to 1502H during time periods 1503. A plurality of these SS bursts may comprise an SS burst set, such as an SS burst set 1504 (e.g., SS bursts 1502A and 1502E). An SS burst set may comprise any number of a plurality of SS bursts 1502A to 1502H. Each SS burst within an SS burst set may transmitted at a fixed or variable periodicity during time periods 1503.

In a multi-beam example, one or more of PSS, SSS, or PBCH signals may be repeated for a cell, e.g., to support cell selection, cell reselection, and/or initial access procedures. For an SS burst, an associated PBCH or a physical downlink shared channel (PDSCH) scheduling system information may be broadcasted by a base station to multiple wireless devices. The PDSCH may be indicated by a physical downlink control channel (PDCCH) in a common search space. The system information may comprise system information block type 2 (SIB2). SIB2 may carry a physical random access channel (PRACH) configuration for a beam. For a beam, a base station (e.g., a gNB in NR) may have a RACH configuration which may include a PRACH preamble pool, time and/or frequency radio resources, and other power related parameters. A wireless device may use a PRACH preamble from a RACH configuration to initiate a contention-based RACH procedure or a contention-free RACH procedure. A wireless device may perform a 4-step RACH procedure, which may be a contention-based RACH procedure or a contention-free RACH procedure. The wireless device may select a beam associated with an SS block that may have the best receiving signal quality. The wireless device may successfully detect a cell identifier that may be associated with the cell and decode system information with a RACH configuration. The wireless device may use one PRACH preamble and select one PRACH resource from RACH resources indicated by the system information associated with the selected beam. A PRACH resource may comprise at least one of: a PRACH index indicating a PRACH preamble, a PRACH format, a PRACH numerology, time and/or frequency radio resource allocation, power setting of a PRACH transmission, and/or other radio resource parameters. For a contention-free RACH procedure, the PRACH preamble and resource may be indicated in a DCI or other high layer signaling.

Figure 16:
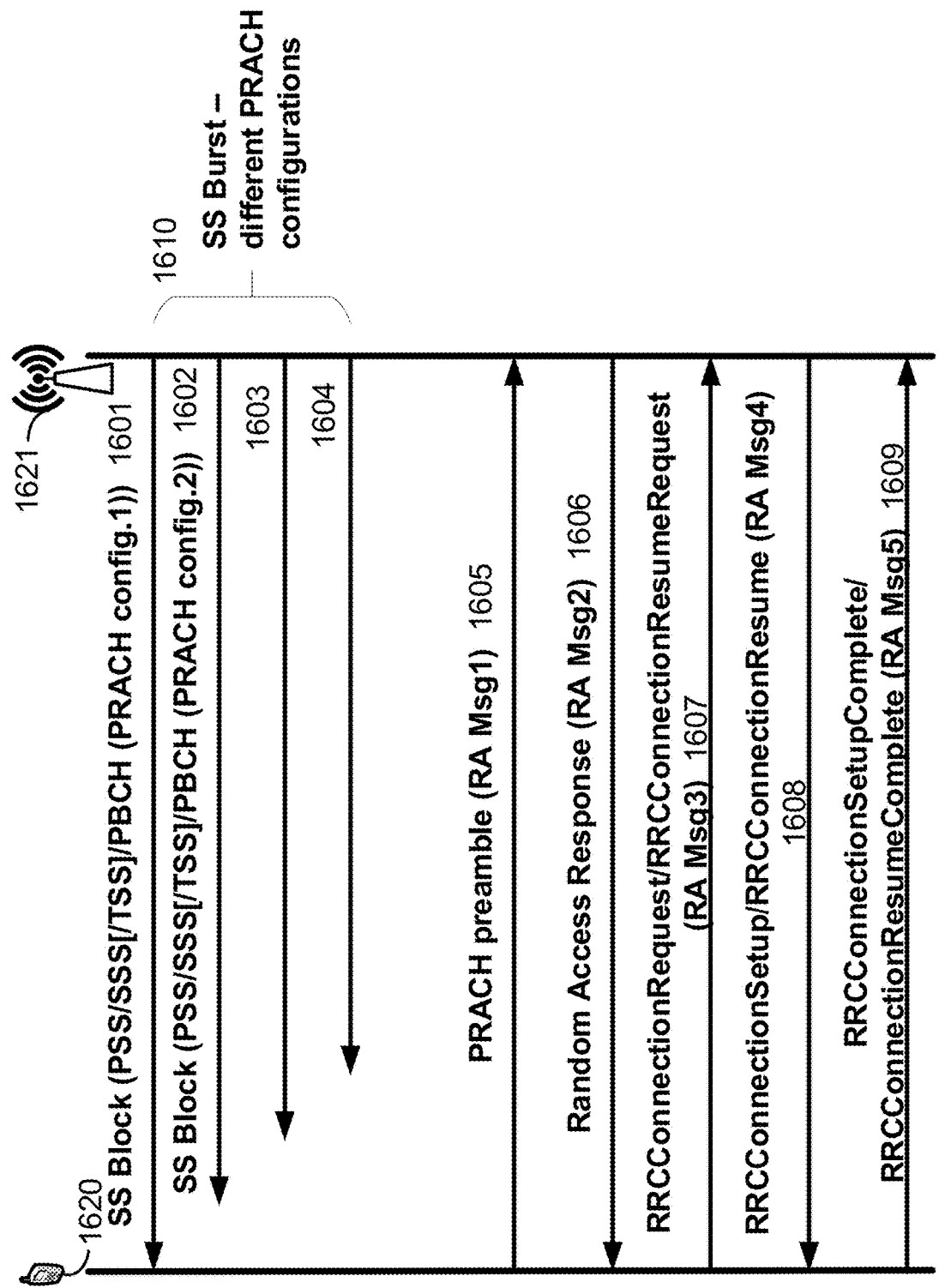
FIG. 16 shows an example of a random access procedure.

FIG. 16 shows an example of a random access procedure (e.g., via a RACH) that may include sending, by a base station, one or more SS blocks. A wireless device 1620 (e.g., a UE) may transmit one or more preambles to a base station 1621 (e.g., a gNB in NR). Each preamble transmission by the wireless device may be associated with a separate random access procedure, such as shown in FIG. 16. The random access procedure may begin at step 1601 with a base station 1621 (e.g., a gNB in NR) sending a first SS block to a wireless device 1621 (e.g., a UE). Any of the SS blocks may comprise one or more of a PSS, SSS, tertiary synchronization signal (TSS), or PBCH signal. The first SS block in step 1601 may be associated with a first PRACH configuration. At step 1602, the base station 1621 may send to the wireless device 1620 a second SS block that may be associated with a second PRACH configuration. At step 1603, the base station 1621 may send to the wireless device 1620 a third SS block that may be associated with a third PRACH configuration. At step 1604, the base station 1621 may send to the wireless device 1620 a fourth SS block that may be associated with a fourth PRACH configuration. Any number of SS blocks may be sent in the same manner in addition to, or replacing, steps 1603 and 1604. An SS burst may comprise any number of SS blocks. For example, SS burst 1610 comprises the three SS blocks sent during steps 1602-1604.

The wireless device 1620 may send to the base station 1621 a preamble, at step 1605, e.g., after or in response to receiving one or more SS blocks or SS bursts. The preamble may comprise a PRACH preamble, and may be referred to as RA Msg 1. The PRACH preamble may be transmitted in step 1605 according to or based on a PRACH configuration that may be received in an SS block (e.g., one of the SS blocks from steps 1601-1604) that may be determined to be the best SS block beam. The wireless device 1620 may determine a best SS block beam from among SS blocks it may receive prior to sending the PRACH preamble. The base station 1621 may send a random access response (RAR), which may be referred to as RA Msg2, at step 1606, e.g., after or in response to receiving the PRACH preamble. The RAR may be transmitted in step 1606 via a DL beam that corresponds to the SS block beam associated with the PRACH configuration. The base station 1621 may determine the best SS block beam from among SS blocks it previously sent prior to receiving the PRACH preamble. The base station 1621 may receive the PRACH preamble according to or based on the PRACH configuration associated with the best SS block beam.

The wireless device 1620 may send to the base station 1621 an RRCConnectionRequest and/or RRCConnectionResumeRequest message, which may be referred to as RA Msg3, at step 1607, e.g., after or in response to receiving the RAR. The base station 1621 may send to the wireless device 1620 an RRCConnectionSetup and/or RRCConnectionResume message, which may be referred to as RA Msg4, at step 1608, e.g., after or in response to receiving the RRCConnectionRequest and/or RRCConnectionResumeRequest message. The wireless device 1620 may send to the base station 1621 an RRCConnectionSetupComplete and/or RRCConnectionResumeComplete message, which may be referred to as RA Msg5, at step 1609, e.g., after or in response to receiving the RRCConnectionSetup and/or RRCConnectionResume. An RRC connection may be established between the wireless device 1620 and the base station 1621, and the random access procedure may end, e.g., after or in response to receiving the RRCConnectionSetupComplete and/or RRCConnectionResumeComplete message.

A best beam, including but not limited to a best SS block beam, may be determined based on a channel state information reference signal (CSI-RS). A wireless device may use a CSI-RS in a multi-beam system for estimating the beam quality of the links between the wireless device and a base station. For example, based on a measurement of a CSI-RS, a wireless device may report CSI for downlink channel adaption. A CSI parameter may include a precoding matrix index (PMI), a channel quality index (CQI) value, and/or a rank indicator (RI). A wireless device may report a beam index based on a reference signal received power (RSRP) measurement on a CSI-RS. The wireless device may report the beam index in a CSI resource indication (CRI) for downlink beam selection. A base station may transmit a CSI-RS via a CSI-RS resource, such as via one or more antenna ports, or via one or more time and/or frequency radio resources. A beam may be associated with a CSI-RS. A CSI-RS may comprise an indication of a beam direction. Each of a plurality of beams may be associated with one of a plurality of CSI-RSs. A CSI-RS resource may be configured in a cell-specific way, e.g., via common RRC signaling. Additionally or alternatively, a CSI-RS resource may be configured in a wireless device-specific way, e.g., via dedicated RRC signaling and/or layer 1 and/or layer 2 (L1/L2) signaling. Multiple wireless devices in or served by a cell may measure a cell-specific CSI-RS resource. A dedicated subset of wireless devices in or served by a cell may measure a wireless device-specific CSI-RS resource. A base station may transmit a CSI-RS resource periodically, using aperiodic transmission, or using a multi-shot or semi-persistent transmission. In a periodic transmission, a base station may transmit the configured CSI-RS resource using a configured periodicity in the time domain. In an aperiodic transmission, a base station may transmit the configured CSI-RS resource in a dedicated time slot. In a multi-shot or semi-persistent transmission, a base station may transmit the configured CSI-RS resource in a configured period. A base station may configure different CSI-RS resources in different terms for different purposes. Different terms may include, e.g., cell-specific, device-specific, periodic, aperiodic, multi-shot, or other terms. Different purposes may include, e.g., beam management, CQI reporting, or other purposes.

Figure 17:
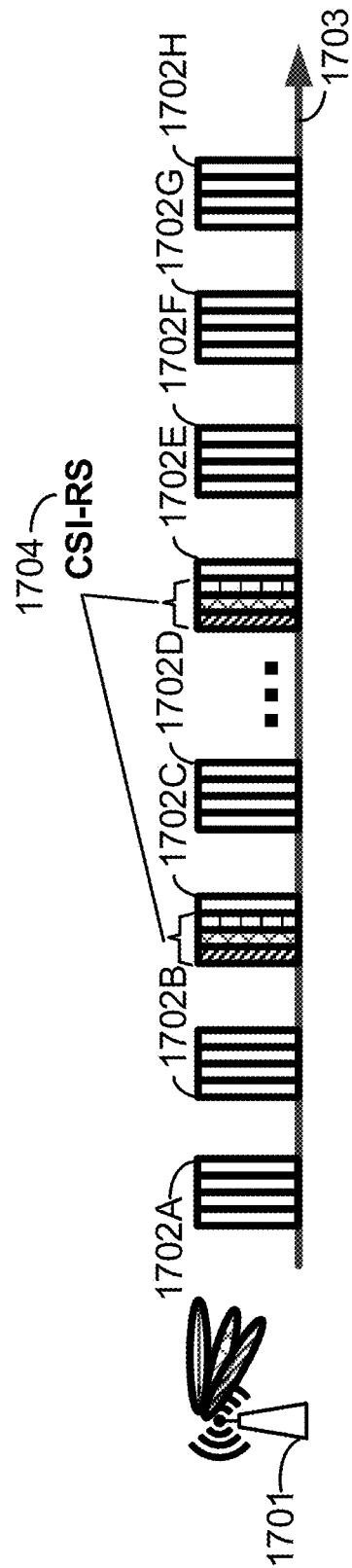
FIG. 17 shows an example of transmitting channel state information reference signals periodically for a beam.

FIG. 17 shows an example of transmitting CSI-RSs periodically for a beam. A base station 1701 may transmit a beam in a predefined order in the time domain, such as during time periods 1703. Beams used for a CSI-RS transmission, such as for CSI-RS 1704 in transmissions 1702C and/or 1703E, may have a different beam width relative to a beam width for SS-blocks transmission, such as for SS blocks 1702A, 1702B, 1702D, and 1702F-1702H. Additionally or alternatively, a beam width of a beam used for a CSI-RS transmission may have the same value as a beam width for an SS block. Some or all of one or more CSI-RSs may be included in one or more beams. An SS block may occupy a number of OFDM symbols (e.g., 4), and a number of subcarriers (e.g., 240), carrying a synchronization sequence signal. The synchronization sequence signal may identify a cell.

Figure 18:
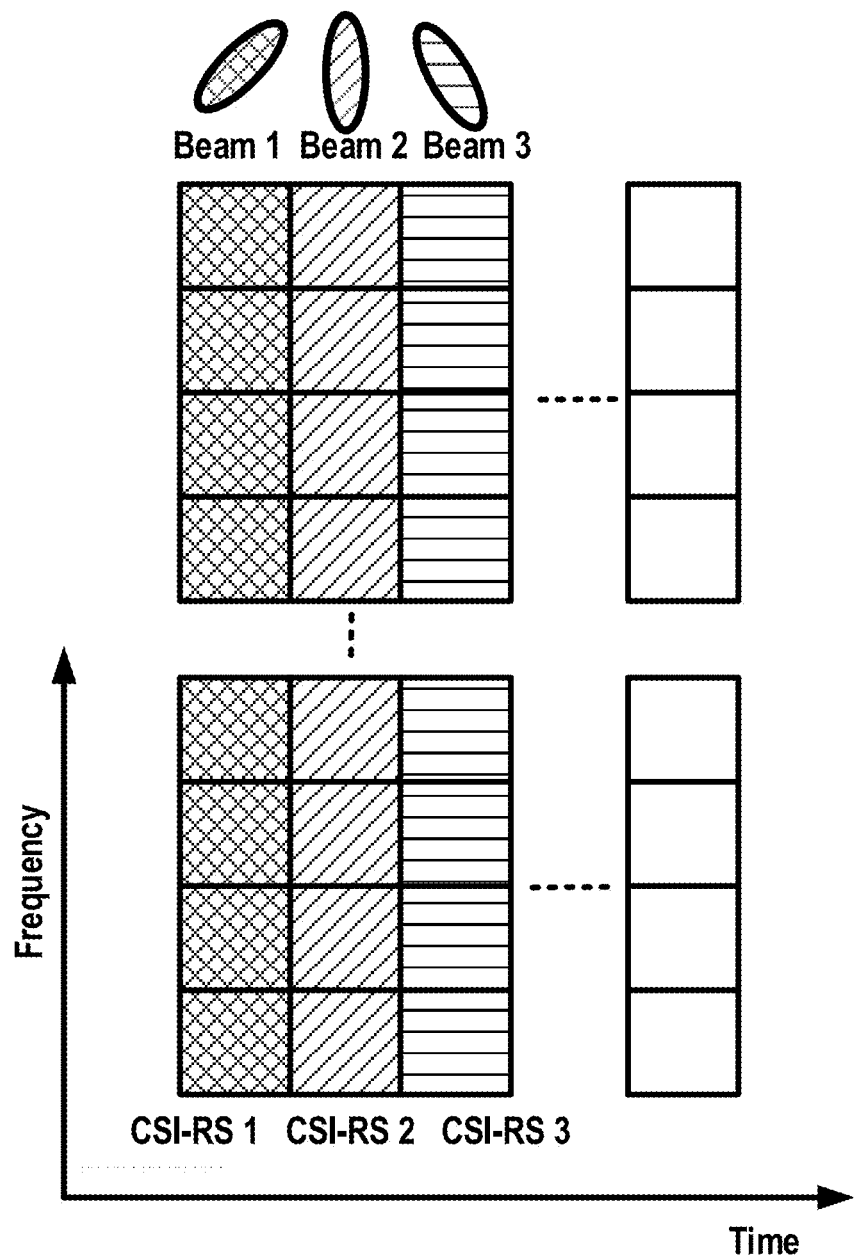
FIG. 18 shows an example of a channel state information reference signal mapping.

FIG. 18 shows an example of a CSI-RS that may be mapped in time and frequency domains. Each square shown in FIG. 18 may represent a resource block within a bandwidth of a cell. Each resource block may comprise a number of subcarriers. A cell may have a bandwidth comprising a number of resource blocks. A base station (e.g., a gNB in NR) may transmit one or more RRC messages comprising CSI-RS parameters for one or more CSI-RS. CSI-RS parameters for a CSI-RS may comprise, e.g., time and OFDM frequency parameters, port numbers, CSI-RS index, and/or CSI-RS sequence parameters. Time and frequency parameters may indicate, e.g., periodicity, subframes, symbol numbers, OFDM subcarriers, and/or other radio resource parameters. CSI-RS may be configured using common parameters, e.g., when a plurality of wireless devices receive the same CSI-RS signal. CSI-RS may be configured using wireless device dedicated parameters, e.g., when a CSI-RS is configured for a specific wireless device.

As shown in FIG. 18, three beams may be configured for a wireless device, e.g., in a wireless device-specific configuration. Any number of additional beams (e.g., represented by the column of blank squares) or fewer beams may be included. Beam 1 may be allocated with CSI-RS 1 that may be transmitted in some subcarriers in a resource block (RB) of a first symbol. Beam 2 may be allocated with CSI-RS 2 that may be transmitted in some subcarriers in a RB of a second symbol. Beam 3 may be allocated with CSI-RS 3 that may be transmitted in some subcarriers in a RB of a third symbol. All subcarriers in a RB may not necessarily be used for transmitting a particular CSI-RS (e.g., CSI-RS1) on an associated beam (e.g., beam 1) for that CSI-RS. By using frequency division multiplexing (FDM), other subcarriers, not used for beam 1 for the wireless device in the same RB, may be used for other CSI-RS transmissions associated with a different beam for other wireless devices. Additionally or alternatively, by using time domain multiplexing (TDM), beams used for a wireless device may be configured such that different beams (e.g., beam 1, beam 2, and beam 3) for the wireless device may be transmitted using some symbols different from beams of other wireless devices.

Beam management may use a device-specific configured CSI-RS. In a beam management procedure, a wireless device may monitor a channel quality of a beam pair link comprising a transmitting beam by a base station (e.g., a gNB in NR) and a receiving beam by the wireless device (e.g., a UE). When multiple CSI-RSs associated with multiple beams are configured, a wireless device may monitor multiple beam pair links between the base station and the wireless device.

A wireless device may transmit one or more beam management reports to a base station. A beam management report may indicate one or more beam pair quality parameters, comprising, e.g., one or more beam identifications, RSRP, PMI, CQI, and/or RI, of a subset of configured beams.

A base station and/or a wireless device may perform a downlink L1/L2 beam management procedure. One or more downlink L1/L2 beam management procedures may be performed within one or multiple transmission and receiving points (TRPs). Procedure P-1 may be used to enable a wireless device measurement on different TRP transmit (Tx) beams, e.g., to support a selection of TRP Tx beams and/or wireless device receive (Rx) beam(s). Beamforming at a TRP may include, e.g., an intra-TRP and/or inter-TRP Tx beam sweep from a set of different beams. Beamforming at a wireless device, may include, e.g., a wireless device Rx beam sweep from a set of different beams. Procedure P-2 may be used to enable a wireless device measurement on different TRP Tx beams, e.g., which may change inter-TRP and/or intra-TRP Tx beam(s). Procedure P-2 may be performed, e.g., on a smaller set of beams for beam refinement than in procedure P-1. P-2 may be a particular example of P-1. P-3 may be used to enable a wireless device measurement on the same TRP Tx beam, e.g., to change a wireless device Rx beam if a wireless device uses beamforming.

Based on a wireless device's beam management report, a base station may transmit, to the wireless device, a signal indicating that one or more beam pair links are the one or more serving beams. The base station may transmit PDCCH and/or PDSCH for the wireless device using the one or more serving beams.

A wireless device (e.g., a UE) and/or a base station (e.g., a gNB) may trigger a beam failure recovery mechanism. A wireless device may trigger a beam failure recovery (BFR) request transmission, e.g., when a beam failure event occurs. A beam failure event may include, e.g., a determination that a quality of beam pair link(s) of an associated control channel is unsatisfactory. A determination of an unsatisfactory quality of beam pair link(s) of an associated channel may be based on the quality falling below a threshold and/or an expiration of a timer.

A wireless device may measure a quality of beam pair link(s) using one or more reference signals (RS). One or more SS blocks, one or more CSI-RS resources, and/or one or more demodulation reference signals (DM-RSs) of a PBCH may be used as a RS for measuring a quality of a beam pair link. A quality of a beam pair link may be based on one or more of an RSRP value, reference signal received quality (RSRQ) value, and/or CSI value measured on RS resources. A base station may indicate that an RS resource, e.g., that may be used for measuring a beam pair link quality, is quasi-co-located (QCLed) with one or more DM-RSs of a control channel. The RS resource and the DM-RSs of the control channel may be QCLed when the channel characteristics from a transmission via an RS to a wireless device, and the channel characteristics from a transmission via a control channel to the wireless device, are similar or the same under a configured criterion.

Figure 19:
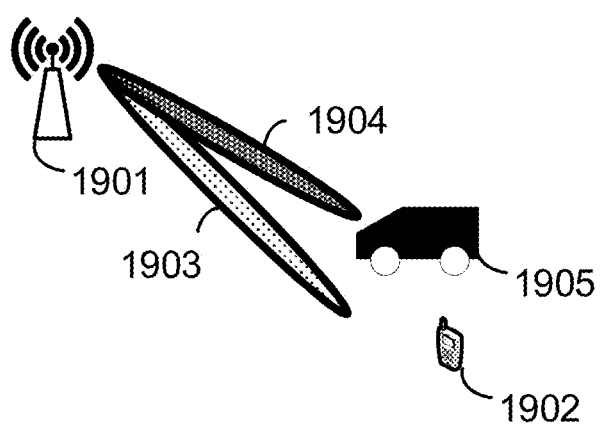
FIG. 19 shows an example of a beam failure event involving a single transmission and receiving point.

FIG. 19 shows an example of a beam failure event involving a single TRP. A single TRP such as at a base station 1901 may transmit, to a wireless device 1902, a first beam 1903 and a second beam 1904. A beam failure event may occur if, e.g., a serving beam, such as the second beam 1904, is blocked by a moving vehicle 1905 or other obstruction (e.g., building, tree, land, or any object) and configured beams (e.g., the first beam 1903 and the second beam 1904), including the serving beam, are received from the single TRP. The wireless device 1902 may trigger a mechanism to recover from beam failure when a beam failure occurs.

Figure 20:
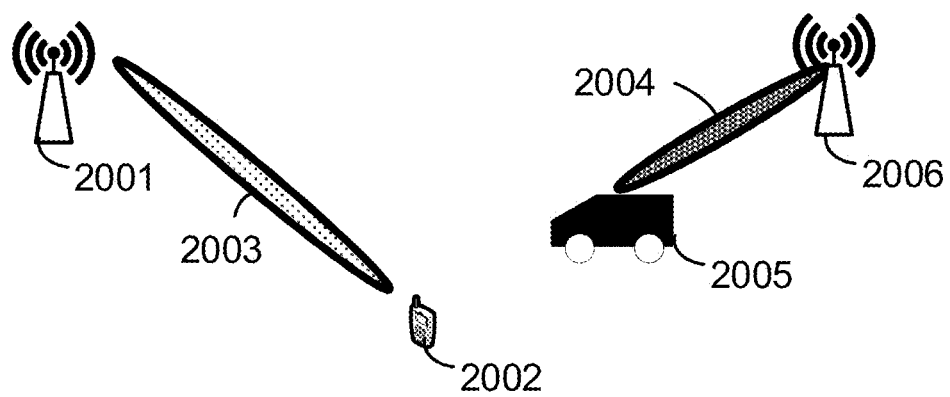
FIG. 20 shows an example of a beam failure event involving multiple transmission and receiving points.

FIG. 20 shows an example of a beam failure event involving multiple TRPs. Multiple TRPs, such as at a first base station 2001 and at a second base station 2006, may transmit, to a wireless device 2002, a first beam 2003 (e.g., from the first base station 2001) and a second beam 2004 (e.g., from the second base station 2006). A beam failure event may occur when, e.g., a serving beam, such as the second beam 2004, is blocked by a moving vehicle 2005 or other obstruction (e.g., building, tree, land, or any object) and configured beams (e.g., the first beam 2003 and the second beam 2004) are received from multiple TRPs. The wireless device 2002 may trigger a mechanism to recover from beam failure when a beam failure occurs.

A wireless device may monitor a PDCCH, such as a New Radio PDCCH (NR-PDCCH), on M beam pair links simultaneously, where M≥1 and the maximum value of M may depend at least on the wireless device capability. Such monitoring may increase robustness against beam pair link blocking. A base station may transmit, and the wireless device may receive, one or more messages configured to cause the wireless device to monitor NR-PDCCH on different beam pair link(s) and/or in different NR-PDCCH OFDM symbols.

A base station may transmit higher layer signaling, and/or a MAC control element (MAC CE), that may comprise parameters related to a wireless device Rx beam setting for monitoring NR-PDCCH on multiple beam pair links. A base station may transmit one or more indications of a spatial QCL assumption between a first DL RS antenna port(s) and a second DL RS antenna port(s). The first DL RS antenna port(s) may be for one or more of a cell-specific CSI-RS, device-specific CSI-RS, SS block, PBCH with DM-RSs of PBCH, and/or PBCH without DM-RSs of PBCH. The second DL RS antenna port(s) may be for demodulation of a DL control channel. Signaling for a beam indication for a NR-PDCCH (e.g., configuration to monitor NR-PDCCH) may be via MAC CE signaling, RRC signaling, DCI signaling, or specification-transparent and/or an implicit method, and any combination thereof.

For reception of unicast DL data channel, a base station may indicate spatial QCL parameters between DL RS antenna port(s) and DM-RS antenna port(s) of DL data channel. A base station may transmit DCI (e.g., downlink grants) comprising information indicating the RS antenna port(s). The information may indicate the RS antenna port(s) which may be QCLed with DM-RS antenna port(s). A different set of DM-RS antenna port(s) for the DL data channel may be indicated as a QCL with a different set of RS antenna port(s).

If a base station transmits a signal indicating a spatial QCL parameters between CSI-RS and DM-RS for PDCCH, a wireless device may use CSI-RSs QCLed with DM-RS for a PDCCH to monitor beam pair link quality. If a beam failure event occurs, the wireless device may transmit a beam failure recovery request, such as by a determined configuration.

If a wireless device transmits a beam failure recovery request, e.g., via an uplink physical channel or signal, a base station may detect that there is a beam failure event, for the wireless device, by monitoring the uplink physical channel or signal. The base station may initiate a beam recovery mechanism to recover the beam pair link for transmitting PDCCH between the base station and the wireless device. The base station may transmit one or more control signals, to the wireless device, e.g., after or in response to receiving the beam failure recovery request. A beam recovery mechanism may be, e.g., an L1 scheme, or a higher layer scheme.

A base station may transmit one or more messages comprising, e.g., configuration parameters of an uplink physical channel and/or a signal for transmitting a beam failure recovery request. The uplink physical channel and/or signal may be based on at least one of the following: a non-contention based PRACH (e.g., a beam failure recovery PRACH or BFR-PRACH), which may use a resource orthogonal to resources of other PRACH transmissions; a PUCCH (e.g., beam failure recovery PUCCH or BFR-PUCCH); and/or a contention-based PRACH resource. Combinations of these candidate signal and/or channels may be configured by a base station.

If a beam failure occurs, a beam failure recovery procedure may be performed. A wireless device may send, to a base station, a beam failure recovery (BFR) request. The wireless device may send the BFR request via, e.g., a PRACH resource. Different types of BFR requests may be sent based on a type of beam failure. As an example, a wireless device may transmit a type 1 BFR request or a type 2 BFR request. Examples for type 1 and type 2 BFR requests are provided, however, any number of different types of BFR requests may be used, e.g., to indicate any number of different conditions. A base station may send, to the wireless device, a BFR type indicator. The BFR type indicator may provide an indication to the wireless device, e.g., prior to the wireless device experiencing a beam failure event, what type of BFR request to send after detecting a beam failure. The BFR type indicator may indicate whether the wireless device must determine one or more candidate beams, and/or whether the wireless device should not determine any candidate beams.

By determining and using a BFR type indicator, a BFR request may indicate an occurrence of the beam failure detected at the wireless device (e.g., a wireless device may transmit a BFR request to a base station in response to identifying a beam failure). A BFR request may indicate the occurrence of the beam failure that may be detected by a wireless device, and/or a BFR request may indicate a candidate beam that may be selected by a wireless device. By determining whether a base station or a device should determine one or candidate beams, advantages may be provided. For example, detecting a beam failure may take less power of the wireless device than both detecting the beam failure and identifying a candidate beam. Additionally or alternatively, detecting a beam failure may take less time for a wireless device than both detecting a beam failure and identifying a candidate beam. A base station may take less time to recover the beam pair link if, e.g., a wireless device provides the candidate beam in a BFR request, than the time that may take the base station to recover the beam pair link if, e.g., the wireless device does not provide candidate beam information. As another example, a wireless device may not be capable of identifying a candidate beam, e.g., due to lack of beam correspondence between a transmitting beam and a receiving beam. Or, a wireless device may be capable of identifying a candidate beam. By enabling a base station and/or a wireless device to decide a type of BFR request that will be transmitted if a beam failure occurs improvements may include, e.g., reduced battery or power consumption by a wireless device, and/or reduced time spent by a base station and/or by a wireless device for a BFR procedure.

A type 1 BFR request may correspond to a BFR request that lacks candidate beam identifier information. A base station may indicate in a message to a wireless device that the wireless device is not to provide a candidate beam identifier information in a BFR request. A wireless device may use a PRACH, associated with a CSI-RS resource, to transmit a type 1 BFR request corresponding to the CSI-RS resource, if a triggering condition is met. A triggering condition for a type 1 BFR request may comprise a determination that the RSRP of the CSI-RS is lower than a first threshold. Additionally or alternatively, the triggering condition for a type 1 BFR request may comprise an expiration of a first timer associated with a condition, such as a duration of the RSRP of the CSI-RS being lower than the first threshold. The first threshold and/or the first timer may be associated with a predefined value. Additionally or alternatively, the first threshold and/or the first timer may be configured by one or more messages. A type 1 BFR request may be triggered by each of a plurality of conditions or by the occurrence of all or some combination of a plurality of conditions. A plurality of thresholds may be used, and/or a plurality of timers may be used, to determine whether a triggering condition for a type 1 BFR request has occurred.

A type 2 BFR request may correspond to a BFR request that includes candidate beam identifier information. A base station may indicate in a message to a wireless device that the wireless device is to provide candidate beam identifier information in a BFR request. A type 2 BFR request may be indicated by a base station if, e.g., a wireless device has indicated a capability to make a candidate beam selection and/or if the base station determines that the wireless device may have better information or capability to make a candidate beam selection for itself than the base station may be able to do for the wireless device. A wireless device may use a PRACH, associated with a CSI-RS resource, to transmit a type 2 BFR request corresponding to the CSI-RS resource, if a triggering condition is met. The type 2 BFR request may indicate a candidate beam associated with the CSI-RS and the PRACH resource. A triggering condition for a type 2 BFR request may comprise a determination that the RSRP of the one or multiple serving beams is lower than a second threshold. Additionally or alternatively, the triggering condition for a type 2 BFR request may comprise an expiration of a second timer associated with a condition, such as a duration of the RSRP of the one or multiple serving beams being lower than the second threshold. The second threshold and/or the second timer may be associated with a predefined value. Additionally or alternatively, the second threshold and/or the second timer may be configured by one or more messages. A type 2 BFR request may be triggered by each of a plurality of conditions or by the occurrence of all or some combination of a plurality of conditions. A plurality of thresholds may be used, and/or a plurality of timers may be used, to determine whether a triggering condition for a type 2 BFR request has occurred. As an example, a triggering condition for a type 2 BFR request may comprise a determination that the RSRP of a candidate beam is higher than a third threshold, and/or upon the expiration of a third timer. As another example, a triggering condition for a type 2 BFR request may comprise a combination of both the RSRP of one or multiple serving beams being lower than a second threshold and the RSRP of a candidate beam being higher than a third threshold. Any of the above conditions may be further based on an expiration of one or more timers, such that the condition must be present for a duration of time until a triggering condition is satisfied. The second threshold may be the same or different from (e.g., greater or less than) the third threshold, and the second and/or third threshold referenced above for type 2 BFR requests may be the same or different from (e.g., greater or less than) the first threshold referenced above for type 1 BFR requests.

To determine a beam failure event and/or to determine a candidate beam, a wireless device may measure RSRP based on CSI-RS RSRP or other RSs. A wireless device may measure RSRP, e.g., on one or multiple SS blocks, and/or on one or multiple DM-RSs on a PBCH. A base station may transmit, to the wireless device, one or more messages indicating an RS resource to be used for the measurement, and/or indicating an RS resource to be used for the measurement is QCLed with DM-RSs of a downlink control channel. A wireless device may measure a RSRQ value, or a CSI value based on RS resources, e.g., to determine a quality of a candidate beam and/or a beam pair link.

A base station may configure a wireless device with a type of BFR request by using a RRC signaling. A base station may send one or more RRC messages comprising configuration parameters of a cell. The configuration parameters may comprise one or more first reference signal resource parameters of a first plurality of reference signals, one or more second reference signal resource parameters of a second plurality of reference signals, one or more random access preambles, and/or a beam failure recovery type indicator (e.g., indicating a type 1 BFR request or a type 2 BFR request).

A wireless device may receive at least one radio resource control (RRC) message comprising configuration parameters of a cell. The configuration parameters may comprise, e.g., one or more channel state information reference signal (CSI-RS) resource parameters of a plurality of CSI-RSs; and/or one or more parameters indicating that a first type beam failure recovery request, and/or a second type beam failure recovery request, is configured for the cell. Each CSI-RS may be associated with a beam. The wireless device may detect beam failure and/or whether the one or more beams associated with the one or more CSI-RSs meet a criterion. The wireless device may transmit a first preamble via a RACH resources of a first beam associated with a serving beam. Additionally or alternatively, the wireless may transmit a first preamble on multiple RACH resources associated with multiple beams.

A wireless device may receive, from a base station, one or more radio resource control messages comprising configuration parameters of a cell. The configuration parameters may comprise one or more first reference signal resource parameters of a first plurality of reference signals, one or more second reference signal resource parameters of a second plurality of reference signals, one or more random access preambles, and a beam failure recovery type indicator. The second plurality of reference signals may comprise at least one or more synchronization signal blocks, demodulation reference signals of a physical broadcast channel, or channel state information reference signals. The wireless device may detect, based on at least one of the first plurality of reference signals, at least one beam failure. The wireless device may detect at least one beam failure by determining that a first channel quality of at least one first reference signal of the first plurality of reference signals is below a first threshold, and/or by determining that a second channel quality of at least one second reference signal of the second plurality of reference signals is above a second threshold. The wireless device may select, e.g., after detecting at least one beam failure, a preamble of the one or more random access preambles. The wireless device may base its selection of a preamble on the beam failure recovery type indicator and a channel quality of the second plurality of reference signals. The wireless device may base its selection of a preamble on whether the wireless device detects at least one candidate reference signal of the second plurality of reference signals. The wireless device may transmit, via the cell, the selected preamble. The wireless device may transmit, based on the beam failure recovery type indicator indicating a beam failure recovery type other than a first beam failure recovery type (e.g., a type 2 BFR type or another BFR type other than a type 1 BFR type), an indication of a candidate beam.

A wireless device may receive, from a base station one or more radio resource control messages comprising configuration parameters of a cell, wherein the configuration parameters may comprise one or more resource parameters of a plurality of reference signals, and a beam failure recovery type indicator. The plurality of reference signals may comprise at least one of synchronization signal blocks, demodulation reference signals of a physical broadcast channel, or channel state information reference signals. The wireless device may detect, based on one or more of the plurality of reference signals, at least one beam failure. The wireless device may detect the at least one beam failure by, e.g., determining that a first channel quality of at least one first reference signal of the plurality of reference signals is below a first threshold, and/or determining that a second channel quality of at least one second reference signal of the plurality of reference signals is above a second threshold. The wireless device may determine, based on the beam failure recovery type indicator, a type of a beam failure recovery request for the at least one beam failure. Based on the type of the beam failure recovery request, the wireless device may select a first available random access channel resource for a transmission of the beam failure recovery request, or select a second random access channel resource, different from the first available random access channel resource, for the transmission of the beam failure recovery request. The wireless device may transmit, via the selected random access channel resource, the beam failure recovery request. The wireless device may search, based on the plurality of reference signals, for a candidate beam, select the second random access channel resource for the transmission of the beam failure recovery request, and transmit, via the second random access channel resource, the beam failure recovery request. Based on the searching, the wireless device may determine the candidate beam, and the wireless device may select the second random access channel resource by selecting a random access channel resource associated with the candidate beam. The wireless device may determine, prior to selecting the second random access channel resource for the transmission of the beam failure recovery request, that the searching for the candidate beam is unsuccessful.

A base station may determine, based on at least one of a first plurality of reference signals, at least one beam failure associated with a wireless device. The base station may determine, based on the at least one beam failure, a beam failure recovery type. The base station may determine the at least one beam failure by determining that a first channel quality of at least one first reference signal of the first plurality of reference signals is below a first threshold, and/or by determining that a second channel quality of at least one second reference signal of the second plurality of reference signals is above a second threshold. The base station may transmit, to the wireless device, one or more radio resource control messages comprising configuration parameters of a cell. The configuration parameters may comprise one or more first reference signal resource parameters of the first plurality of reference signals, one or more second reference signal resource parameters of a second plurality of reference signals, one or more random access preambles, and a beam failure recovery type indicator. The first plurality of reference signals and/or the second plurality of reference signals may comprise at least one or synchronization signal blocks, demodulation reference signals of a physical broadcast channel, or channel state information reference signals. The base station may receive, from the wireless device via the cell, the preamble. The preamble may be based on the beam failure recovery type indicator, and a channel quality of the second plurality of reference signals. By receiving the preamble, the base station may receive an indication of a candidate beam. The base station may make a determination, based on receiving the preamble, whether the wireless device received the beam failure recovery type indicator. A system may comprise a wireless device and a base station.

Figure 21:
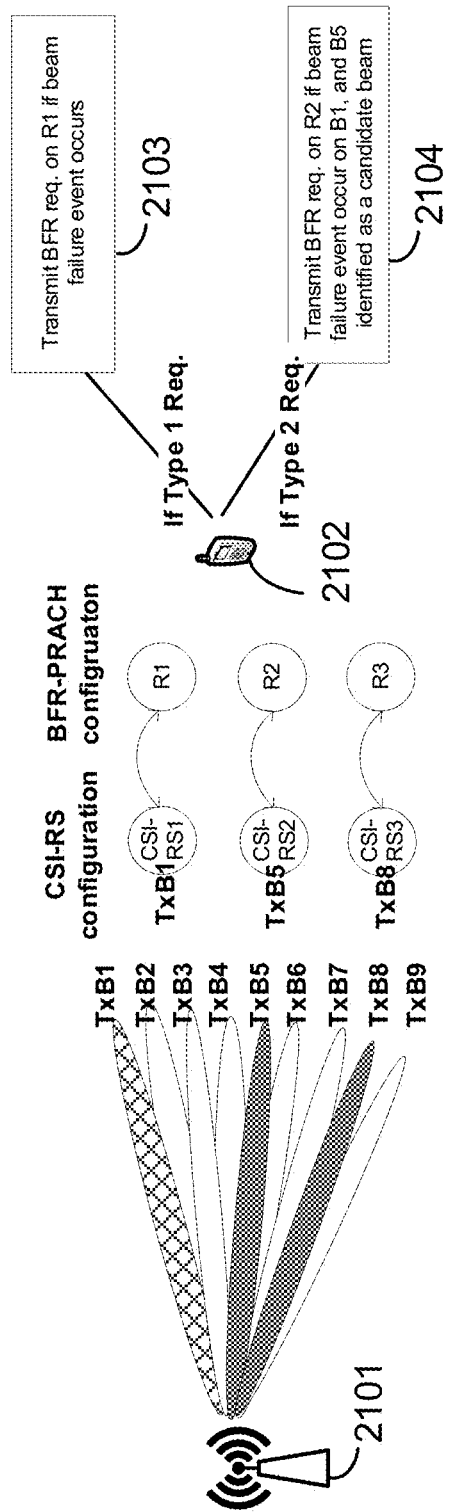
FIG. 21 shows an example of beam failure request transmissions with different request types.

FIG. 21 shows an example of BFR request transmissions for different request types. A base station 2101 may transmit a plurality of transmit beams, e.g., TxB1 to TxB9. Nine transmit beams are shown, however, the base station 2101 may transmit any number of transmit beams. The transmit beams may comprise a serving beam, such as TxB1, as well as one or more configured and/or activated beams, such as TxB5 and TxB8. Each beam may have an associated CSI-RS configuration, such as CSI-RS1 to CSI-RS3, and/or an associated BFR-PRACH configuration (or RACH resource), such as R1 to R3. The base station 2101 may transmit one or more messages comprising configuration parameters indicating one of multiple types of BFR requests that a wireless device 2102 may transmit. The wireless device 2102 may transmit a BFR request with information that may differ depending on a type (e.g., type 1 or type 2) of the BFR request. In the example 2103, if a type 1 BFR request is configured, the wireless device 2102 may transmit a BFR request on a RACH resource R1 if a beam failure occurs on a beam pair link between a serving beam TxB1 of the base station 2101 and a receiving beam of the wireless device. In the example 2104, if a type 2 BFR request is configured, the wireless device 2102 may transmit a BFR request on a RACH resource R2 indicating a beam B5 as a candidate beam, if the wireless device 2102 determines that a beam failure event has occurred on beam B1 and the wireless device 2102 determines that beam 5 is a candidate beam.

The base station 2101 may transmit to the wireless device 2102 one or more messages comprising configuration parameters indicating a first type BFR request or a second type BFR request. The wireless device 2102 may determine a beam failure on one or multiple serving beams, such as TxB1. The wireless device 2101 may determine a beam failure based on, e.g., measurement on RSs associated with the one or multiple serving beams. If the wireless device 2102 receives the one or more messages comprises configuration parameters that indicate a first type of BFR request, e.g., after or in response to determining a beam failure, the wireless device 2102 may transmit a first type BFR request on the BFR-PRACH resource associated with the one or multiple serving beams. If the wireless device 2102 receives the one or more messages comprises configuration parameters that indicate a second type of BFR request, e.g., after or in response to determining a beam failure, the wireless device 2102 may identify a candidate beam, e.g., from configured or activated multiple beams. The wireless device 2102 may also use the BFR-PRACH resource associated with the candidate beam to indicate the identified candidate beam associated with the BFR-PRACH. If the wireless device 2102 does not identify a candidate beam from configured or activated multiple beams, the wireless device 2102 may use the BFR-PRACH resource associated with the one or multiple serving beams to transmit a BFR request, indicating that there is no candidate beam.

The wireless device 2102 may determine a beam failure based one or more beam measurements. A beam failure may be determined for one or multiple serving beams. A beam failure may be determined based on one or more measurements on RSs associated with the one or multiple serving beams. A beam failure may be determined if, e.g., measurement on one or multiple beams are below a first threshold. Additionally or alternatively, a beam failure determination may be based on an expiration of a first timer associated with a condition. The wireless device 2102 may measure RSRP, e.g., based on CSI-RS RSRP or other RSs, for determining a beam failure event. For example, the wireless device 2102 may measure RSRP on one or multiple SS blocks, and/or one or multiple DM-RSs on PBCH. A beam failure determination may be based on any or more of the triggering conditions described herein.

The wireless device 2102 may identify a candidate beam based on one or more beam measurements. A candidate beam may be determined if, e.g., measurement on one or multiple beams are above a second threshold. Additionally or alternatively, a candidate beam determination may be based on an expiration of a second timer associated with a condition. The wireless device 2102 may measure RSRP, e.g., based on CSI-RS RSRP or other RSs, for determining a candidate beam. For example, the wireless device 2102 may measure RSRP on one or multiple SS blocks and/or one or multiple DM-RSs on PBCH. A candidate beam determination may be based on any or more of the triggering conditions described herein.

Figure 22:
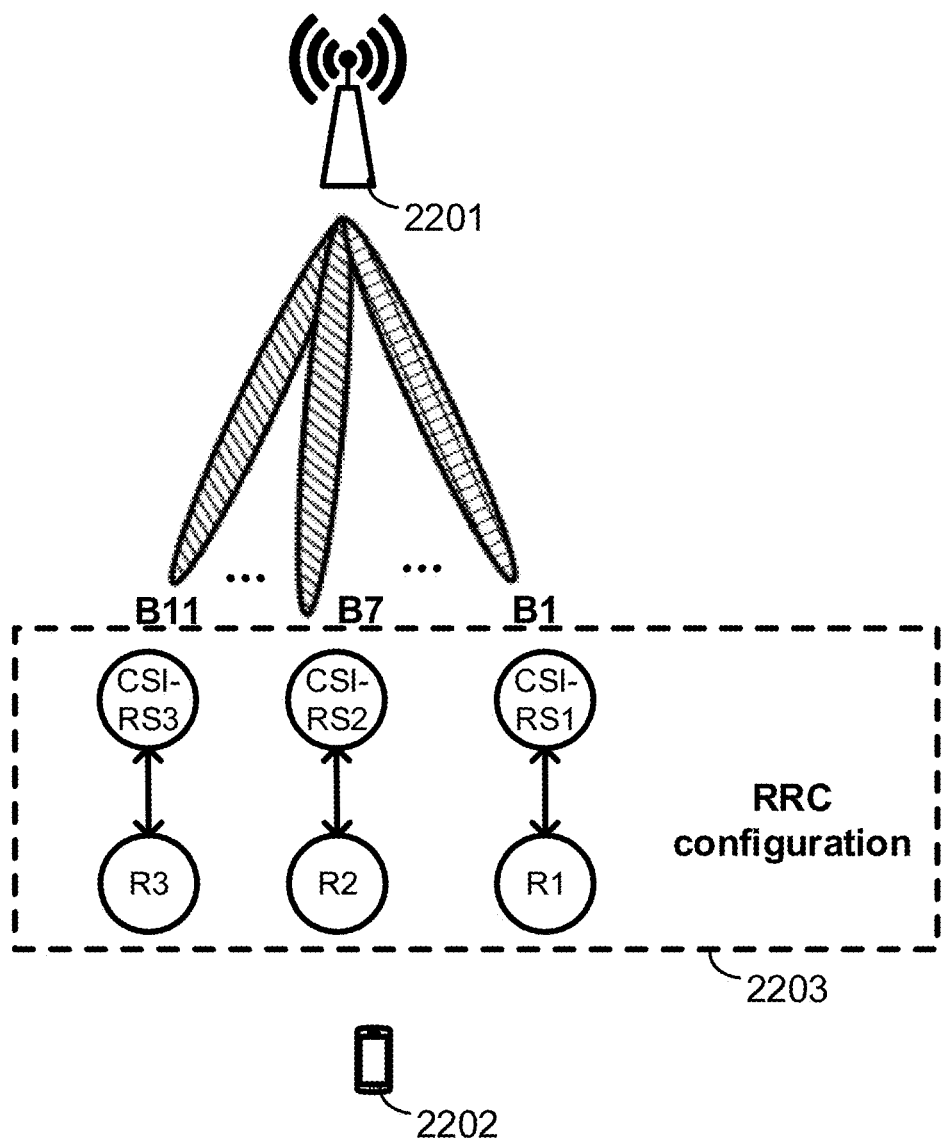
FIG. 22 shows an example of radio resource control (RRC) configurations for multiple beams.

FIG. 22 shows an example of radio resource control (RRC) configurations for multiple beams. A base station 2201 may send, to a wireless device 2202, RRC configuration parameters 2203 of a plurality of beams B1 to B11. Each beam may have an associated set of RRC configuration parameters. Beam B1 may be associated with CSI-RS1 and R1, beam B7 may be associated with CSI-RS2 and R2, and beam B11 may be associated with CSI-RS3 and R3. Beam B1 may be a serving beam and beam B7 and beam B8 may be candidate beams. If the wireless device 2202 receives RRC configuration parameters of beam B1, corresponding to R1, and if the wireless device 2202 detects a beam failure, the wireless device 2202 may send a preamble that corresponds to those parameters and, the wireless device 2202 may send the preamble via CSI-RS1 resources specified by those parameters. If the wireless device 2202 receives RRC configuration parameters of beam B7, corresponding to R2, and if the wireless device 2202 detects a beam failure, the wireless device 2202 may send a preamble that corresponds to those parameters and, the wireless device 2202 may send the preamble via CSI-RS2 resources specified by those parameters. If the wireless device 2202 receives RRC configuration parameters of beam B11, corresponding to R3, and if the wireless device 2202 detects a beam failure, the wireless device 2202 may send a preamble that corresponds to those parameters and, the wireless device 2202 may send the preamble via CSI-RS3 resources specified by those parameters. Any number of additional beams, or fewer beams, may be included, each having an associated CSI-RS and R parameters.

Figure 23:
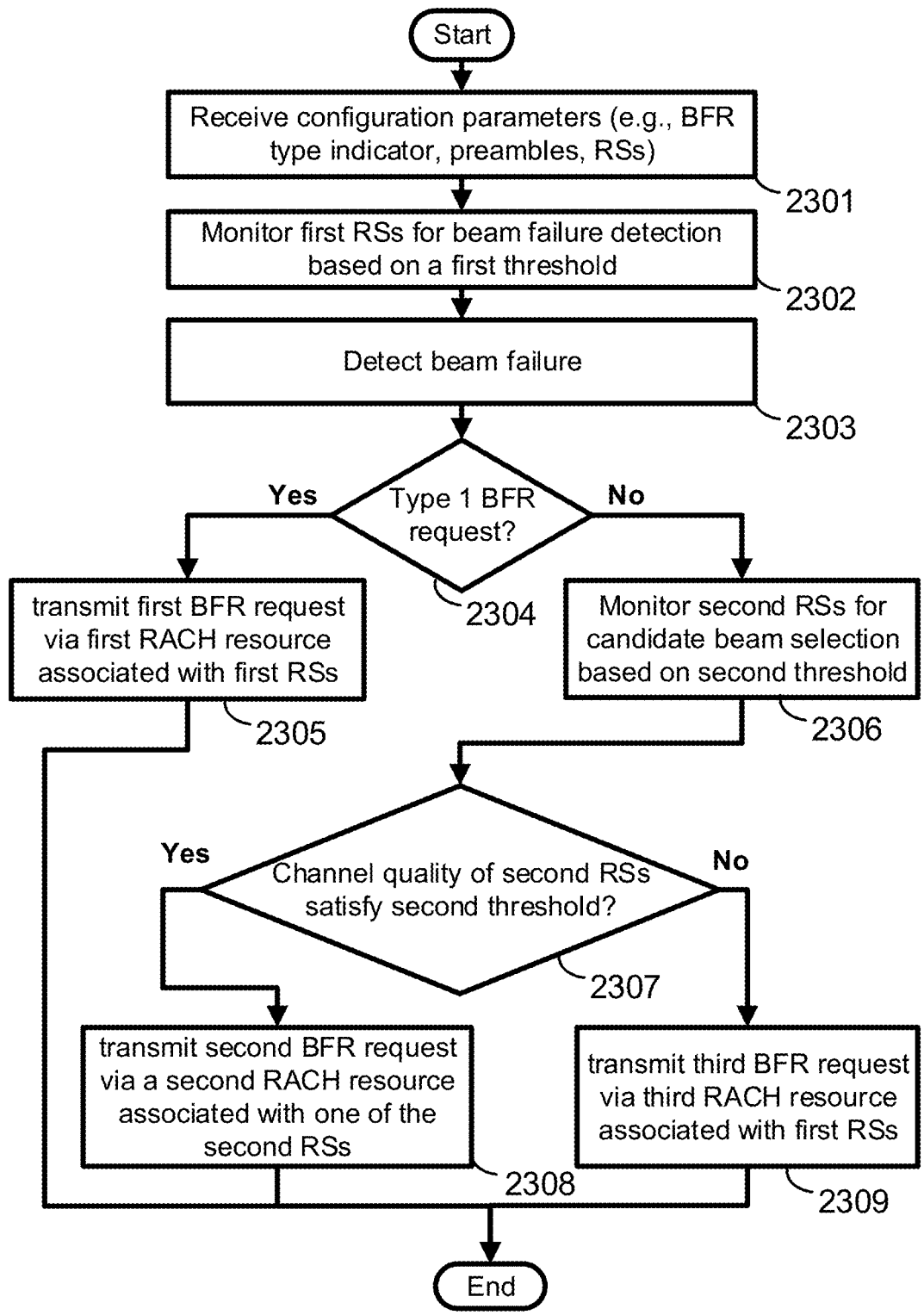
FIG. 23 shows an example of processes for a wireless device for beam failure recovery requests.

FIG. 23 shows example wireless device procedures for beam failure recovery. A base station may transmit one or more messages comprising configuration parameters indicating one or more PRACH resources to a wireless device. The base station may transmit the one or more messages via RRC messaging. The configuration parameters may indicate a type of a BFR request (e.g., type 1 or type 2). The configuration parameters may indicate a number of multiple BFR requests transmissions. The configuration parameters may comprise one or more preambles and/or RSs. The configuration parameters may comprise one or more first preambles and/or PRACHs associated with first RSs, one or more second preambles and/or PRACHs associated with second RSs, and one or more third (or other number) preambles and/or PRACHs associated with third (or other number) RSs. At step 2301, a wireless device may receive from the base station the configuration parameters. The configuration parameters may be used to configure the wireless device with a transmit beam (such as TxB1 in FIG. 21) as a serving beam. The configuration parameters may configure the wireless device with configured and/or activated transmit beams (such as TxB5 and TxB8 in FIG. 21). The base station may use the serving beam to transmit, and the wireless device may use the serving beam to receive, PDCCH signals and associated PDSCH signals for the wireless device.

The wireless device may monitor reference signals for a potential beam failure, at step 2302, e.g., after or in response to receiving configuration parameters. The wireless device may monitor a first set of RSs based on a first threshold. The first set of RSs may correspond to CSI-RSs of a serving beam. The first threshold may be determined based on measurements from one or more previous beam failure events. The first threshold may be set to a value at or near an average of previous beam failure events, or to a value above some or all previous beam failure events. The wireless device may monitor periodically for a duration of time (e.g., until an expiration of a timer) or until the first RSs fall below the first threshold.

At step 2303, the wireless device may detect a beam failure event. A detection of a beam failure event may comprise the wireless device determining that a channel quality of the first RSs fall below the first threshold. Additionally or alternatively, a detection of a beam failure event may comprise one or more measurements of a channel quality falling below the first threshold. The beam failure event may be on a serving beam (e.g., on TxB1 in FIG. 21). If a beam failure event occurs on the serving beam (e.g., TxB1 in FIG. 21), the wireless device may monitor configured and/or activated beams.

The wireless device may determine, at step 2304, whether a type 1 BFR request is configured, e.g., after or in response to detecting a beam failure event. Additionally or alternatively, the wireless device may determine, at step 2304, whether a type 2 BFR request, or another type BFR request, is configured.

If a type 1 BFR request is configured, the wireless device may transmit, at step 2305, one or more BFR requests. The wireless device may transmit, via a first RACH resource associated with first RSs, a first BFR request. The first RACH resource may comprise the resource associated with a serving beam on which a beam failure event was detected. The first RACH resource may comprise a first available RACH resource. The wireless device may transmit BFR requests, each with a configured number, via multiple BFR-PRACH resources. The wireless device may transmit the BFR requests via BFR-PRACH resources selected based on RSRP or other criteria (e.g., RSRQ, CQI, and/or waiting time). The wireless device may transmit the BFR request via a PRACH resource to indicate a beam failure event occurs on one or multiple serving beams and the wireless device does not find a candidate beam. The BFR request may indicate that no candidate beam may be found. For example, the wireless device may use a PRACH associated with a serving beam (e.g., TxB1) to transmit the BFR request. By transmitting the BFR request via the serving beam, the wireless device may indicate that a beam failure event has occurred on the serving beam. The wireless device may transmit a BFR request on a BFR-PRACH (e.g., R1 in FIG. 21). The BFR-PRACH may be based on a CSI-RS configuration (e.g., CSI-RS1 in FIG. 21). The wireless device may receive the CSI-RS configuration via a serving beam (e.g., TxB1 in FIG. 21). The base station may configure the wireless device with a PRACH preamble in the one or more PRACH resources, and/or the base station may configure the wireless device with a new set of reference signals, e.g., after or in response to receiving one or more BFR requests.

If, however, a type 1 BFR request is not configured, beginning with step 2306, the wireless device may determine one or more candidate beams. The wireless device may determine, e.g., at step 2306, whether a type 2 BFR request is configured. If the wireless device is configured with a second type BFR request transmission, the wireless device may determine one or more candidate beams. The wireless device may monitor second RSs for a candidate beam selection based on a second threshold. The second set of RSs may correspond to CSI-RSs of a candidate beam. The second threshold may be determined based on measurements from one or more previous serving beams or candidate beams. The second threshold may be set to a value at or near an average of previous serving beams or candidate beams, or to a value above some or all previous serving beams or candidate beams. The second threshold may be greater than the first threshold. The wireless device may monitor periodically for a duration of time (e.g., until an expiration of a timer) or until the second RSs exceed the second threshold.

At step 2307, the wireless device may determine whether a channel quality of the second RSs satisfies the second threshold. For example, if the channel quality of the second RSs is above the second threshold, the wireless device may transmit, at step 2308, a second BFR request. The wireless device may transmit the second BFR request via a second RACH resource that may be associated with one or more of the second RSs. If the channel quality of the second RSs is not above the second threshold, the wireless device may transmit, at step 2309, a third BFR request. The wireless device may transmit the third BFR request via a third RACH resource that may be associated with the first RSs. The third RACH resource may comprise the resource associated with a serving beam on which a beam failure event was detected. After transmission of a BFR request, e.g., at step 2305, step 2308, and/or step 2309, the wireless device may end the process or repeat one or more steps of FIG. 23. For example, the wireless device may receive new configuration parameters, or updated parameters, at step 2301, and repeat one or more of steps 2302-2309 thereafter.

If the wireless device determines a candidate beam (e.g., TxB5 or TxB8 in FIG. 21), the wireless device may transmit, e.g., after step 2306, a BFR request via a BFR-PRACH (e.g., R2 or R3) associated with the candidate beam (e.g., TxB5 or TxB8). If the wireless device determines a candidate beam from configured or activated multiple beams (e.g., TxB5 or TxB8), the wireless device may use the BFR-PRACH resource (e.g., CSI-RS2 or CSI-RS3, respectively) associated with the candidate beam to indicate the determined candidate beam associated with the BFR-PRACH. The wireless device may transmit (e.g., at step 2308) the BFR request via a PRACH resource that may be associated with a CSI-RS resource, or via a PRACH resource that may be associated with one or more groups of CSI-RS resources. If the wireless device is unable to determine a candidate beam, the wireless device may transmit (e.g., at step 2309) a BFR request via a PRACH resource (e.g., R1) associated with a serving beam (e.g., TxB1). By transmitting a BFR request via a PRACH resource associated with a serving beam, the wireless device may indicate that the serving beam has failed and that no candidate beam has been identified. Additionally or alternatively, if the wireless device does not identify a candidate beam from configured or activated multiple beams the wireless device may transmit multiple BFR requests via multiple BFR-PRACH resources (e.g., R1, R2, and R3), e.g., using the PRACH preamble in R1 to indicate that TxB1 fails and no candidate beam has been determined or identified. Any number of BFR requests may be transmitted by the wireless device. One or more BFR requests may be transmitted, via a BFR-PRACH resource associated with a CSI-RS resource of a beam, to indicate that there is no candidate beam. One or more BFR requests may be transmitted, by the wireless device, with the PRACH preamble associated with the BFR-PRACH resource of the one or multiple serving beams indicating that there is no candidate beam.

Any wireless device may perform any combination of one or more of the above steps of FIG. 23. A base station, a core network device, or any other device, may perform any combination of a step, or a complementary step, of one or more of the above steps. Some or all of these steps may be performed, and the order of these steps may be adjusted. For example, one or more of steps 2306 to 2309 may not be performed for a type 2 BFR request. As another example, step 2302 may be performed before step 2301. Additional steps may also be performed.

Figure 24:
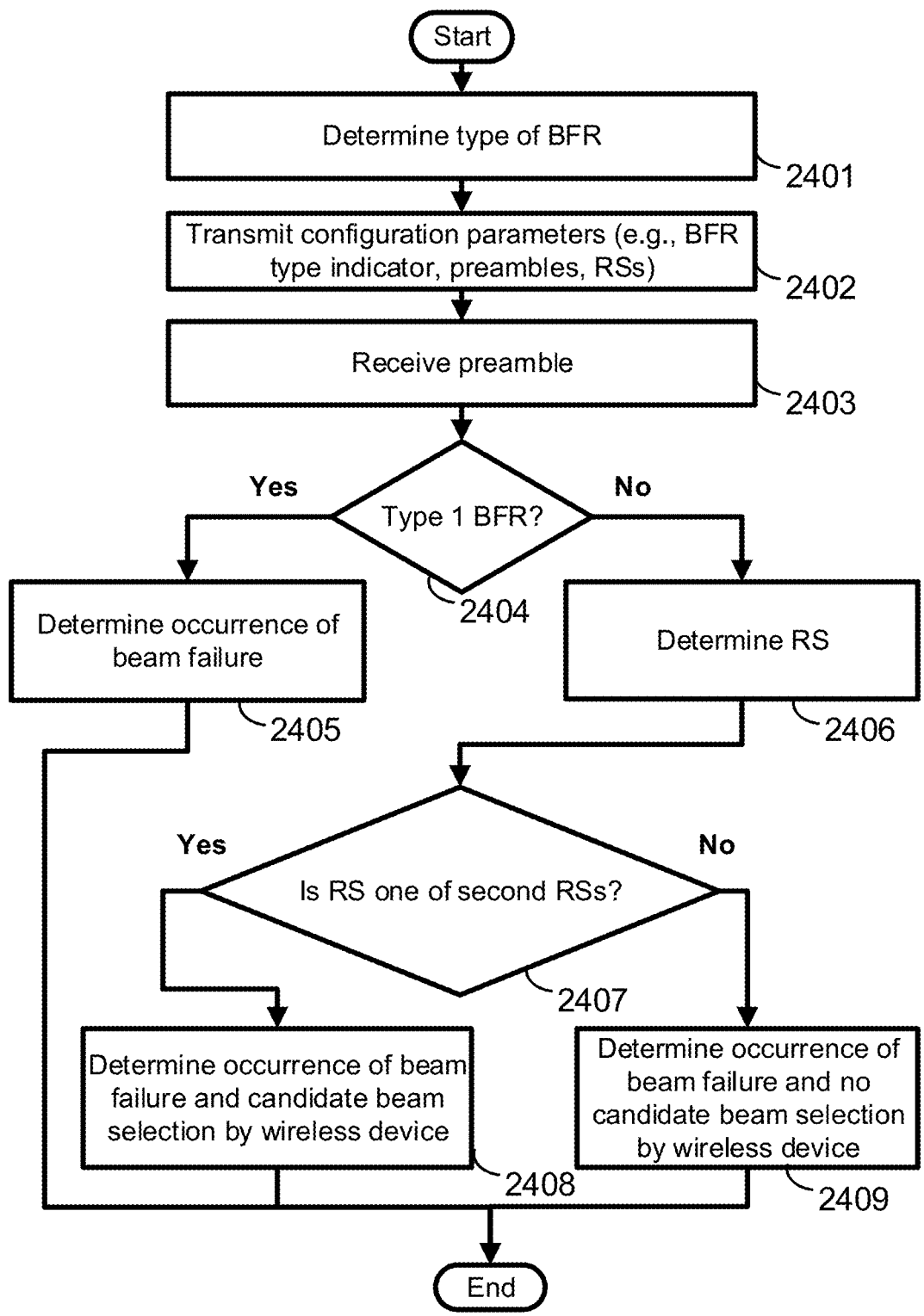
FIG. 24 shows an example of processes for a base station for beam failure recovery requests.

FIG. 24 shows example base station procedures for beam failure recovery. At step 2401, a base station may determine a type of BFR request, such as a type 1 BFR request or a type 2 BFR request. The base station may determine the type of BFR request based on one or more parameters associated with the base station, a wireless device, another base station, or any other device, e.g., that may communicate in a network comprising the base station. At step 2401, the base station may determine a list comprising CSI-RS configurations and BFR-PRACH configurations. Each CSI-RS configuration may be associated with a BFR-PRACH configuration in the list.

At step 2402, the base station may transmit, to the wireless device, configuration parameters, e.g., after or in response to determining the type of BFR request. These configuration parameters may comprise, e.g., a BFR type indicator, preambles, RSs, the list comprising the CSI-RS configurations and BFR-PRACH configurations, and/or an update for the list. The base station may transmit an update for the list in an RRC message. The BFR indicator may comprise an indication of one or more binary values, which may indicate, e.g., a type 1 BFR request or a type 2 BFR request. The base station may transmit these configuration parameters to a wireless device via RRC messaging. The base station may transmit, to a wireless device, a BFR type indicator at any time, including, e.g., in some or all RRC messages. After a BFR type indicator is transmitted, the BFR type may be changed by the base station via an updated BFR type indicator, e.g., in an RRC message.

At step 2403, the base station may receive, from the wireless device via a PRACH resource, a preamble. The preamble and PRACH resource may be associated with one or more of the configuration parameters transmitted by the base station in step 2402.

The base station may determine, at step 2404, whether a type of BFR request was type 1 (or type 2), e.g., after or in response to receiving the preamble. The base station may determine the type of BFR request by the BFR type determined at step 2401 and/or the BFR type indicator transmitted at step 2402. For a type 1 BFR request (e.g., the "Yes" path from step 2404), the base station may determine an occurrence of a beam failure, at step 2405. The base station may make such a determination based on the preamble transmitted by the wireless device, which may include, e.g., the received power of the preamble and/or one or more indications of signal quality. For a type 2 BFR request (e.g., the "No" path from step 2404), the base station may determine one or more RSs associated with the preamble and/or PRACH resource from step 2403.

The base station may determine, at step 2407, whether the one or more RSs is one of a second RSs, e.g., after or in response to determining one or more RSs. The second RSs may comprise RSs associated with a candidate beam from the base station. If the one or more RSs is one of a second RSs (e.g., the "Yes" path from step 2407), the base station may determine, at step 2408, an occurrence of beam failure and candidate beam selection by the wireless device. For example, a determination that an RS is received from the wireless device that corresponds to a second RS associated with a second candidate beam transmitted by the base station may indicate that the wireless device detected a beam failure and selected the second candidate beam. If the one or more RSs is not one of a second RSs (e.g., the "No" path from step 2407), the base station may determine, at step 2409, an occurrence of beam failure without a candidate beam selection by the wireless device. For example, a determination that an RS is received from the wireless device that does not correspond to a second RS associated with a second candidate beam transmitted by the base station may indicate that the wireless device detected a beam failure but did not select the second candidate beam.

After steps 2405, 2408, and/or 2409, the base station may reconfigure the first RSs and/or the second RSs (or other RSs), the base station may repeat one or more steps of FIG. 24, and/or the process may end. The base station may perform one or more steps of FIG. 24 for some or all transmissions of configuration parameters (e.g., for some or all RRC messages), and/or after receiving new or updated information.

Any base station may perform any combination of one or more of the above steps of FIG. 24. A wireless device, a core network device, or any other device, may perform any combination of a step, or a complementary step, of one or more of the above steps. Some or all of these steps may be performed, and the order of these steps may be adjusted. For example, one or more of steps 2406 to 2409 may not be performed for a type 2 BFR request. As another example, step 2404 may be performed before step 2403. Additional steps may also be performed.

Figure 25:
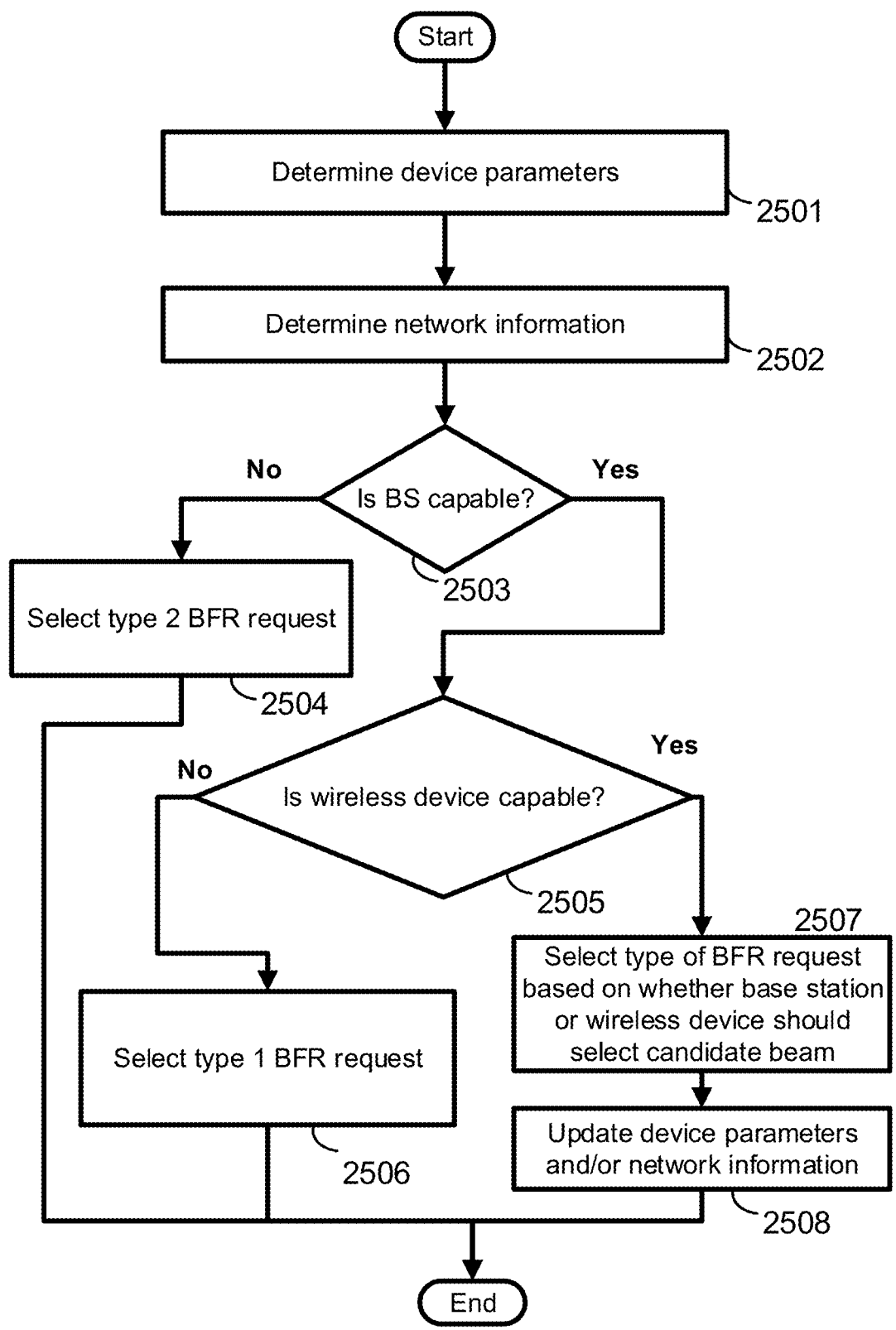
FIG. 25 shows an example of processes for a base station to determine a beam failure request type.

FIG. 25 shows example procedures for determining a type of a BFR request, such as a type 1 BFR request or a type 2 BFR request. Some or all of the example procedures shown and described with respect to FIG. 25 may be performed, e.g., as part of step 2401 described above with respect to FIG. 24, to determine a type of BFR request. At step 2501, a base station may determine one or more parameters that may be associated with a device capability. The base station may determine, for a wireless device, a type of BFR request based on the one or more parameters. The one or more parameters may be stored in the base station and/or the base station may receive the one or more parameters, e.g., from one or more other devices. The one or more parameters may include parameters associated with the wireless device, the base station, a target base station, neighboring base stations, or any other device(s). Parameters associated with the wireless device may include wireless device capability parameters, such as whether the wireless device is capable of determining a candidate beam within a threshold time period and/or within a threshold amount of available power. For example, a wireless device that performs monitoring with low periodicity may not have sufficient capability to determine a candidate beam and may be best suited for a type 1 BFR request, whereas a wireless device that performs monitoring at a high periodicity may have sufficient capability to determine a candidate beam (e.g., for a type 2 BFR request). For example, a wireless device that supports beam correspondence between a transmitting beam and a receiving beam may have sufficient capability to determine a candidate beam (e.g., for a type 2 BFR request). A wireless device that does not support beam correspondence between a transmitting beam and a receiving beam may not have sufficient capability to determine a candidate beam, and as a result, the wireless device may be better suited for a type 1 BFR request. A beam correspondence between a transmitting beam and a receiving beam may correspond to a capability such that a wireless device may determine a transmitting beam based on a receiving beam. Parameters associated with a base station may include base station capability parameters, such as whether the base station is capable of determining a candidate beam within a threshold time period or within a threshold amount of available power. For example, a base station serving more than a threshold number of wireless devices may not have the availability to determine a candidate beam for a particular wireless device, e.g., and the base station may select a type 2 BFR request to indicate the wireless device should determine a candidate beam. A base station serving a threshold number or fewer wireless devices may have the availability to determine a candidate beam, e.g., and the base station may select a type 1 BFR request to indicate the wireless device should not determine candidate beam.

At step 2502, the base station may determine network information. The base station may determine the network information from stored information and/or the base station may receive the network information, e.g., from one or more other devices. Network information may include, e.g., signal quality information, indication of prior beam failure, or any information related to a network in which the base station communicates. Network information may include information known to a base station that may not be known to a wireless device. For example, if a wireless device is communicating with a plurality of base stations and experiences a beam failure in a first direction with a first base station (e.g., if an obstruction blocks a beam between the first base station and the wireless device) but the wireless device maintains communications on a beam in a second direction with a second base station, the first base station and the second base station may determine information about the beam failure (e.g., via sharing information among base stations) and based on that information the first base station and/or the second base station may have better information from which to determine a candidate beam for the wireless device than the wireless device itself. In such an example, a type 1 BFR request may be selected by a base station to enable the base station to determine a candidate beam for the wireless device.

At step 2503, the base station may determine whether it is capable of determining one or more candidate beams for a wireless device. The base station may determine such capability, or lack thereof, based on the one or more parameters determined at step 2501 and/or the network information determined at step 2502. If the base station determines that it is not capable of determining one or more candidate beams for the wireless device (e.g., the "No" path from step 2503), the base station may select a type 2 BFR request, at step 2504. A BFR type indicator that indicates a type 2 BFR request may indicate that the wireless device should determine one or more candidate beams for a BFR request. The wireless device may determine a candidate beam and send a BFR request via resources associated with the candidate beam. If the base station determines that it is capable of determining one or more candidate beams for the wireless device (e.g., the "Yes" path from step 2503), the process may continue to step 2505.

At step 2505, the base station may determine whether a wireless device is capable of determining one or more candidate beams. The base station may determine such capability, or lack thereof, based on the one or more parameters determined at step 2501 and/or the network information determined at step 2502. If the base station determines that the wireless device is not capable of determining one or more candidate beams (e.g., the "No" path from step 2505), the base station may select a type 1 BFR request, at step 2506. A BFR type indicator that indicates a type 1 BFR request may indicate that the wireless device should not determine one or more candidate beams for a BFR request. The wireless device may send a BFR request via resources associated with a serving beam on which the wireless device detected a beam failure event. If the base station determines that the wireless device is capable of determining one or more candidate beams (e.g., the "Yes" path from step 2505), the base station may analyze the one or more parameters from step 2501, and/or the base station may analyze the network information from step 2502, to determine whether the base station or the wireless device is better suited to determine one or more candidate beams. Based on the analysis and determination in step 2507, the base station may select a type of BFR request (e.g., type 1 or type 2). For example, if the wireless device is better suited than the base station to determine one or more candidate beams, the base station may select a type 2 BFR request. If the wireless device is not better suited than the base station to determine one or more candidate beams, the base station may select a type 1 BFR request. At step 2508, the base station may update the one or more parameters and/or the network information with information from the analysis and determination in step 2507. After step 2508, the base station may station may end the process, or repeat one or more of the above steps. The base station may perform one or more steps of FIG. 25 for some or all transmissions of configuration parameters (e.g., for some or all RRC messages), and/or after receiving new or updated parameters or network information.

Any base station may perform any combination of one or more of the above steps of FIG. 25. A wireless device, a core network device, or any other device, may perform any combination of a step, or a complementary step, of one or more of the above steps. Some or all of these steps may be performed, and the order of these steps may be adjusted. For example, one or more of steps 2501 or 2502 may not be performed. As other examples, step 2503 may be performed before step 2505. Results of step 2501 may be weighted differently from results of step 2502 for the selection of a type of BFR request at step 2507.

Any device may perform any combination of one or more steps described herein. A base station and/or a wireless device, or any other device, may perform any combination of a step, or a complementary step, of one or more steps described herein. Any base station described herein may be a current base station, a serving base station, a source base station, a target base station, or any other base station.

Figure 26:
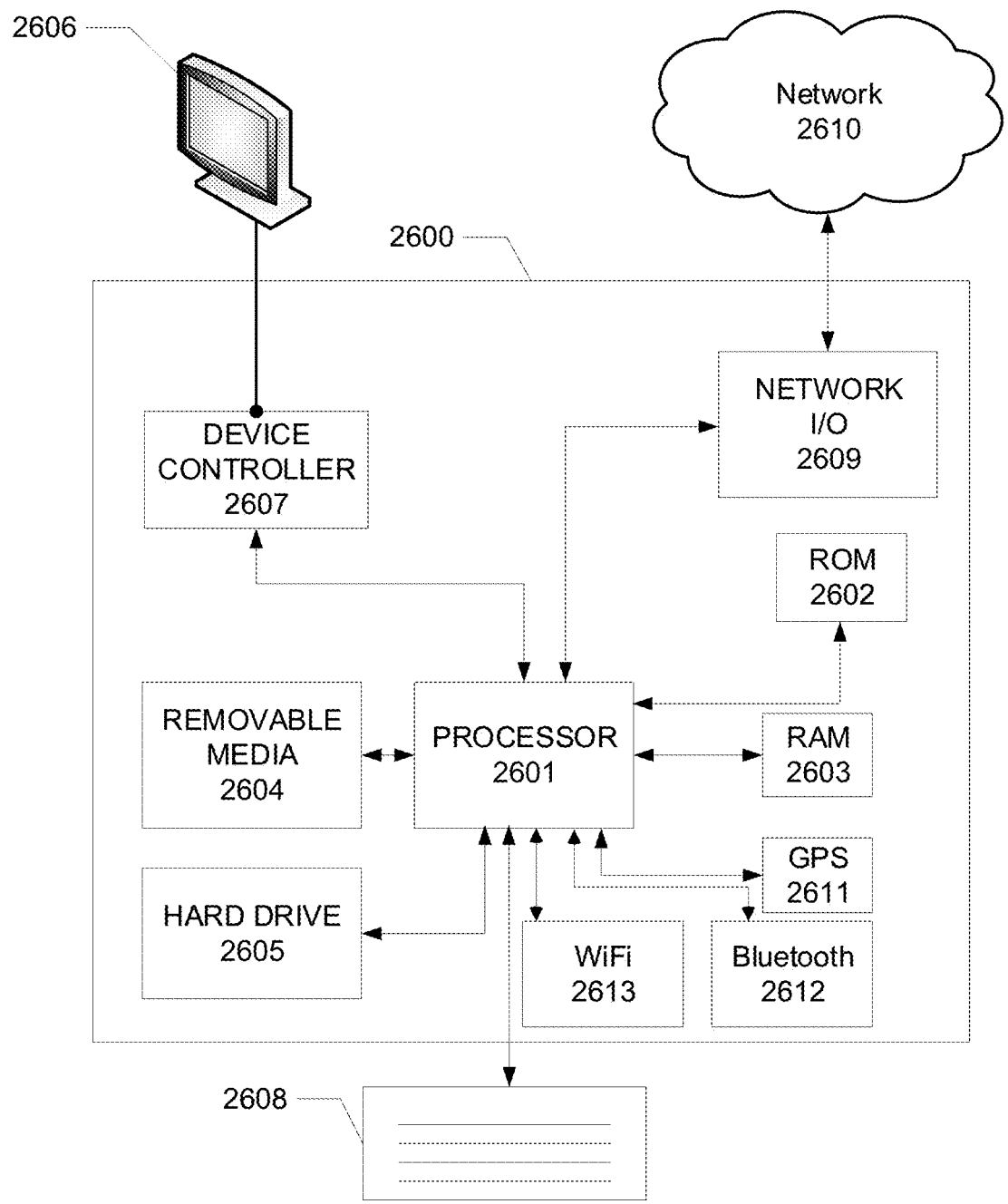
FIG. 26 shows example elements of a computing device that may be used to implement any of the various devices described herein.

FIG. 26 shows general hardware elements that may be used to implement any of the various computing devices discussed herein, including, e.g., the base station 401, the base station 1501, the base station 1621, the base station 1701, the base station 1901, the first base station 2001, the second base station 2006, the base station 2101, the base station 2201, the wireless device 406, the wireless device 1620, the wireless device 1902, the wireless device 2002, the wireless device 2102, the wireless device 2202, or any other base station, wireless device, or computing device. The computing device 2600 may include one or more processors 2601, which may execute instructions stored in the random access memory (RAM) 2603, the removable media 2604 (such as a Universal Serial Bus (USB) drive, compact disk (CD) or digital versatile disk (DVD), or floppy disk drive), or any other desired storage medium. Instructions may also be stored in an attached (or internal) hard drive 2605. The computing device 2600 may also include a security processor (not shown), which may execute instructions of a one or more computer programs to monitor the processes executing on the processor 2601 and any process that requests access to any hardware and/or software components of the computing device 2600 (e.g., ROM 2602, RAM 2603, the removable media 2604, the hard drive 2605, the device controller 2607, a network interface 2609, a GPS 2611, a Bluetooth interface 212, a WiFi interface 2613, etc.). The computing device 2600 may include one or more output devices, such as the display 2606 (e.g., a screen, a display device, a monitor, a television, etc.), and may include one or more output device controllers 2607, such as a video processor. There may also be one or more user input devices 2608, such as a remote control, keyboard, mouse, touch screen, microphone, etc. The computing device 2600 may also include one or more network interfaces, such as a network interface 2609, which may be a wired interface, a wireless interface, or a combination of the two. The network interface 2609 may provide an interface for the computing device 2600 to communicate with a network 2610 (e.g., a RAN, or any other network). The network interface 2609 may include a modem (e.g., a cable modem), and the external network 2610 may include communication links, an external network, an in-home network, a provider's wireless, coaxial, fiber, or hybrid fiber/coaxial distribution system (e.g., a DOCSIS network), or any other desired network. Additionally, the computing device 2600 may include a location-detecting device, such as a global positioning system (GPS) microprocessor 2611, which may be configured to receive and process global positioning signals and determine, with possible assistance from an external server and antenna, a geographic position of the computing device 2600.

The example in FIG. 26 is a hardware configuration, although the components shown may be implemented as software as well. Modifications may be made to add, remove, combine, divide, etc. components of the computing device 2600 as desired. Additionally, the components may be implemented using basic computing devices and components, and the same components (e.g., processor 2601, ROM storage 2602, display 2606, etc.) may be used to implement any of the other computing devices and components described herein. For example, the various components described herein may be implemented using computing devices having components such as a processor executing computer-executable instructions stored on a computer-readable medium, as shown in FIG. 26. Some or all of the entities described herein may be software based, and may co-exist in a common physical platform (e.g., a requesting entity may be a separate software process and program from a dependent entity, both of which may be executed as software on a common computing device).

One or more features of the disclosure may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features of the disclosure, and such data structures are contemplated within the scope of computer executable instructions and computer-usable data described herein.

Many of the elements in examples may be implemented as modules. A module may be an isolatable element that performs a defined function and has a defined interface to other elements. The modules may be implemented in hardware, software in combination with hardware, firmware, wetware (i.e., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and complex programmable logic devices (CPLDs). Computers, microcontrollers, and microprocessors may be programmed using languages such as assembly, C, C++ or the like. FPGAs, ASICs, and CPLDs may be programmed using hardware description languages (HDL), such as VHSIC hardware description language (VHDL) or Verilog, which may configure connections between internal hardware modules with lesser functionality on a programmable device. The above mentioned technologies may be used in combination to provide the result of a functional module.

Systems, apparatuses, and methods may perform operations of multi-carrier communications described herein. Additionally or alternatively, a non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a UE, a base station, and the like) to enable operation of multi-carrier communications described herein. The device, or one or more devices such as in a system, may include one or more processors, memory, interfaces, and/or the like. Other examples may comprise communication networks comprising devices such as base stations, wireless devices or user equipment (UE), servers, switches, antennas, and/or the like. Any device (e.g., a wireless device, a base station, or any other device) or combination of devices may be used to perform any combination of one or more of steps described herein, including, e.g., any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

What is claimed is:

1. A method comprising:
    receiving, by a wireless device from a base station, one or more messages comprising a plurality of parameters, wherein the plurality of parameters indicates:
        a first plurality of reference signals;
        a second plurality of reference signals;
        one or more random access preambles; and
        a beam failure recovery type indicator;
    detecting, based on at least one of the first plurality of reference signals, at least one beam failure;
    after the detecting the at least one beam failure, selecting, based on the beam failure recovery type indicator and a quality of the second plurality of reference signals, a preamble of the one or more random access preambles; and
    transmitting the selected preamble.

2. The method of claim 1, wherein the first plurality of reference signals comprises at least one of:
    synchronization signal blocks;
    demodulation reference signals of a physical broadcast channel; or
    channel state information reference signals.

3. The method of claim 1, wherein the second plurality of reference signals comprises at least one of:
    synchronization signal blocks;
    demodulation reference signals of a physical broadcast channel; or
    channel state information reference signals.

4. The method of claim 1, wherein the transmitting the selected preamble comprises transmitting, based on the beam failure recovery type indicator indicating a beam failure recovery type other than a first beam failure recovery type, an indication of a candidate beam.

5. The method of claim 1, wherein the selecting is further based on whether the wireless device detects at least one candidate reference signal of the second plurality of reference signals.

6. The method of claim 1, wherein the detecting the at least one beam failure comprises:
    determining that a quality of at least one reference signal of the first plurality of reference signals is below a threshold.

7. The method of claim 1, further comprising:
before the selecting the preamble, determining that a quality of at least one reference signal of the second plurality of reference signals is above a threshold.

8. A method comprising:
determining, by a base station, a beam failure recovery type for a wireless device;
transmitting, by the base station to the wireless device, one or more messages comprising a plurality of parameters, wherein the plurality of parameters indicates:
a first plurality of reference signals;
a second plurality of reference signals;
one or more random access preambles; and
a beam failure recovery type indicator; and
receiving, from the wireless device, a preamble, wherein the preamble is based on:
the beam failure recovery type indicator; and
a quality of the second plurality of reference signals.

9. The method of claim 8, wherein the first plurality of reference signals comprises at least one of:
synchronization signal blocks;
demodulation reference signals of a physical broadcast channel; or
channel state information reference signals.

10. The method of claim 8, wherein the second plurality of reference signals comprises at least one of:
synchronization signal blocks;
demodulation reference signals of a physical broadcast channel; or
channel state information reference signals.

11. The method of claim 8, wherein the receiving the preamble comprises receiving an indication of a candidate beam.

12. The method of claim 8, further comprising determining, based on the receiving the preamble, whether the wireless device received the beam failure recovery type indicator.

13. The method of claim 8, further comprising:
determining, based on the preamble, at least one beam failure associated with the wireless device; and
determining that a quality of at least one reference signal of the first plurality of reference signals is below a threshold.

14. The method of claim 8, further comprising:
after the receiving the preamble, determining that a quality of at least one reference signal of the second plurality of reference signals is above a threshold.

15. A method comprising:
receiving, by a wireless device from a base station, one or more messages comprising a plurality of parameters, wherein the plurality of parameters indicates:
a plurality of reference signals; and
a beam failure recovery type indicator;
detecting, based on at least one of the plurality of reference signals, at least one beam failure;
determining, based on the beam failure recovery type indicator, a type of a beam failure recovery request for the at least one beam failure; and
transmitting, via a random access channel resource selected based on the type of the beam failure recovery request, a preamble associated with the beam failure recovery request.

16. The method of claim 15, further comprising:
selecting, based on the type of the beam failure recovery request, the random access channel resource from:
a first available random access channel resource; or
a second random access channel resource different from the first available random access channel resource.

17. The method of claim 15, wherein:
the plurality of parameters indicates one or more random access preambles; and
the plurality of reference signals comprises:
a first plurality of reference signals; and
a second plurality of reference signals.

18. The method of claim 17, further comprising:
after detecting the at least one beam failure, selecting, based on the beam failure recovery type indicator and a quality of the second plurality of reference signals, the preamble,
wherein the detecting the at least one beam failure is based on at least one of the first plurality of reference signals.

19. The method of claim 15, further comprising:
after detecting the at least one beam failure, selecting, based on the beam failure recovery type indicator indicating a first beam failure recovery type, a first random access channel resource associated with a first reference signal,
wherein the detecting the at least one beam failure is based on the first reference signal.

20. The method of claim 15, further comprising:
after detecting the at least one beam failure, selecting, based on the beam failure recovery type indicator indicating a second beam failure recovery type, a first random access channel resource associated with a first reference signal,
wherein the detecting the at least one beam failure is based on a second reference signal associated with a second random access channel resource different from the first random access channel resource.

21. A method comprising:
transmitting, by a base station to a wireless device, one or more messages comprising a plurality of parameters, wherein the plurality of parameters indicates:
a plurality of reference signals; and
a beam failure recovery type indicator;
receiving, via a random access channel resource selected based on a type of a beam failure recovery request, a preamble associated with the beam failure recovery request, wherein the type of the beam failure recovery request is based on the beam failure recovery type indicator; and
transmitting, to the wireless device and after receiving the preamble, a response for beam failure recovery.

22. The method of claim 21, wherein:
the plurality of parameters indicates one or more random access preambles; and
the plurality of reference signals comprises:
a first plurality of reference signals; and
a second plurality of reference signals.

23. The method of claim 22, wherein the preamble is associated with at least one of the second plurality of reference signals, and
wherein at least one beam failure is associated with at least one of the first plurality of reference signals.

24. The method of claim 21, wherein:
the beam failure recovery type indicator indicates a first beam failure recovery type;
the receiving the preamble comprises receiving the preamble via a first random access channel resource associated with a first reference signal; and at least one beam failure is associated with the first reference signal.

25. The method of claim 21, wherein:
the beam failure recovery type indicator indicates a second beam failure recovery type;
the receiving the preamble comprises receiving the preamble via a first random access channel resource associated with a first reference signal; and
at least one beam failure is associated with a second reference signal associated with a second random access channel resource different from the first random access channel resource.

26. A wireless device comprising:
one or more processors; and
memory storing instructions that, when executed by the one or more processors, cause the wireless device to:
receive, from a base station, one or more messages comprising a plurality of parameters, wherein the plurality of parameters indicates:
a first plurality of reference signals;
a second plurality of reference signals;
one or more random access preambles; and
a beam failure recovery type indicator;
detect, based on at least one of the first plurality of reference signals, at least one beam failure;
after detecting the at least one beam failure, select, based on the beam failure recovery type indicator and a quality of the second plurality of reference signals, a preamble of the one or more random access preambles; and
transmit the selected preamble.

27. The wireless device of claim 26, wherein the first plurality of reference signals comprises at least one of:
synchronization signal blocks;
demodulation reference signals of a physical broadcast channel; or
channel state information reference signals.

28. The wireless device of claim 26, wherein the second plurality of reference signals comprises at least one of:
synchronization signal blocks;
demodulation reference signals of a physical broadcast channel; or
channel state information reference signals.

29. The wireless device of claim 26, wherein the instructions, when executed by the one or more processors, cause the wireless device to transmit the selected preamble by:
transmitting, based on the beam failure recovery type indicator indicating a beam failure recovery type other than a first beam failure recovery type, an indication of a candidate beam.

30. The wireless device of claim 26, wherein the instructions, when executed by the one or more processors, cause the wireless device to select the preamble by selecting the preamble based on whether the wireless device detects at least one candidate reference signal of the second plurality of reference signals.

31. The wireless device of claim 26, wherein the instructions, when executed by the one or more processors, cause the wireless device to detect the at least one beam failure by:
determining that a quality of at least one reference signal of the first plurality of reference signals is below a threshold.

32. The wireless device of claim 26, wherein the instructions, when executed by the one or more processors, cause the wireless device to:
before selecting the preamble, determine that a quality of at least one reference signal of the second plurality of reference signals is above a threshold.

33. A base station comprising:
one or more processors; and
memory storing instructions that, when executed by the one or more processors, cause the base station to:
determine a beam failure recovery type for a wireless device;
transmit, to the wireless device, one or more messages comprising a plurality of parameters, wherein the plurality of parameters indicates:
a first plurality of reference signals;
a second plurality of reference signals;
one or more random access preambles; and
a beam failure recovery type indicator; and
receive, from the wireless device, a preamble, wherein the preamble is based on:
the beam failure recovery type indicator; and
a quality of the second plurality of reference signals.

34. The base station of claim 33, wherein the first plurality of reference signals comprises at least one of:
synchronization signal blocks;
demodulation reference signals of a physical broadcast channel; or
channel state information reference signals.

35. The base station of claim 33, wherein the second plurality of reference signals comprises at least one of:
synchronization signal blocks;
demodulation reference signals of a physical broadcast channel; or
channel state information reference signals.

36. The base station of claim 33, wherein the instructions, when executed by the one or more processors, cause the base station to receive the preamble by receiving an indication of a candidate beam.

37. The base station of claim 33, wherein the instructions, when executed by the one or more processors, cause the base station to determine, based on receiving the preamble, whether the wireless device received the beam failure recovery type indicator.

38. The base station of claim 33, wherein the instructions, when executed by the one or more processors, cause the base station to:
determine, based on the preamble, at least one beam failure associated with the wireless device; and
determine that a quality of at least one reference signal of the first plurality of reference signals is below a threshold.

39. The base station of claim 33, wherein the instructions, when executed by the one or more processors, cause the base station to:
after receiving the preamble, determine that a quality of at least one reference signal of the second plurality of reference signals is above a threshold.

40. A wireless device comprising:
one or more processors; and
memory storing instructions that, when executed by the one or more processors, cause the wireless device to:
receive, from a base station, one or more messages comprising a plurality of parameters, wherein the plurality of parameters indicates:
a plurality of reference signals; and
a beam failure recovery type indicator;
detect, based on at least one of the plurality of reference signals, at least one beam failure;

determine, based on the beam failure recovery type indicator, a type of a beam failure recovery request for the at least one beam failure; and transmit, via a random access channel resource selected based on the type of the beam failure recovery request, a preamble associated with the beam failure recovery request.

41. The wireless device of claim 40, wherein the instructions, when executed by the one or more processors, cause the wireless device to:

select, based on the type of the beam failure recovery request, the random access channel resource from:
a first available random access channel resource; or
a second random access channel resource different from the first available random access channel resource.

42. The wireless device of claim 40, wherein:
the plurality of parameters indicates one or more random access preambles; and
the plurality of reference signals comprises:
a first plurality of reference signals; and
a second plurality of reference signals.

43. The wireless device of claim 42, wherein the instructions, when executed by the one or more processors, cause the wireless device to:
after detecting the at least one beam failure, select, based on the beam failure recovery type indicator and a quality of the second plurality of reference signals, the preamble; and
detect the at least one beam failure further based on at least one of the first plurality of reference signals.

44. The wireless device of claim 40, wherein the instructions, when executed by the one or more processors, cause the wireless device to:
after detecting the at least one beam failure, select, based on the beam failure recovery type indicator indicating a first beam failure recovery type, a first random access channel resource associated with a first reference signal; and
detect the at least one beam failure further based on the first reference signal.

45. The wireless device of claim 40, wherein the instructions, when executed by the one or more processors, cause the wireless device to:
after detecting the at least one beam failure, select, based on the beam failure recovery type indicator indicating a second beam failure recovery type, a first random access channel resource associated with a first reference signal; and
detect the at least one beam failure further based on a second reference signal associated with a second random access channel resource different from the first random access channel resource.

46. A base station comprising:
one or more processors; and
memory storing instructions that, when executed by the one or more processors, cause the base station to:
transmit, to a wireless device, one or more messages comprising a plurality of parameters, wherein the plurality of parameters indicates:
a plurality of reference signals; and
a beam failure recovery type indicator;
receive, via a random access channel resource selected based on a type of a beam failure recovery request, a preamble associated with the beam failure recovery request, wherein the type of the beam failure recovery request is based on the beam failure recovery type indicator; and
transmit, to the wireless device and after receiving the preamble, a response for beam failure recovery.

47. The base station of claim 46, wherein:
the plurality of parameters indicates one or more random access preambles; and
the plurality of reference signals comprises:
a first plurality of reference signals; and
a second plurality of reference signals.

48. The base station of claim 47, wherein the preamble is associated with at least one of the second plurality of reference signals, and
wherein at least one beam failure is associated with at least one of the first plurality of reference signals.

49. The base station of claim 46, wherein:
the beam failure recovery type indicator indicates a first beam failure recovery type;
the instructions, when executed by the one or more processors, cause the base station to receive the preamble by receiving the preamble via a first random access channel resource associated with a first reference signal; and
at least one beam failure is associated with the first reference signal.

50. The base station of claim 46, wherein:
the beam failure recovery type indicator indicates a second beam failure recovery type;
the instructions, when executed by the one or more processors, cause the base station to receive the preamble by receiving the preamble via a first random access channel resource associated with a first reference signal; and
at least one beam failure is associated with a second reference signal associated with a second random access channel resource different from the first random access channel resource.

* * * * *

UNITED STATES PATENT AND TRADEMARK OFFICE
CERTIFICATE OF CORRECTION

PATENT NO. : 11,337,265 B2
APPLICATION NO. : 16/101307
DATED : May 17, 2022
INVENTOR(S) : Hua Zhou et al.

It is certified that error appears in the above-identified patent and that said Letters Patent is hereby corrected as shown below:

On the Title Page

Item (56) Other Publications, Page 4, Column 2, Line 52:
Please delete "ZIE," and insert --ZTE,--

Item (56) Other Publications, Page 5, Column 1, Line 17:
After "procedures.", delete "actions."

Item (56) Other Publications, Page 5, Column 1, Line 20:
After "recovery", insert --actions.--

Item (56) Other Publications, Page 5, Column 1, Line 34:
Delete "Discussior" and insert --Discussion--

Item (56) Other Publications, Page 6, Column 1, Line 11:
Delete "Incorpated," and insert --Incorporated,--

Item (56) Other Publications, Page 6, Column 1, Line 21:
Delete "mutli-CC" and insert --multi-CC--

Item (56) Other Publications, Page 6, Column 2, Line 15:
Delete "Bedin," and insert --Berlin,--

Item (56) Other Publications, Page 6, Column 2, Line 19:
Delete "an" and insert --on--

Item (56) Other Publications, Page 6, Column 2, Line 31:
Delete "DE" and insert --CE--

Signed and Sealed this
Thirteenth Day of August, 2024

Katherine Kelly Vidal
*Director of the United States Patent and Trademark Office*

CERTIFICATE OF CORRECTION (continued)
U.S. Pat. No. 11,337,265 B2

Item (56) Other Publications, Page 6, Column 2, Line 44:
Delete "tor" and insert --for--

Item (56) Other Publications, Page 7, Column 1, Line 2:
Delete "DE" and insert --CE--

Item (56) Other Publications, Page 7, Column 1, Line 22:
Delete "R1-171 1161" and insert --R1-1711161--

Item (56) Other Publications, Page 7, Column 1, Line 27:
Delete "Extented" and insert --Extended--

Item (56) Other Publications, Page 7, Column 1, Line 34:
Delete "Bsues" and insert --issues--

Item (56) Other Publications, Page 7, Column 1, Line 53:
Delete "May 1, 20194" and insert --May 14, 2019--

Item (56) Other Publications, Page 8, Column 1, Line 22:
Delete "#8 8bis," and insert --#88bis,--

Item (56) Other Publications, Page 8, Column 1, Line 65:
Delete "Shangha" and insert --Shanghai--

Item (56) Other Publications, Page 8, Column 2, Line 7:
Delete "R1-1713Z04" and insert --R1-1713204--

Item (56) Other Publications, Page 8, Column 2, Line 50:
Delete "Nov. Z7-Dec. 1, 2017," and insert --Nov. 27-Dec. 1, 2017,--

Item (56) Other Publications, Page 8, Column 2, Line 52:
Delete "R2-1714Z89" and insert --R2-1714289--

Item (56) Other Publications, Page 8, Column 2, Line 53:
Delete "Nov. Z7-Dec. 1, 2017," and insert --Nov. 27-Dec. 1, 2017,--

Item (56) Other Publications, Page 8, Column 2, Line 64:
Delete "R2-18019Z6" and insert --R2-1801926--

Item (56) Other Publications, Page 8, Column 2, Lines 64-65:
Delete "Feb. 26-Mar. 2, Z018," and insert --Feb. 26-Mar. 2, 2018,--

Item (56) Other Publications, Page 9, Column 1, Line 4:
Delete "R2-1803ZZ9" and insert --R2-1803229--

CERTIFICATE OF CORRECTION (continued)
U.S. Pat. No. 11,337,265 B2

Item (56) Other Publications, Page 9, Column 1, Line 29:
Delete "Apr. 16-20, Z018," and insert --Apr. 16-20, 2018,--

Item (56) Other Publications, Page 9, Column 1, Line 30:
Delete "RZ-180448Z" and insert --R2-1804482--

Item (56) Other Publications, Page 9, Column 1, Line 34:
Delete "Apr. 16-20, Z018," and insert --Apr. 16-20, 2018,--

Item (56) Other Publications, Page 9, Column 2, Line 8:
Delete "May 21-25, Z018," and insert --May 21-25, 2018,--

Item (56) Other Publications, Page 9, Column 2, Line 25:
Delete "May 21-25, Z018," and insert --May 21-25, 2018,--

Item (56) Other Publications, Page 9, Column 2, Line 28:
Delete "Yecovery" and insert --recovery--

Item (56) Other Publications, Page 9, Column 2, Line 31:
Delete "Dormat" and insert --Dormant--

Item (56) Other Publications, Page 10, Column 1, Line 1:
Delete "R2-181148Z" and insert --R2-1811482--

Item (56) Other Publications, Page 10, Column 1, Line 2:
Delete "Aug. 20-24, Z018," and insert --Aug. 20-24, 2018,--

Item (56) Other Publications, Page 10, Column 1, Line 8:
Delete "Aug. 20-Z4, 2018," and insert --Aug. 20-24, 2018,--

Item (56) Other Publications, Page 10, Column 1, Line 31:
Delete "Remaing" and insert --Remaining--

Item (56) Other Publications, Page 10, Column 2, Line 1:
Delete "Aug. 2, 20197" and insert --Aug. 27, 2019--

In the Drawings

Sheet 7 of 26, Fig. 7:
Delete "DL-SCH of SCH" and insert --DL-SCH of SCG--

Sheet 7 of 26, Fig. 7:
Delete "UL-SCH of SCH" and insert --UL-SCH of SCG--

Sheet 21 of 26, Fig. 21:
Delete "configruaton" and insert --configuration--

CERTIFICATE OF CORRECTION (continued)
U.S. Pat. No. 11,337,265 B2

In the Specification

Detailed Description, Column 7, Line 52:
After "selection", insert --.--

Detailed Description, Column 12, Line 25:
Delete "534" and insert --535--

Detailed Description, Column 12, Line 28:
Delete "535A and 535B" and insert --536A and 536B--

Detailed Description, Column 12, Line 31:
Delete "536A and 536B" and insert --537A and 537B--

Detailed Description, Column 13, Line 5:
Delete "621" and insert --620--

Detailed Description, Column 15, Line 38:
Delete "PDDCH" and insert --PDCCH--

Detailed Description, Column 15, Line 42:
Delete "PDDCH" and insert --PDCCH--

Detailed Description, Column 20, Line 50:
Delete "1312, 1312," and insert --1312, 1313,--

Detailed Description, Column 25, Line 34:
Delete "1621" and insert --1620--

Detailed Description, Column 34, Line 46:
Delete "2101" and insert --2102--

Detailed Description, Column 42, Line 30:
Delete "212," and insert --2612,--